United States Patent
Palermo et al.

(10) Patent No.: US 12,289,239 B2
(45) Date of Patent: *Apr. 29, 2025

(54) DYNAMIC LOAD BALANCING FOR MULTI-CORE COMPUTING ENVIRONMENTS

(71) Applicant: Intel Corporation, Santa Clara, CA (US)

(72) Inventors: Stephen Palermo, Chandler, AZ (US); Bradley Chaddick, Portland, OR (US); Gage Eads, Austin, TX (US); Mrittika Ganguli, Tempe, AZ (US); Abhishek Khade, Chandler, AZ (US); Abhirupa Layek, Chandler, AZ (US); Sarita Maini, Tempe, AZ (US); Niall McDonnell, Limerick (IE); Rahul Shah, Chandler, AZ (US); Shrikant Shah, Chandler, AZ (US); William Burroughs, Macungie, PA (US); David Sonnier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,619

(22) Filed: Jan. 13, 2023

(65) Prior Publication Data
US 2023/0231809 A1 Jul. 20, 2023

Related U.S. Application Data

(63) Continuation of application No. 17/018,809, filed on Sep. 11, 2020, now Pat. No. 11,575,607.
(Continued)

(51) Int. Cl.
*H04L 47/125* (2022.01)
*H04L 47/62* (2022.01)
(Continued)

(52) U.S. Cl.
CPC ............ *H04L 47/125* (2013.01); *H04L 47/62* (2013.01); *H04L 47/624* (2013.01); *H04L 47/6255* (2013.01); *H04L 47/6275* (2013.01)

(58) Field of Classification Search
CPC .............. H04L 47/10-196; H04L 47/62-6295
See application file for complete search history.

(56) References Cited

U.S. PATENT DOCUMENTS 7,289,442 B1 * 10/2007 Srinivasan .......... H04L 47/2441
711/108
8,327,187 B1 12/2012 Metcalf
(Continued)

FOREIGN PATENT DOCUMENTS

DE 112016006154 T5 9/2018
DE 112017001808 T5 1/2019
(Continued)

OTHER PUBLICATIONS

DPDK, "NXP DPAA Eventdev Driver," last retrieved Sep. 9, 2020, available online: https://doc.dpdk.org/guides/eventdevs/dpaa.html (3 pages).
(Continued)

*Primary Examiner* — Chi H Pham
*Assistant Examiner* — Vladislav Y Agureyev
(74) *Attorney, Agent, or Firm* — Hanley Flight & Zimmerman, LLC

(57) ABSTRACT

Methods, apparatus, systems, and articles of manufacture are disclosed for dynamic load balancing for multi-core computing environments. An example apparatus includes a first and a plurality of second cores of a processor, and circuitry in a die of the processor separate from the first and the second cores, the circuitry to enqueue identifiers in one or more queues in the circuitry associated with respective ones of data packets of a packet flow, allocate one or more
(Continued)

of the second cores to dequeue first ones of the identifiers in response to a throughput parameter of the first core not satisfying a throughput threshold to cause the one or more of the second cores to execute one or more operations on first ones of the data packets, and provide the first ones to one or more data consumers to distribute the first data packets.

20 Claims, 46 Drawing Sheets

Related U.S. Application Data

(60) Provisional application No. 62/979,963, filed on Feb. 21, 2020, provisional application No. 62/899,061, filed on Sep. 11, 2019.

(51) Int. Cl.
*H04L 47/625* (2022.01)
*H04L 47/6275* (2022.01)

(56) References Cited

U.S. PATENT DOCUMENTS

| | | | |
|---|---|---|---|
| 9,178,815 B2 | 11/2015 | Gasparakis | |
| 9,313,047 B2 | 4/2016 | Michels et al. | |
| 9,432,298 B1* | 8/2016 | Smith | H04L 49/9057 |
| 9,485,326 B1 | 11/2016 | Ulman et al. | |
| 10,025,619 B1 | 7/2018 | Felter | |
| 10,469,404 B1 | 11/2019 | Mao et al. | |
| 10,505,849 B1* | 12/2019 | Iny | H04L 47/283 |
| 10,686,729 B2* | 6/2020 | Sindhu | H04L 49/113 |
| 10,686,763 B2 | 6/2020 | Kantecki et al. | |
| 10,826,841 B2 | 11/2020 | Malloy et al. | |
| 11,575,607 B2 | 2/2023 | Palermo et al. | |
| 2007/0230493 A1 | 10/2007 | Dravida | |
| 2010/0061245 A1 | 3/2010 | Larsen | |
| 2011/0044171 A1 | 2/2011 | Csaszar | |
| 2011/0142064 A1 | 6/2011 | Dubal | |
| 2012/0033673 A1 | 2/2012 | Goel | |
| 2012/0182870 A1 | 7/2012 | Francini | |
| 2012/0314710 A1 | 12/2012 | Shikano | |
| 2013/0159669 A1 | 6/2013 | Comparan et al. | |
| 2014/0201305 A1* | 7/2014 | Dalal | H04L 47/56 709/212 |
| 2014/0281349 A1 | 9/2014 | Peters | |
| 2015/0016266 A1 | 1/2015 | Dumitrescu | |
| 2015/0019702 A1 | 1/2015 | Kancherla | |
| 2015/0055457 A1 | 2/2015 | Agarwal | |
| 2015/0071076 A1 | 3/2015 | Izhak-Ratzin | |
| 2015/0082319 A1 | 3/2015 | Liu | |
| 2015/0163146 A1 | 6/2015 | Zhang et al. | |
| 2015/0200854 A1 | 7/2015 | Buchnik | |
| 2015/0263968 A1 | 9/2015 | Jain | |
| 2015/0263974 A1 | 9/2015 | Jain | |
| 2016/0036693 A1* | 2/2016 | Galdy | H04N 21/23439 709/219 |
| 2016/0173398 A1* | 6/2016 | Reinig | G06F 13/28 370/235 |
| 2016/0241482 A1 | 8/2016 | Tsuruoka | |
| 2016/0285971 A1* | 9/2016 | Bilas | H04L 69/321 |
| 2016/0301632 A1 | 10/2016 | Anand | |
| 2016/0344629 A1* | 11/2016 | Gray | H04L 49/106 |
| 2017/0048144 A1* | 2/2017 | Liu | H04L 47/122 |
| 2017/0054659 A1* | 2/2017 | Ergin | H04L 47/30 |
| 2017/0070356 A1 | 3/2017 | Dumitrescu et al. | |
| 2017/0118120 A1* | 4/2017 | Testicioglu | H04L 47/193 |
| 2017/0192921 A1 | 7/2017 | Wang et al. | |
| 2017/0195238 A1 | 7/2017 | Luo | |
| 2017/0223107 A1* | 8/2017 | Ben Dayan | G06F 3/067 |
| 2017/0230298 A1 | 8/2017 | Perry | |
| 2017/0286337 A1 | 10/2017 | Wang et al. | |
| 2017/0289129 A1 | 10/2017 | Ghetie et al. | |
| 2017/0318082 A1 | 11/2017 | Thakur et al. | |
| 2017/0324713 A1 | 11/2017 | Kantecki et al. | |
| 2017/0366449 A1 | 12/2017 | Loveless | |
| 2018/0048524 A1 | 2/2018 | Mendoza et al. | |
| 2018/0054485 A1 | 2/2018 | Warfield et al. | |
| 2018/0069924 A1 | 3/2018 | Tumuluru et al. | |
| 2018/0083878 A1 | 3/2018 | Francini | |
| 2018/0103060 A1 | 4/2018 | Li | |
| 2018/0107766 A1 | 4/2018 | Dumitrescu et al. | |
| 2018/0114012 A1 | 4/2018 | Sood | |
| 2018/0123950 A1 | 5/2018 | Garg | |
| 2018/0157515 A1 | 6/2018 | Malloy et al. | |
| 2018/0183860 A1 | 6/2018 | Majumdar | |
| 2018/0191523 A1 | 7/2018 | Shah et al. | |
| 2018/0191630 A1 | 7/2018 | Kenny et al. | |
| 2018/0205656 A1 | 7/2018 | Atli | |
| 2018/0212889 A1 | 7/2018 | Xu et al. | |
| 2018/0220008 A1 | 8/2018 | Reith | |
| 2018/0253084 A1 | 9/2018 | Diaz et al. | |
| 2018/0278530 A1 | 9/2018 | Connor | |
| 2018/0278532 A1 | 9/2018 | Ashner et al. | |
| 2018/0285151 A1 | 10/2018 | Wang et al. | |
| 2018/0293168 A1 | 10/2018 | Noureddine et al. | |
| 2018/0300766 A1* | 10/2018 | Ashner | H04L 47/125 |
| 2018/0307521 A1 | 10/2018 | Pinto | |
| 2018/0336067 A1 | 11/2018 | Lee et al. | |
| 2018/0351692 A1 | 12/2018 | Rozenboim | |
| 2018/0365176 A1 | 12/2018 | Finkelstein | |
| 2018/0367460 A1 | 12/2018 | Gao et al. | |
| 2019/0007347 A1 | 1/2019 | Chayat | |
| 2019/0042304 A1 | 2/2019 | Wang | |
| 2019/0042305 A1 | 2/2019 | McDonnell et al. | |
| 2019/0042319 A1 | 2/2019 | Sood | |
| 2019/0042331 A1 | 2/2019 | McDonnell et al. | |
| 2019/0043357 A1 | 2/2019 | Stinnett | |
| 2019/0044892 A1 | 2/2019 | Mangan et al. | |
| 2019/0095236 A1 | 3/2019 | Felter | |
| 2019/0132253 A1* | 5/2019 | Thubert | H04L 49/9005 |
| 2019/0158371 A1 | 5/2019 | Dillon et al. | |
| 2019/0179668 A1 | 6/2019 | Wang et al. | |
| 2019/0182180 A1 | 6/2019 | Frankel | |
| 2019/0190838 A1 | 6/2019 | Shpiner | |
| 2019/0253362 A1 | 8/2019 | Ruthstein | |
| 2019/0260685 A1* | 8/2019 | Tsirkin | H04L 41/5009 |
| 2019/0303222 A1* | 10/2019 | Masputra | G06F 13/1668 |
| 2019/0327126 A1 | 10/2019 | Rivaud | |
| 2019/0327188 A1 | 10/2019 | Rivaud | |
| 2019/0334828 A1 | 10/2019 | Fairhurst et al. | |
| 2019/0334837 A1 | 10/2019 | Fairhurst et al. | |
| 2020/0004584 A1 | 1/2020 | Burroughs et al. | |
| 2020/0042479 A1 | 2/2020 | Wang et al. | |
| 2020/0053019 A1 | 2/2020 | Singh | |
| 2020/0084155 A1 | 3/2020 | Song | |
| 2020/0104195 A1* | 4/2020 | Sanghi | G06F 15/17325 |
| 2020/0151120 A1 | 5/2020 | Thyamagondlu et al. | |
| 2020/0153756 A1* | 5/2020 | Thyamagondlu | G06F 13/28 |
| 2020/0260317 A1 | 8/2020 | Francini et al. | |
| 2020/0264914 A1 | 8/2020 | Dasgupta | |
| 2020/0267053 A1 | 8/2020 | Zheng | |
| 2020/0274796 A1 | 8/2020 | Garg | |
| 2020/0374742 A1 | 11/2020 | Chong et al. | |
| 2020/0389410 A1 | 12/2020 | Guim Bernat | |
| 2020/0412659 A1* | 12/2020 | Arditti Ilitzky | H04L 43/087 |
| 2020/0412660 A1 | 12/2020 | Ji et al. | |
| 2021/0011785 A1* | 1/2021 | Sanghi | G06F 9/467 |
| 2021/0051117 A1 | 2/2021 | Yoshida | |
| 2021/0297343 A1 | 9/2021 | Vegesna | |
| 2021/0297350 A1 | 9/2021 | Vegesna | |
| 2021/0297351 A1 | 9/2021 | Vegesna et al. | |
| 2021/0336895 A1* | 10/2021 | He | H04L 47/27 |
| 2021/0344648 A1 | 11/2021 | Patel | |
| 2022/0091977 A1* | 3/2022 | Grunwald | G06F 11/1464 |
| 2022/0286399 A1 | 9/2022 | Mcdonnell | |
| 2023/0198912 A1 | 6/2023 | Mcdonnell | |
| 2023/0231811 A1 | 7/2023 | Dalal | |

FOREIGN PATENT DOCUMENTS

| | | |
|---|---|---|
| EP | 3629189 A2 | 4/2020 |
| EP | 3637704 B1 * | 7/2023 |

(56) References Cited

FOREIGN PATENT DOCUMENTS

| WO | WO-2014106201 A1 * | 7/2014 | ......... H04L 63/0227 |
|---|---|---|---|
| WO | 2017119980 A1 | 7/2017 | |
| WO | 2017172217 A1 | 10/2017 | |
| WO | WO-2018119153 A2 * | 6/2018 | ......... H01L 23/4855 |
| WO | 2018191355 A1 | 10/2018 | |
| WO | WO-2021026740 A1 * | 2/2021 | ............. H04L 45/74 |

OTHER PUBLICATIONS

DPDK, "NXP DPAA2 Even dev Driver," last retrieved Sep. 9, 2020, available online: https://doc.dpdk.org/guides/eventdevs/dpaa2.html (3 pages).

DPDK, "OCTEON TX SSOVF Eventdev Driver," last retrieved Jan. 11, 2021, available online: https://doc.dpdk.org/guides/eventdevs/octeontx.html (3 pages).

DPDK, "OCTEON TX2 SSO Eventdev Driver," last retrieved Jan. 11, 2021, available online: https://doc.dpdk.org/guides/eventdevs/octeontx2.html (4 pages).

International Searching Authority, "International Search Report", mailed in connection with International Application No. PCT/US2020/050506 dated Dec. 23, 2020 (3 pages).

International Searching Authority, "Written Opinion", mailed in connection with International Application No. PCT/US2020/050506 dated Dec. 23, 2020 (9 pages).

DPDK, "Octeon TX SSOVF Eventdev Driver," last retrieved Sep. 9, 2020, available online: https://doc.dpdk.org/guides/eventdevs/octeontx.html (4 pages).

DPDK, "Octeon TX2 SSO Eventdev Driver," last retrieved Sep. 9, 2020, available online: https://doc.dpdk.org/guides/eventdevs/octeontx2.html (4 pages).

United States Patent and Trademark Office, "Non-Final Rejection," mailed in connection with U.S. Appl. No. 17/018,809 dated Jun. 7, 2022, 22 pages.

United States Patent and Trademark Office, "Notice of Allowance and Fee(s) Due," mailed in connection with U.S. Appl. No. 17/018,809 dated Sep. 30, 2022, 13 pages.

United States Patent and Trademark Office, "Notice of Allowance and Fee(s) Due," mailed in connection with U.S. Appl. No. 17/018,809 dated Oct. 13, 2022, 2 pages.

International Searching Authority, "International Preliminary Report on Patentability," issued in connection with International Patent Application No. PCT/US2020/050506, issued on Mar. 15, 2022, 10 pages.

European Patent Office, "Extended European Search Report," issued in connection with European Patent Application No. 20863993.0, dated Feb. 3, 2023, 10 pages.

European Patent Office, "Communication Pursuant to Article 94(3) EPC," issued in connection with European Patent Application No. 20863993.0-1213, dated Nov. 29, 2023, 8 pages.

"Optimizing Mobile Backhaul Using Machine Learning"; Mohammedadem; Master Thesis, School of Electrical Engineering, Aalto University School of Electrical Engineering; May 2019 (Year: 2019).

"Queue Management in Network Processors"; Papaefstathiou et al.; IEEE Computer Society, Proceedings of the Design Automation and Test in Europe Conference and Exhibition; 2005 (Year: 2005).

United States Patent and Trademark Office, "Non-Final Office Action," issued in connection with U.S. Appl. No. 17/637,416, dated Apr. 19, 2024, 14 pages.

European Patent Office, "Communication under Rule 71(3) EPC—Intention to Grant," issued in connection with European Patent Application No. 20 863 993.0-1206, dated Jul. 18, 2024, 140 pages.

United States Patent and Trademark Office, "Final Office Action," issued in connection with U.S. Appl. No. 17/637,416, dated Sep. 12, 2024, 11 pages.

United States Patent and Trademark Office, "Non-Final Office Action," issued in connection with U.S. Appl. No. 18/621,516, dated Nov. 8, 2024, 16 pages.

United States Patent and Trademark Office, "Notice of Allowance and Fee(s) Due," issued in connection with U.S. Appl. No. 17/637,416, dated Nov. 26, 2024, 8 pages.

United States Patent and Trademark Office, "Corrected Notice of Allowability," issued in connection with U.S. Appl. No. 17/637,416, dated Nov. 29, 2024, 5 pages.

* cited by examiner

| PACKET SIZE (BYTES) | LINE RATE (MPPS) | WITHOUT DYNAMIC LOAD BALANCER (DLB) AND 1 WORKER CORE USED (MILLION PACKETS PER SECOND (MPPS)) | WITH DLB AND 1 WORKER CORE USED (MPPS) | WITH DLB AND 2 WORKER CORES USED (MPPS) | WITH DLB AND 3 WORKER CORES USED (MPPS) |
|---|---|---|---|---|---|
| 64 | 36.33 | | 4.1 | | |
| 128 | 21.11 | | 4.1 | | |
| 256 | 11.32 | | 3.6 | | |
| 512 | 5.87 | 3.19 | 2.357 | 4.7 | 5.3 |
| 1024 | 2.99 | | 1.42 | | |
| 1400 | 2.2 | | 1.09 | | |
| THROUGHPUT = | | 60% | 44% | 89% | 100% |

FIG. 17

DYNAMIC AFFINITY FLOW ID > CONSUMER

| PRODUCER HARDWARE CONTROL WORD (HCW) | | | CONSUMER QE | |
|---|---|---|---|---|
| CMD | 1B | INDICATES PRESENCE OF QE, COMP, AND/OR TOKENS | STATUS | VALID/ERROR/STATUS BITS |
| MISC | 1B | DEBUG, MISC FEATURES | MISC | DEBUG, MISC FEATURES |
| LOCKID | 2B | LOCKID FOR ATOMIC PURPOSES | DEBUG | DEBUG |
| Q_INFO | 2B | RELEVENT IF QE IS PRESENT:<br>*TYPE OF LB REQUIRED<br>*INDEX OF INTERNAL QID<br>*PRIORITY 0-7 | Q_INFO | COPIED FROM PRODUCER |
| SW | 10B | FOR SW USAGE: DLB MAY NOT USE | SW | COPIED FROM PRODUCER |

FIG. 35

DYNAMIC LOAD BALANCING FOR MULTI-CORE COMPUTING ENVIRONMENTS

RELATED APPLICATIONS

This patent arises from a continuation of U.S. patent application Ser. No. 17/018,809 (now U.S. Pat. No. 11,575, 607), which was filed on Sep. 11, 2020, which claims the benefit of U.S. Provisional Patent Application No. 62/979, 963, which was filed on Feb. 21, 2020, and U.S. Provisional Patent Application No. 62/899,061, which was filed on Sep. 11, 2019. U.S. patent application Ser. No. 17/018,809, U.S. Provisional Patent Application No. 62/979,963, and U.S. Provisional Patent Application No. 62/899,061 are hereby incorporated herein by reference in their entireties. Priority to U.S. patent application Ser. No. 17/018,809, U.S. Provisional Patent Application No. 62/979,963, and U.S. Provisional Patent Application No. 62/899,061 is hereby claimed.

FIELD OF THE DISCLOSURE

This disclosure relates generally to multi-core computing environments and, more particularly, to dynamic load balancing for multi-core computing environments.

BACKGROUND

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation. Such processing can consume a disproportionate amount of bandwidth of processing resources closer to the end user or computing device thereby increasing latency, congestion, and power consumption of the network.

BRIEF DESCRIPTION OF THE DRAWINGS

FIG. 17 is a table depicting example throughput parameters based on a CPU with and without the example DLBs of FIGS. 2-6.

FIG. 35 is an example table depicting an example implementation of a hardware control word and a consumer queue element that may be implemented using the DLB(s) of FIGS. 2-6, 18, 19, 20, 21, 22, 23, 24, 26, and/or 28.

DETAILED DESCRIPTION

Figure 1:
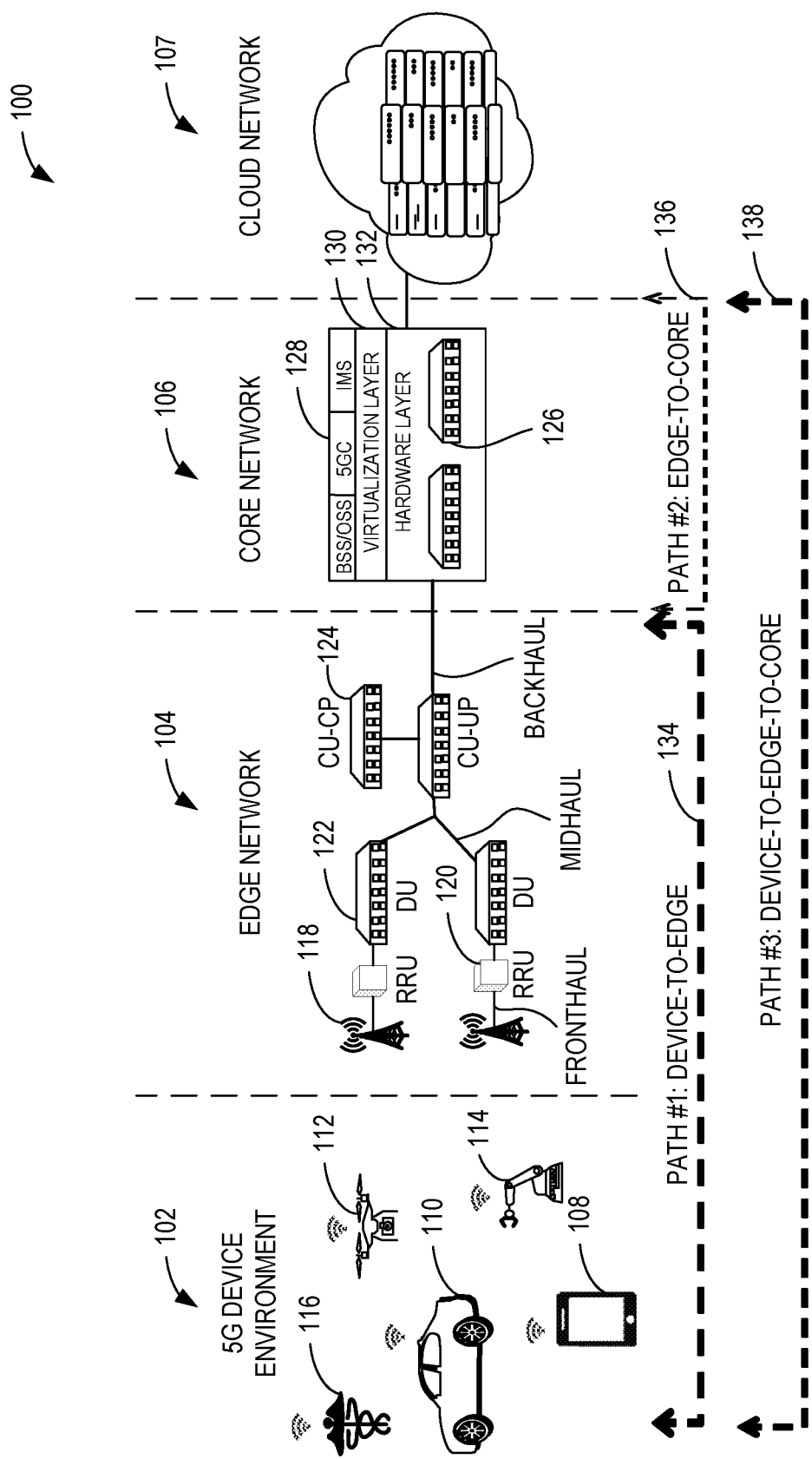
FIG. 1 is an illustration of an example multi-core computing environment including an example multi-core computing system.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation.

While MEC is an important part of the evolution of edge computing, cloud and communication service providers are addressing the need to transform networks of the cloud and communication service providers in preparation for fifth generation cellular network technology (i.e., 5G). To meet the demands of next generation networks supporting 5G, cloud service providers can replace fixed function proprietary hardware with more agile and flexible approaches that rely on the ability to maximize the usage of multi-core edge and data center servers. Next generation server edge and data center networking can include an ability to virtualize and deploy networking functions throughout a data center and up to and including the edge. High packet throughput amplifies the need for better end-to-end latency, Quality of Service (QoS), and traffic management. Such needs in turn drive requirements for efficient data movement and data sharing between various stages of a data plane pipeline across a network.

Queue management as disclosed herein can provide efficiencies in the network by reducing a time that a CPU core spends marshalling pointers to data structures, data packets, etc., between cores of the CPU. For example, hardware queue management as disclosed herein can improve system performance (e.g., network system performance, 5G system performance, etc.) related to handling network data across CPU cores by foregoing overhead of passing data structures and pointers from one CPU core to another.

Queue management as disclosed herein can be implemented with hardware queue management that effectuates queue management in hardware. In some disclosed examples, hardware queue management can be implemented by an example hardware queue manager (HQM) or an HQM implemented as a Dynamic Load Balancer (DLB). For example, the HQM, when implemented as a DLB, can implement, effectuate, and/or otherwise execute dynamic load balancing functions, computing or processing tasks, etc. As used herein, the terms "hardware queue manager," "hardware queueing manager," and "HQM" are equivalent and used interchangeably. As used herein, the terms "dynamic load balancer," and "DLB" are equivalent and used interchangeably, and refer to a load balancer (LB) implemented via an HQM.

In some disclosed examples, the HQM can enable pipelined packet processing and support hundreds of millions of queue management and load balancing operations per second for run-to-completion and pipelined network processing approaches. Hardware queue management as disclosed herein can replace software queues (e.g., queues associated with software queue management), especially software queues associated with multiple producer CPU cores and/or multiple consumers CPU cores. As used herein, the terms "producer core" and "producer CPU core" are used interchangeably and refer to a core that creates and/or otherwise generates an element (e.g., a queue element) to enqueue to the HQM. As used herein, the terms "consumer core" and "consumer CPU core" are used interchangeably and refer to a core that acts on the result of a dequeue from the HQM.

Applications that use the example HQM as disclosed herein can benefit from an enhanced overall system performance via efficient workload distribution compared to software queue management, where one of the most typical usages of software queuing is load balancing. Typical queueing schemes can use CPU cores to distribute work, which burdens the CPU cores with queuing and reordering tasks, as opposed to using the CPU cores for high-value add worker core processing with hardware-based queue management built-in load balancing functionality, as disclosed herein. The example HQM as disclosed herein can remove direct core-to-core interactions and effectuate the load balancing in hardware.

Dimensioning refers to the process of allocating, distributing, and/or otherwise scheduling computing applications across an entire slice of a computing network or system architecture. In some instances, dimensioning can be implemented in the computing network by deploying a producer-consumer model. A producer (e.g., a data producer) can refer to an agent (e.g., a hardware agent, a software agent, etc.) that places a type of message onto a queue (e.g., a buffer, a computing queue, a computing task queue, etc.). A consumer (e.g., a data consumer) can refer to the same agent or a different agent that can remove the message from the queue for processing. In some instances, the message can refer to machine-readable data representative of one or more pointers (e.g., one or more identifiers) that correspond to data in memory (e.g., non-volatile memory, volatile memory, etc.) or other indications of a computing task to be executed. Problems can arise when the producer attempts to add messages to a full queue or a consumer attempts to remove messages from an empty queue.

Prior techniques for deploying the producer-consumer model in MEC-based applications and data centers can include software that manage queues including data to be executed by one or more cores (e.g., computing cores, hardware cores, processing cores, etc.) of a processor or other type of processor circuitry. Such prior techniques can allocate (e.g., statically allocate) the data to a core to be executed at random or without regard for an instant utilization of the core. For example, prior techniques can allocate incoming data to be processed to a core that is experiencing a heavy computing workload thereby generating a bottleneck in processing the incoming data due to an unavailability of processing ability or bandwidth by the core. In such examples, the incoming data can correspond to an elephant or fat flow. In some such examples, a core can be assigned to a network interface controller (NIC) to receive data packets of the elephant flow from the NIC. The NIC can spray packets randomly via receive side scaling (RSS) thereby reducing bandwidth associated with the core and/or, more generally, a processor that includes the core. As used herein, an elephant flow or fat flow is a single session, relatively long running network connection that consumes a large or disproportionate amount of bandwidth of a core and/or, more generally, a processor that includes the core. The elephant or fat flow can be extremely large (in total bytes) or high in traffic volume and extremely long in time or duration.

Accordingly, such prior techniques do not take into account resource availability, cost structures, etc., of computing resources in the computing architecture (e.g., the multi-core computing architecture) and, thus, can be impacted by lock latency, memory latency, cache behaviors, polling multiple queues, etc., which can increase the time necessary to process incoming data. Lock latency can occur in response to a spinlock or a spinlock condition. A spinlock refers to a lock that a thread (e.g., a computing thread, a core thread, a hardware thread, etc.) attempts to acquire but waits in a loop (i.e., spins) while repeatedly checking to see if the lock is available. As the thread remains active but is not performing a useful task, the use of such a lock is akin to busy waiting. Once acquired, spinlocks will usually be held until they are explicitly released, although in some implementations they may be automatically released if the thread being waited on (e.g., the thread which holds the lock) blocks, or enters a sleep mode.

Spinlocks become wasteful if held for longer durations, as they may prevent other threads from running and require rescheduling. The longer a thread holds a lock, the greater the risk that the thread will be interrupted by the operating system (OS) scheduler while holding the lock. If this happens, other threads will be left in a holding pattern (i.e., spinning) (e.g., repeatedly trying to acquire the lock), while the thread holding the lock is not making progress towards releasing it. The result is an indefinite postponement until the thread holding the lock can finish and release it. This is especially true on a single-processor system, where each waiting thread of the same priority is likely to waste its quantum (e.g., allocating time where a thread can run) spinning until the thread that holds the lock is finally finished.

Examples disclosed herein include the HQM to improve load balancing and workload distribution in computer network architectures, such as multi-core computer network architectures. Examples disclosed herein reduce and/or otherwise eliminate spinlock penalties. In some disclosed examples, the HQM enables pipelined processing of data (e.g., data packets in a cellular or other wireless network) between multiple producers (e.g., producer cores) and multiple consumers (e.g., consumer cores). A producer core can offload scheduling of computing tasks to the example HQM to allocate a workload by the producer core to an available consumer core of a plurality of consumer cores. By offloading the scheduling to the example HQM, the producer core can become available to execute high-value added core processing tasks. Advantageously, the example HQM can remove direct core-to-core interactions and execute scheduling and corresponding load balancing tasks in hardware.

In some disclosed examples, the HQM implements a load balancer (e.g., a DLB) to improve load balancing and workload distribution in computer network architectures. In such disclosed examples, the DLB can scale (e.g., dynamically scale) up a quantity of consumer cores used to facilitate a distribution, transmission, and/or processing of an elephant flow to optimize and/or otherwise improve a throughput, a line rate, a bandwidth, etc., associated with the elephant flow. For example, the DLB can distribute the elephant flow based on a scheduling type (e.g., atomic scheduling, ordered scheduling, etc.) to one or more consumer cores, receive the processed elephant flow from the one or more consumer cores, and re-order and/or aggregate the processed elephant flow in preparation for distribution and/or transmission to different hardware, a different logic entity, etc.

FIG. 1 is an illustration of an example multi-core computing environment 100. The multi-core computing environment 100 includes an example device environment 102, an example edge network 104, an example core network 106, and an example cloud network 107. In this example, the device environment 102 is a 5G device environment that facilitates the execution of computing tasks using a wireless network, such as a wireless network based on 5G (e.g., a 5G cellular network).

The device environment 102 includes example devices (e.g., computing devices) 108, 110, 112, 114, 116. The devices 108, 110, 112, 114, 116 include a first example device 108, a second example device 110, a third example device 112, a fourth example device 114, and a fifth example device 116. The first device 108 is a 5G Internet-enabled smartphone. Alternatively, the first device 108 may be a tablet computer, an Internet-enabled laptop, etc. The second device 110 is a vehicle (e.g., a combustion engine vehicle, an electric vehicle, a hybrid-electric vehicle, etc.). For example, the second device 110 can be an electronic control unit or other hardware included the vehicle, which, in some examples, can be a self-driving, autonomous, or computer-assisted driving vehicle.

The third device 112 is an aerial vehicle. For example, the third device 112 can be a processor or other type of hardware included in an unmanned aerial vehicle (UAV) (e.g., an autonomous UAV, a human or user-controlled UAV, etc.), such as a drone. The fourth device 114 is a robot. For example, the fourth device 114 can be a collaborative robot or other type of machinery used in assembly, lifting, manufacturing, etc., types of tasks.

The fifth device 116 is a healthcare associated device. For example, the fifth device 116 can be a computer server that stores and/or processes health care records. In other examples, the fifth device 116 can be a medical device, such as an infusion pump, magnetic resonance imaging (MRI) machine, a surgical robot, a vital sign monitoring device, etc. In some examples, one or more of the devices 108, 110, 112, 114, 116 may be a different type of computing device, such as a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device. In some examples, there may be fewer or more devices than depicted in FIG. 1.

The devices 108, 110, 112, 114, 116 and/or, more generally, the device environment 102, are in communication with the edge network 104 via first example networks 118. The first networks 118 are cellular networks (e.g., 5G cellular networks). For example, the first networks 118 can be implemented by and/or otherwise facilitated by antennas, radio towers, etc., and/or a combination thereof. Additionally or alternatively, one or more of the first networks 118 may be an Ethernet connection, a digital subscriber line (DSL) connection, a telephone line connection, a coaxial cable system, a satellite system, a line-of-site wireless system, a cellular telephone system, etc., and/or a combination thereof.

In the illustrated example of FIG. 1, the edge network 104 includes the first networks 118, example remote radio units (RRUs) 120, example distributed units (DUs) 122, and example centralized units (CUs) 124. In this example, the DUs 122 and/or the CUs 124 are multi-core computing systems. For example, one or more of the DUs 122 and the CUs 124 can include a plurality of processors that each include a plurality of cores (e.g., processor cores). In such examples, the DUs 122 and/or the CUs 124 are edge servers (e.g., 5G edge servers), such as multi-core edge servers, that can effectuate the distribution of data flows (e.g., communication flows, packet flows, a flow of one or more data packets, etc.) through the edge network 104 to a different destination (e.g., the 5G device environment 102, the core network 106, etc.). In some examples, fewer or more of the first networks 118, the RRUs 120, the DUs 122, and/or the CUs 124 may be used than depicted in FIG. 1.

In this example, the RRUs 120 are radio transceivers (e.g., remote radio transceivers, also referred to as remote radio heads (RRHs)) in a radio base station. For example, the RRUs 120 are hardware that can include radio-frequency (RF) circuitry, analog-to-digital/digital-to-analog converters, and/or up/down power converters that connects to a network of an operator (e.g., a cellular operator or provider). In such examples, the RRUs 120 can convert a digital signal to RF, amplify the RF signal to a desired power level, and radiate the amplified RF signal in air via an antenna. In some examples, the RRUs 120 can receive a desired band of signal from the air via the antenna and amplify the received signal. The RRUs 120 are termed as remote because the RRUs 120 are typically installed on a mast-top, or tower-top location that is physically distant from base station hardware, which is often mounted in an indoor rack-mounted location or installation.

In the illustrated example of FIG. 1, the RRUs 120 are coupled and/or otherwise in communication with a respective one of the DUs 122. In this example, the DUs 122 include hardware that implement real time Layer 1 (L1) scheduling functions (e.g., physical layer control) and/or Layer 2 (L2) scheduling functions (e.g., radio link control (RLC), medium access control (MAC), etc.). In this example, the CU 124 includes hardware that implements Layer 3 scheduling functions, such as packet data convergence control (PDCP) and/or radio resource control (RRC) functions. In this example, a first one of the CUs 124 is a centralized unit control plane (CU-CP) and a second one of the CUs 124 is a centralized unit user plane (CU-UP).

In this example, at least one of one or more of the DUs 122 and/or one or more of the CUs 124 implement a virtualized radio access network (vRAN). For example, one or more of the DUs 122 and/or one or more of the CUs 124 can execute, run, and/or otherwise implement virtualized baseband functions on vendor-agnostic hardware (e.g., commodity server hardware) based on the principles of Network Functions Virtualization (NFV). NFV is a network architecture concept that uses the technologies of infrastructure technology (IT) virtualization to virtualize entire classes of network node functions into building blocks that may be connected, or chained together, to create communication services.

In the illustrated example of FIG. 1, first connection(s) between the first networks 118 and the RRUs 120 implement(s) the fronthaul of the edge network 104. Second connection(s) between the DUs 122 and the CUs 124 implement(s) the midhaul of the edge network 104. Third connection(s) between the CUs 124 and the core network 106 implement(s) the backhaul of the edge network 104.

In the illustrated example of FIG. 1, the core network 106 includes example core devices 126. In this example, the core devices 126 are multi-core computing systems. For example, one or more of the core devices 126 can include a plurality of processors that each include a plurality of cores (e.g., processor cores). For example, one or more of the core devices 126 can be servers (e.g., physical servers, virtual servers, etc., and/or a combination thereof). In such examples, one or more of the core devices 126 can be implemented with the same hardware as the DUs 122, the CUs 124, etc. In some examples, one or more of the core devices 126 may be any other type of computing device.

The core network 106 is implemented by different logical layers including an example application layer 128, an example virtualization layer 130, and an example hardware layer 132. In some examples, the core devices 126 are core servers. In some examples, the application layer 128 or portion(s) thereof, the virtualization layer 130 or portion(s) thereof, or the hardware layer 132 or portion(s) thereof implement a core server. For example, a core server can be implemented by the application layer 128, the virtualization layer 130, and/or the hardware layer 132 associated with a first one of the core devices 126, a second one of the cores devices 126, etc., and/or a combination thereof. In this example, the application layer 128 can implement business support systems (BSS), operations supports systems (OSS), 5G core (5GC) systems, Internet Protocol multimedia core network subsystems (IMS), etc., in connection with operation of a telecommunications network, such as the multi-core computing environment 100 of FIG. 1. In this example, the virtualization layer 130 can be representative of virtualizations of the physical hardware resources of the core devices 126, such as virtualizations of processing resources (e.g., CPUs, graphics processing units (GPUs), etc.), memory resources (e.g., non-volatile memory, volatile memory, etc.), storage resources (e.g., hard-disk drives, solid-state disk drives, etc.), network resources (e.g., NICs, gateways, routers, etc.)), etc. In this example, the virtualization layer 130 can control and/or otherwise manage the virtualizations of the physical hardware resources with a hypervisor that can run one or more virtual machines (VMs) built and/or otherwise composed of the virtualizations of the physical hardware resources.

The core network 106 is in communication with the cloud network 107. In this example, the cloud network 107 can be a private or public cloud services provider. For example, the cloud network 107 can be implemented using virtual and/or physical hardware, software, and/or firmware resources to execute computing tasks.

In the illustrated example of FIG. 1, multiple example communication paths 134, 136, 138 are depicted including a first example communication path 134, a second example communication path 136, and a third example communication path 138. In this example, the first communication path 134 is a device-to-edge communication path that corresponds to communication between one(s) of the devices 108, 110, 112, 114, 116 of the 5G device environment 102 and one(s) of the first networks 118, RRUs 120, DUs 122, and/or CUs 124 of the edge network 104. The second communication path 136 is an edge-to-core communication path that corresponds to communication between one(s) of the first networks 118, RRUs 120, DUs 122, and/or CUs 124 of the edge network 104 and one(s) of the core devices 126 of the core network 106. The third communication path 138 is a device-to-edge-to-core communication path that corresponds to communication between one(s) of the devices 108, 110, 112, 114, 116 and one(s) of the core devices 126 via one(s) of the first networks 118, RRUs 120, DUs 122, and/or CUs 124 of the edge network 104.

In some examples, bandwidth associated with the edge network 104 can be diminished, reduced, etc., in response to inefficient distribution of workloads (e.g., computing workloads) to a core of a processor (e.g., a core of a processor included in the DUs 122, the CUs 124, etc., and/or a combination thereof). For example, each of the DUs 122, the CUs 124, etc., can include at least one processor that includes a plurality of cores (e.g., computing cores, processing cores, etc.). In some such examples, a NIC of the edge network 104 that is in communication with the processor can distribute an elephant flow to a single core of the processor. In some such examples, the single core may require additional time to process the elephant flow. Advantageously, examples described herein improve such distribution of workloads in the edge network 104 and/or, more generally the multi-core computing environment 100 of FIG. 1, by dynamically scaling a quantity of cores assigned to an execution of an elephant flow.

Figure 2:
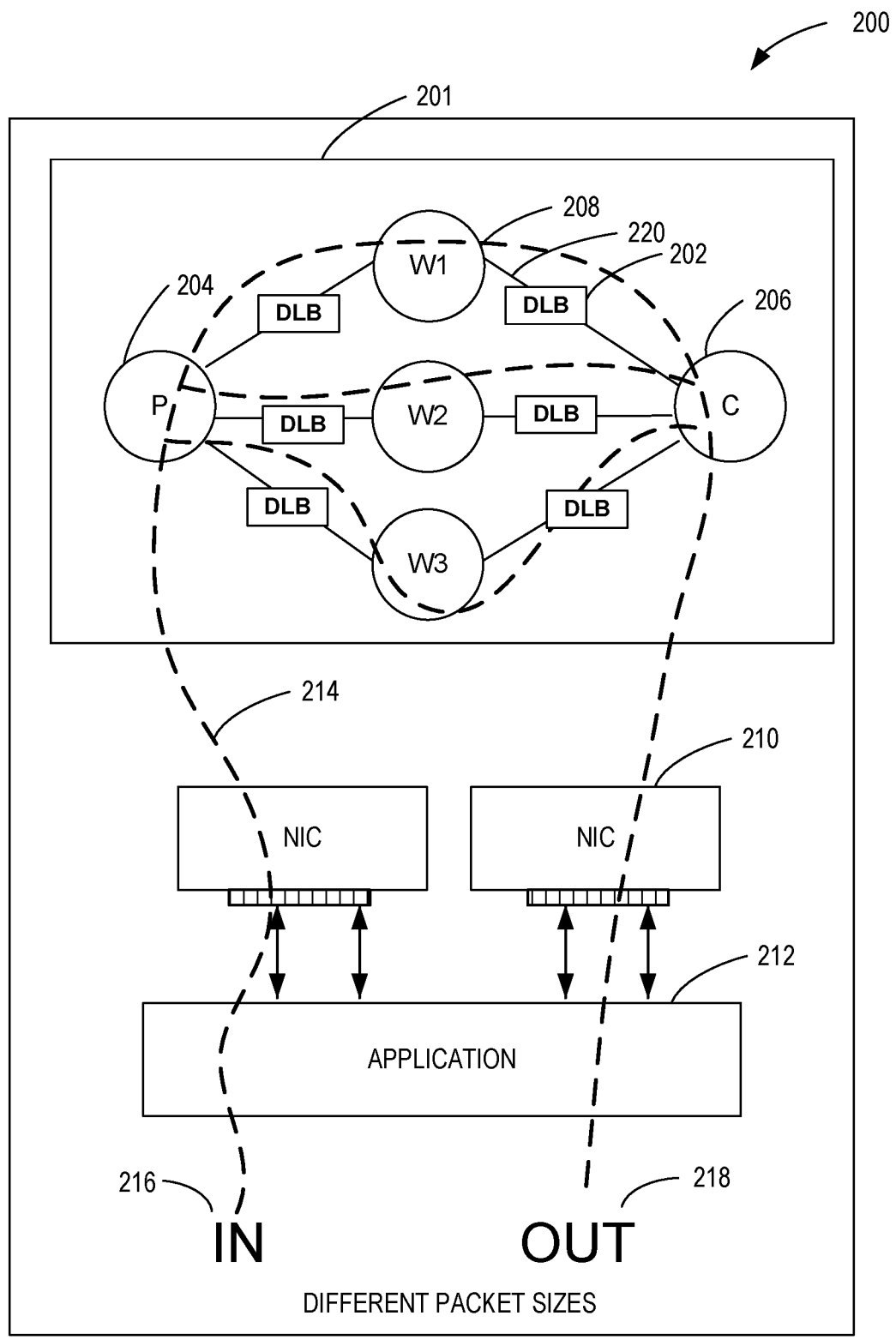
FIG. 2 is an illustration of an example implementation of the example multi-core computing system of FIG. 1 including example dynamic load balancers (DLBs).

FIG. 2 is an illustration of an example implementation of an example multi-core computing system 200 including an example processor 201 including example dynamic load balancers (DLBs) 202. For example, the multi-core computing system 200 can implement one of the DUs 122, the CUs 124, the core devices 126, etc., of FIG. 1. The multi-core computing system 200 includes an example producer core 204, an example consumer core 206, example worker cores 208, example NICs 210, and an example application (e.g., a firmware and/or software application) 212.

In example operation, the application 212 facilitates an example data flow 214 to flow from an example input 216 to an example output 218. In this example, the data flow 214 is an elephant flow, a fat flow, etc. The application 212 directs the data flow 214 from the input 216 to the producer core 204 via a first one of the NICs 210. Advantageously, the multi-core computing system 200 can process different sizes of data packets associated with the data flow 214 of this example or a different data flow.

In example operation, one or more of the DLBs 202 can enqueue data (e.g., add and/or otherwise place an element, such as a queue element, onto a queue) from the producer core 204 and dequeue (e.g., remove an element, such as a queue element, from a queue) the enqueued data to one(s) of the worker cores 208, such as a first worker core (W1), a second worker core (W2), and/or a third worker core (W3) of the worker cores 208. For example, the DLBs 202 can enqueue data from the producer core 204 and dequeue data to one(s) of the worker cores 208 via first example connections 220 represented by solid lines. In this example, the enqueued data and/or the dequeued data include data pointers (e.g., identifiers, data identifiers, etc.), data references to data stored in memory, etc. In response to obtaining the dequeued data, the one(s) of the worker cores 208 retrieve data packet(s) (or other data) of the data flow 214 that are referenced and/or otherwise correspond to the dequeued data from memory of the multi-core computing system 200. In response to obtaining the data packet(s), the one(s) of the worker cores 208 execute a computing task, a computing operation, etc., associated with the data packet(s). For example, the worker cores 208 can execute and/or otherwise process Internet Protocol Security (IPsec) tasks (e.g., an encryption task, a decryption task, etc.), deep packet inspection tasks, firewall tasks, etc.

In example operation, in response to executing the computing tasks, the one(s) of the worker cores 208 can enqueue the data pointers corresponding to the processed data packet(s) to one(s) of the DLBs 202, which, in turn, dequeue the data pointers to the consumer core 206. In response to dequeuing the data pointers from the one(s) of the DLBs 202, the consumer core 206 retrieves the corresponding processed data packet(s). In response to retrieving the processed data packet(s), the consumer core 206 can transmit the processed data packet(s) to the output 218 via a second one of the NICs 210 and/or the application 212. Although two instances of the NICs 210 are depicted in FIG. 2, alternatively the two instances may be combined into a single instance and/or a different number of the NICs 210 may be used.

Figure 3:
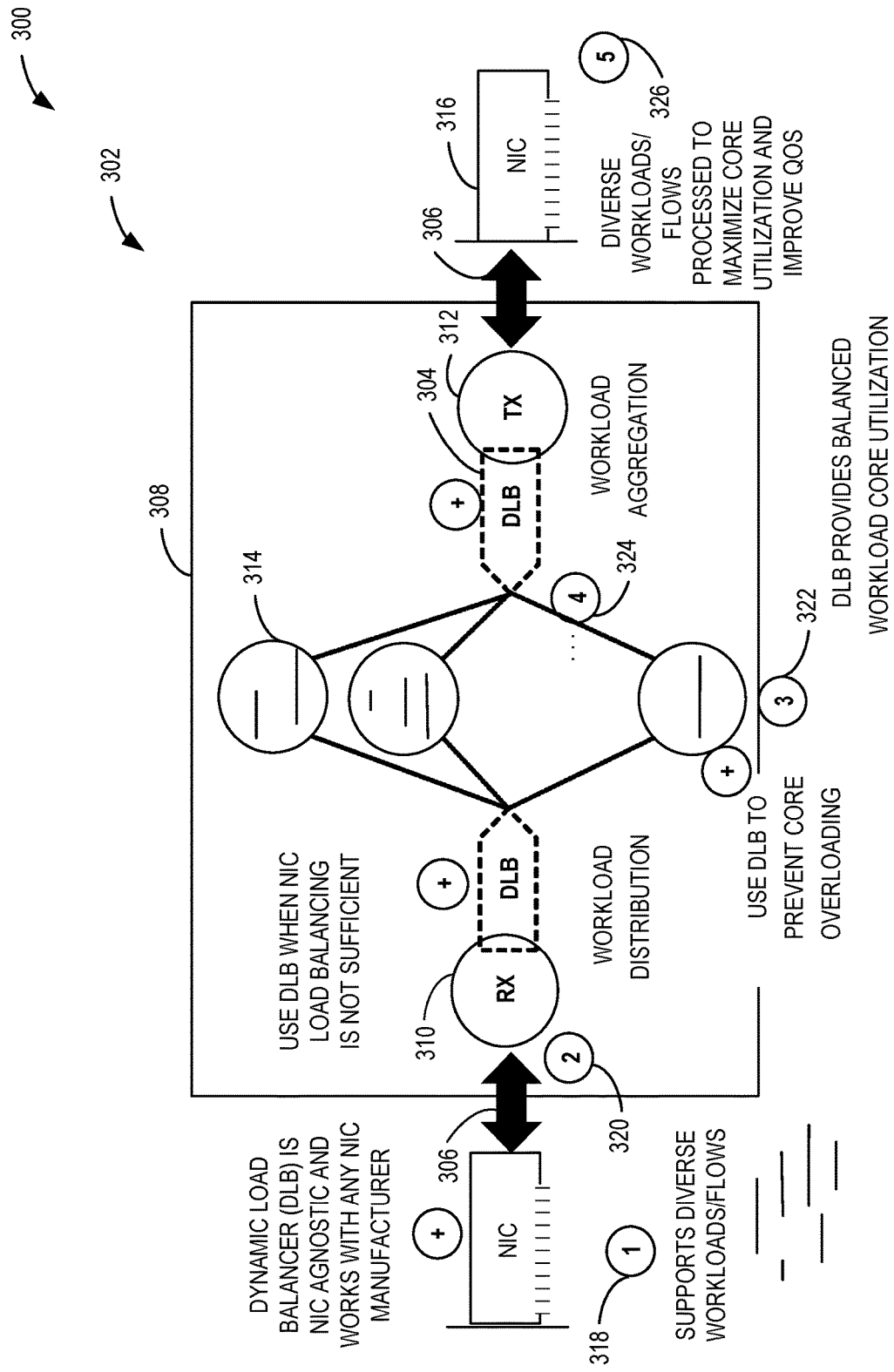
FIG. 3 is an illustration of a first example workflow executed by the example multi-core computing system of FIGS. 1 and/or 2 to process an example data flow.

FIG. 3 is an illustration of a first example workflow 300 executed by an example multi-core computing system 302 including an example DLB 304 to process an example data flow 306. For example, the multi-core computing system 302 can implement one of the DUs 122, the CUs 124, the core devices 126, etc., of FIG. 1. The multi-core computing system 302 includes an example processor 308, which includes an example producer core 310, an example consumer core 312, and example worker cores 314, and example NICs 316. In some examples, the producer core 310 can correspond to the producer core 204 of FIG. 2. In some examples, the consumer core 312 can correspond to the consumer core 206 of FIG. 2. In some examples, one or more of the worker cores 314 can correspond to one(s) of the worker cores 208 of FIG. 2.

In the illustrated example of FIG. 3, the producer core 310 is a receiver (RX) core and the consumer core 312 is a transmitter (TX) core. In this example, although depicted separately, the producer core 310 and the consumer core 312 are the same core, but represent different functions (e.g., a receive data function or task, a transmit data function or task, etc.) executed by that same core. Alternatively, the producer core 310 and the consumer core 312 may be different cores.

In the illustrated example of FIG. 3, although two instances of the NIC 316 are depicted, the two instances of the NIC 316 correspond to the same NIC 316 in this example. For example, the NIC 316 can transmit data to the producer core 310 and the same NIC 316 can obtain data from the consumer core 312. Alternatively, the two instances of the NIC 316 may be separate NICs. In some examples, one or more of the NICs 316 correspond to a NIC associated with the edge network 104 and/or the core network 106 of FIG. 1. In some examples, one or more of the NICs 316 correspond to at least one of the NICs 210 of FIG. 2.

In the illustrated example of FIG. 3, although two instances of the DLB 304 are depicted, the two instances of the DLB 304 correspond to the same DLB 304 in this example. For example, the DLB 304 can be included in the same processor 308 as the producer core 310 and the consumer core 312. In such examples, the DLB 304 can enqueue data from the producer core 310 and the same DLB 304 can dequeue data to one(s) of the worker cores 314. In some examples, more than one of the DLB 304 can be used. For example, a first instance of the DLB 304 can enqueue data from the producer core 310 for a first data flow and a second instance of the DLB 304 can enqueue data from the producer core 310 for a second data flow.

In the first workflow 300, during a first example operation 318, the NIC 316 obtains the data flow 306 (e.g., an elephant flow) from a device (e.g., one(s) of the devices 108, 110, 112, 114, 116 of FIG. 1). During a second example operation 320, the producer core 310 obtains a data packet of the data flow 306 and a pointer that corresponds to the data packet from the NIC 316. During the second operation 320, the DLB 304 associated with the producer core 310 enqueues the pointer. During the second operation 320, a first one of the worker cores 314 dequeues the pointer from the DLB 304 (e.g., from a queues included in the DLB 304). During a third example operation 322, the first one of the worker cores 314 retrieves the data packet identified by the pointer and executes an operation (e.g., a computing operation) of interest on the data packet.

During a fourth example operation 324 of the first workflow 300, the DLB 304 enqueues the pointer from the first one of the worker cores 314 in response to the first one of the worker cores 314 completing the operation on the data packet. During the fourth operation 324, responsive to the enqueuing, the DLB 304 re-orders and/or aggregates the pointer with other pointers corresponding to previously processed data packets. During the fourth operation 324, the DLB 304 dequeues the pointer to the consumer core 312. During a fifth example operation 326, the consumer core 312 retrieves the processed data packet corresponding to the pointer and transmits the processed data packet to the NIC 316, which, in turn, transmits the processed data packet to different hardware, firmware, and/or software.

Advantageously, the DLB 304 is NIC agnostic and can work and/or otherwise is compatible with a NIC from any NIC manufacturer. Advantageously, the processor 308 can offload scheduling tasks from the producer core 310 to the DLB 304 when the load balancing effectuated by the NIC 316 is not sufficient. Advantageously, the processor 308 can use the DLB 304 to prevent core overloading, such as one or more of the worker cores 314 being utilized closer to an upper utilization limit while other one(s) of the worker cores 314 are idle and/or otherwise in a sleep or low-powered state. Advantageously, the DLB 304 provides balanced workload core utilization by dequeuing pointers to available one(s) of the worker cores 314 to process data packets of the data flow 306. Advantageously, the DLB 304 and/or, more generally, the processor 308, can support diverse workloads, data flows, etc., such as short duration and small sized data flows, elephant flows, etc. Advantageously, the DLB 304 and/or, more generally, the processor 308, can process the diverse workloads, data flows, etc., to increase and/or otherwise maximize core utilization and improve Quality-of-Service (QoS) of the data flow 306.

Figure 4:
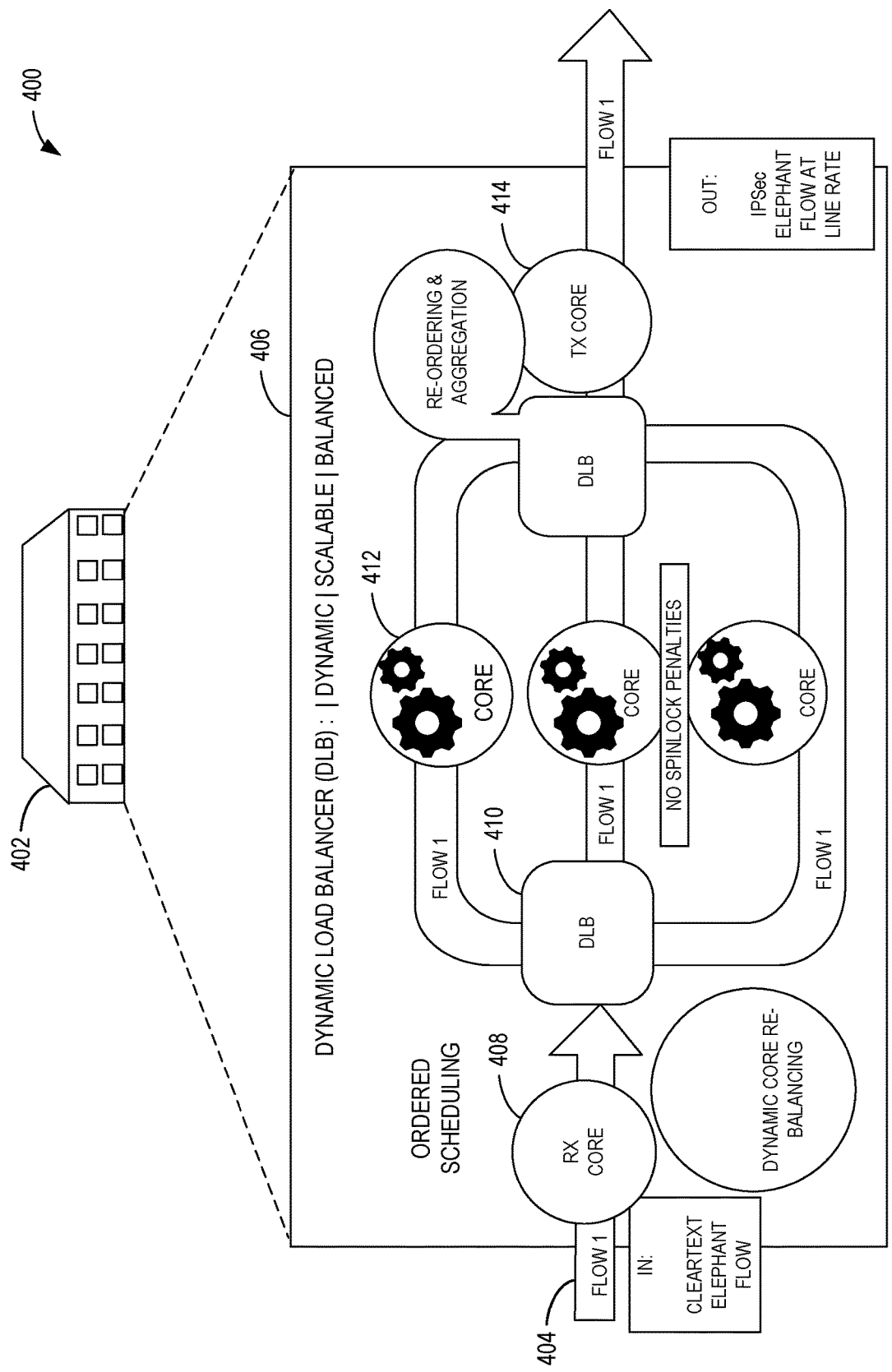
FIG. 4 is an illustration of a second example workflow based on ordered scheduling executed by the example multi-core computing system of FIGS. 1 and/or 2 to process an example data flow.

FIG. 4 is an illustration of a second example workflow 400 based on ordered scheduling executed by an example multi-core computing system 402 to process an example data flow (FLOW 1) 404. In this example, the multi-core computing system 402 can correspond to one of the DUs 122, the CUs 124, the core devices 126, etc., of FIG. 1. The multi-core computing system 402 includes an example processor 406. In this example, the processor 406 can correspond to the processor 308 of FIG. 3. In this example, the processor 406 includes an example producer core (RX CORE) 408, an example DLB 410, example worker cores (CORE) 412, and an example consumer core (TX CORE) 414.

For example, the producer core 408 can correspond to the producer core 310 of FIG. 3. The DLB 410 can correspond to the DLB 304 of FIG. 3. The worker cores 412 can correspond to the worker cores 314 of FIG. 3. The consumer core 414 can correspond to the consumer core 312 of FIG. 3.

Figure 5:
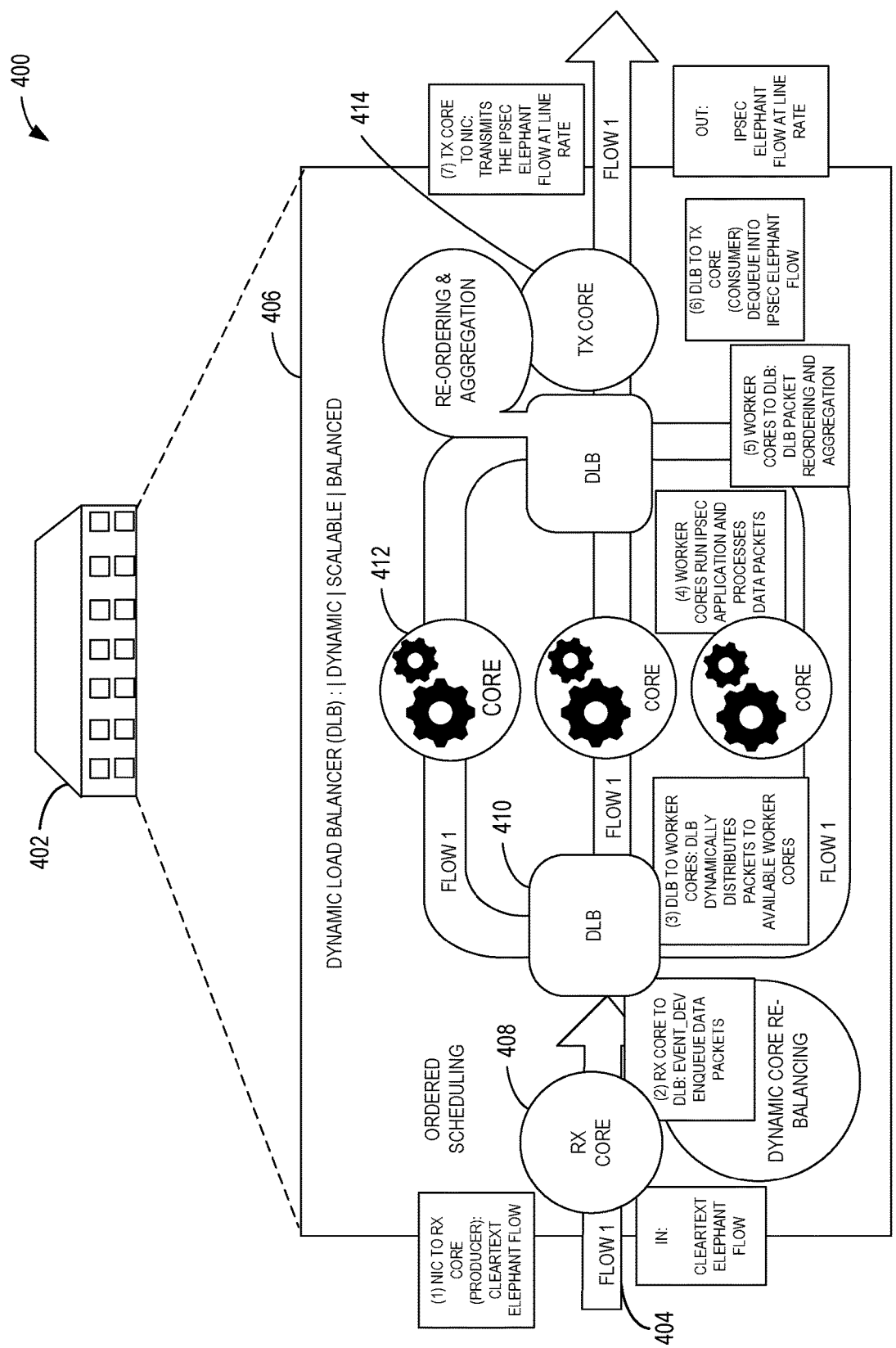
FIG. 5 is an annotated illustration of the second example workflow of FIG. 4.

FIG. 5 is an annotated illustration of the second workflow 400 executed by the multi-core computing system 402 of FIG. 4 based on ordered scheduling. In the second workflow 400, the producer core 408 obtains the data flow 404 from a data source, a flow source, etc., (e.g., the NIC 316 of FIG. 3). In this example, the data flow 404 is an elephant flow in cleartext. In other examples, the data flow 404 can be a data flow, such as an elephant flow, in ciphertext or any other format.

In the illustrated example of FIG. 5, the producer core 408 enqueues data pointers, data references, etc., corresponding to respective ones of data packets of the data flow 404 to the DLB 410. In this example, the producer core 408 generates and transmits an event (EVENT_DEV) to the DLB 410. Responsive to the event, the DLB 410 can extract data from the event, such as a data pointer, that references and/or otherwise identifies the data flow 404, a data packet of the data flow 404, etc., and/or a combination thereof.

The DLB 410 dynamically distributes packets to available one(s) of the worker cores 412. For example, the DLB 410 can distribute the enqueued data pointers to available one(s) of the worker cores 412 based on ordered scheduling. In such examples, the available one(s) of the worker cores 412 can dequeue the data pointers from the DLB 410, retrieve data packets that correspond to the dequeued data pointers, and complete operation(s) on the retrieved data packets.

In some examples, the DLB 410 determines that one or more of the worker cores 412 are available to execute a workload based on telemetry data (e.g., a core utilization percentage or parameter, bandwidth, throughput, etc.) associated with the one or more of the worker cores 412. In such examples, the DLB 410 can use ordered queues. For example, the DLB 410 can use ordered queues when there are one or more producers (e.g., one or more producer cores) queueing up to communicate to multiple consumers (e.g., consumer cores) with a requirement to dynamically balance the workload across the multiple consumers and then to restore the original enqueue order.

During the second workflow 400, the available one(s) of the worker cores 412 execute workload(s). For example, the workload(s) can correspond to an IPsec application and, thus, the available one(s) of the worker cores 412 can authenticate, encrypt, and/or decrypt the data packets of the data flow 404. Additionally or alternatively, the available one(s) of the worker cores 412 may execute any other type of computing task (e.g., deep packet inspection, firewall functions or tasks, an ordering of bids in an online or streaming auction, etc.).

During the second workflow 400, the available one(s) of the worker cores 412 transmit, deliver, and/or otherwise provide data pointers identifying the processed data packets to the DLB 410 for reordering and/or aggregation. For example, the DLB 410 can reorder and/or aggregate data packets by reordering and/or aggregating the data pointers that correspond to the data packets. In response to the reordering and/or the aggregation of the data pointers, the DLB 410 dequeues the reordered and/or aggregated data pointers to the consumer core 414 to cause the consumer core 414 to transmit the corresponding processed data packets for distribution, transmission, etc., to different hardware, firmware, software, and/or otherwise a different logic entity.

Figure 6:
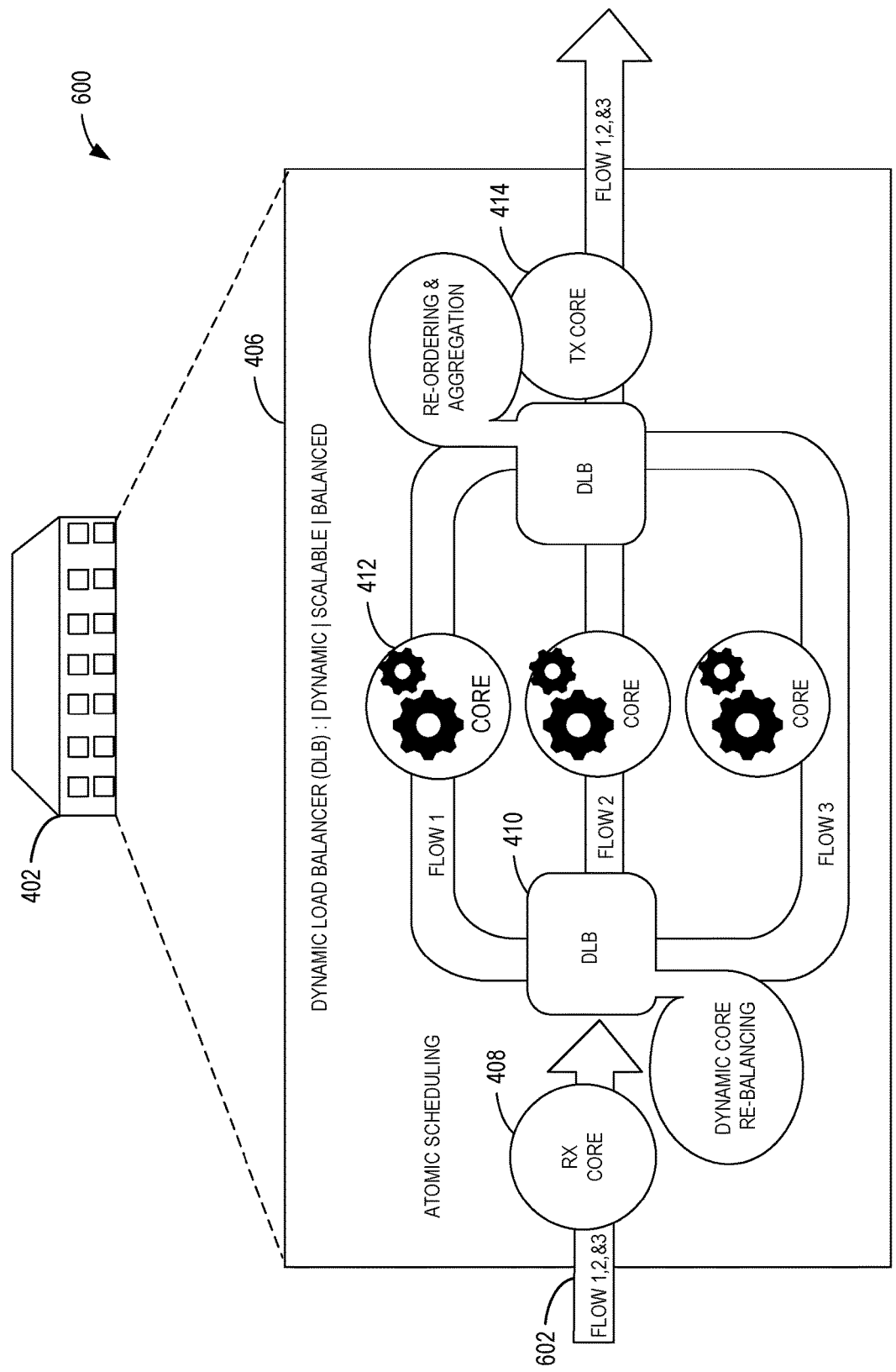
FIG. 6 is an illustration of a third example workflow based on atomic scheduling executed by the example multi-core computing system of FIGS. 1 and/or 2 to process example data flows.

FIG. 6 is an illustration of a third example workflow 600 executed by the multi-core computing system 402 of FIG. 4 based on atomic scheduling. For example, the DLB 410 can use atomic queues to enqueue data pointers from the producer core 408 and/or dequeue data pointers to the consumer core 414. In such examples, the DLB 410 uses atomic queues when one or more producers are queueing up to communicate to multiple consumers with a requirement to balance a workload across the multiple consumers with dynamic consumer affinity based on a flow identifier (e.g., a data flow identifier). For example, the producer core 408 can obtain example data flows (FLOW 1, 2, & 3) 602 from a producer (e.g., the NIC 316 of FIG. 3) and the DLB 410 can assign a first flow identifier (FLOW1), a second flow identifier (FLOW2), and a third flow identifier (FLOW3) to a respective one of the data flows 602. In such examples, the DLB 410 can distribute the data flows 602, cause the data flows 602 to be processed (e.g., by one(s) of the worker cores 412), re-order the data flows 602, and/or aggregate the data flows 602 based on the first through third flow identifiers.

The illustrated example of FIG. 6 facilitates and/or otherwise effectuates consumers to operate on per-flow variables without using locks. Consumer affinity is dynamic. For example, the affinity between the flow identifier and a given core (e.g., a producer core, a consumer core, etc.) moves dynamically as the flow identifier appears and disappears from the multi-core computing system 402.

Figure 7:
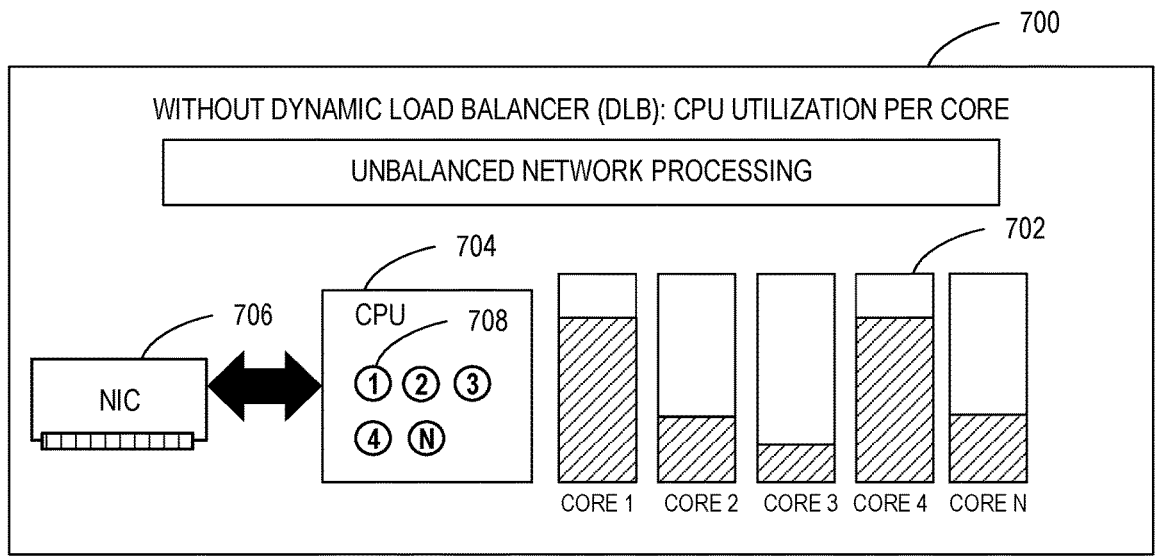
FIG. 7 is an illustration of first example processing core utilization in a central processing unit (CPU).

FIG. 7 is an illustration 700 of first example processing core utilizations 702 in an example central processing unit (CPU) 704 in communication with an example NIC 706. In this example, the CPU 704 does not include a DLB, such as the DLB 202 of FIG. 2, the DLB 304 of FIG. 3, and/or the DLB 410 of FIGS. 4-6. In this example, utilizations of cores 708 of the CPU 704 are not balanced due to the lack of dynamic and scalable load balancing of prior processors. For example, the CPU 704 can statically assign data to the cores 708 to process. In such examples, the utilizations of the cores 708 become unbalanced because the CPU 704 does not assign data to the cores 708 based on the utilizations of the cores 708.

Figure 8:
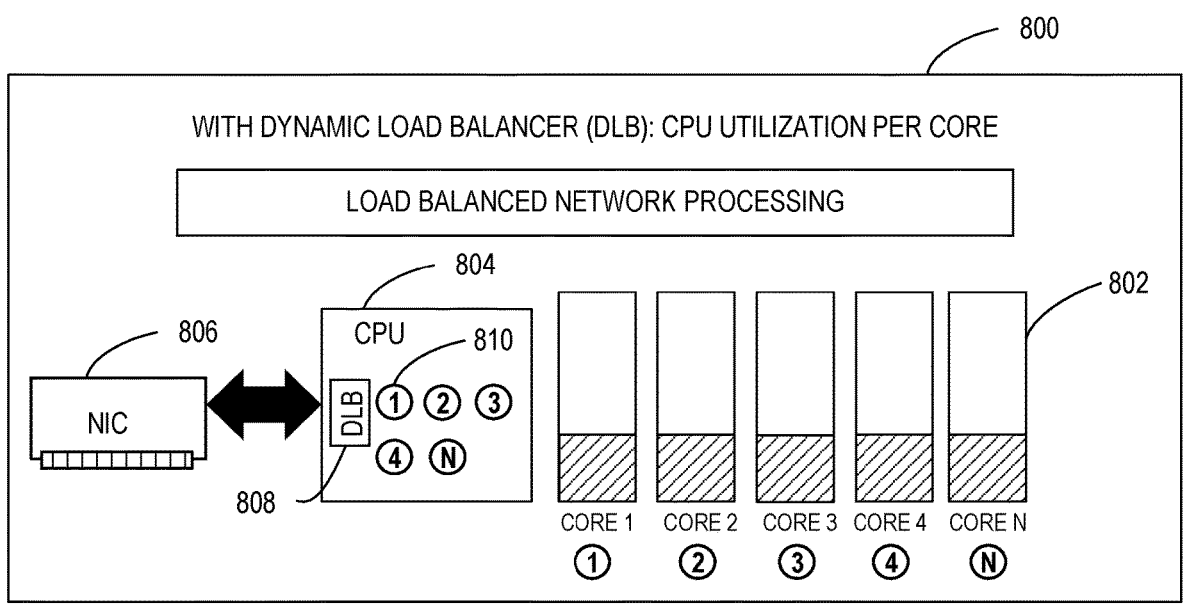
FIG. 8 is an illustration of second example processing core utilization in a CPU that includes one of the example DLBs of FIGS. 2-6.

FIG. 8 is an illustration 800 of second example processing core utilizations 802 for an example CPU 804 in communication with an example NIC 806. In this example, the CPU 804 includes an example DLB 808. The DLB 808 can correspond to and/or otherwise be an example implementation of the DLB 202 of FIG. 2, the DLB 304 of FIG. 3, and/or the DLB 410 of FIGS. 4-6. Advantageously, by utilizing the DLB 808 to facilitate the processing of data packets, utilizations of cores 810 of the CPU 804 are substantially balanced (e.g., each of the cores 810 are within a specified tolerance or threshold utilization value of one or more of the other cores 810, the cores 810 have approximately the same utilization within a tolerance (e.g., +/−1%, +/−2%, etc.). For example, the utilizations of the cores 810 become balanced in response to the DLB 808 dynamically assigning data to the cores 810 based on at least the utilizations of the cores 810.

Figure 9:
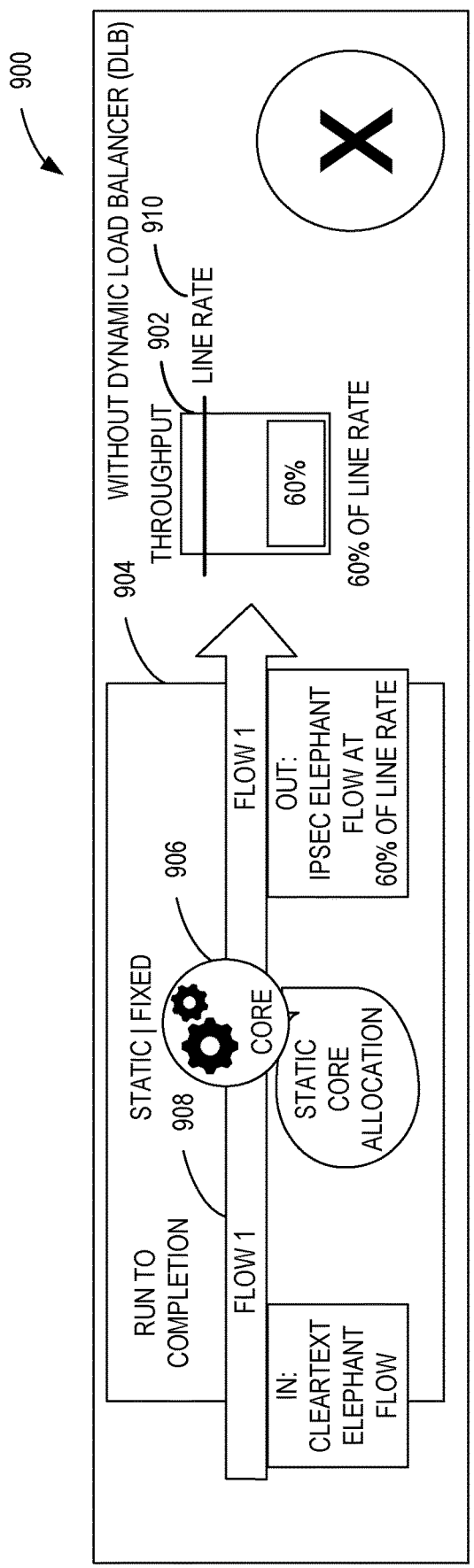
FIG. 9 is an illustration of example throughput in a CPU.

FIG. 9 is an illustration of example throughput 902 in a CPU 904 including a core 906. For example, the CPU 904 may not include a DLB, such as the DLB 202 of FIG. 2, the DLB 304 of FIG. 3, the DLB 410 of FIGS. 4-6, and/or the DLB 808 of FIG. 8. In this example, the CPU 904 obtains a workload (FLOW1) 908 and assigns the core 906 to process the entire workload 908. As a result, the CPU 904 achieves the throughput 902 of 60%, which falls short of a line rate 910 of 100%. In this example, the core 906 and/or, more generally, the CPU 904, operates at 60% of the line rate 910.

Figure 10:
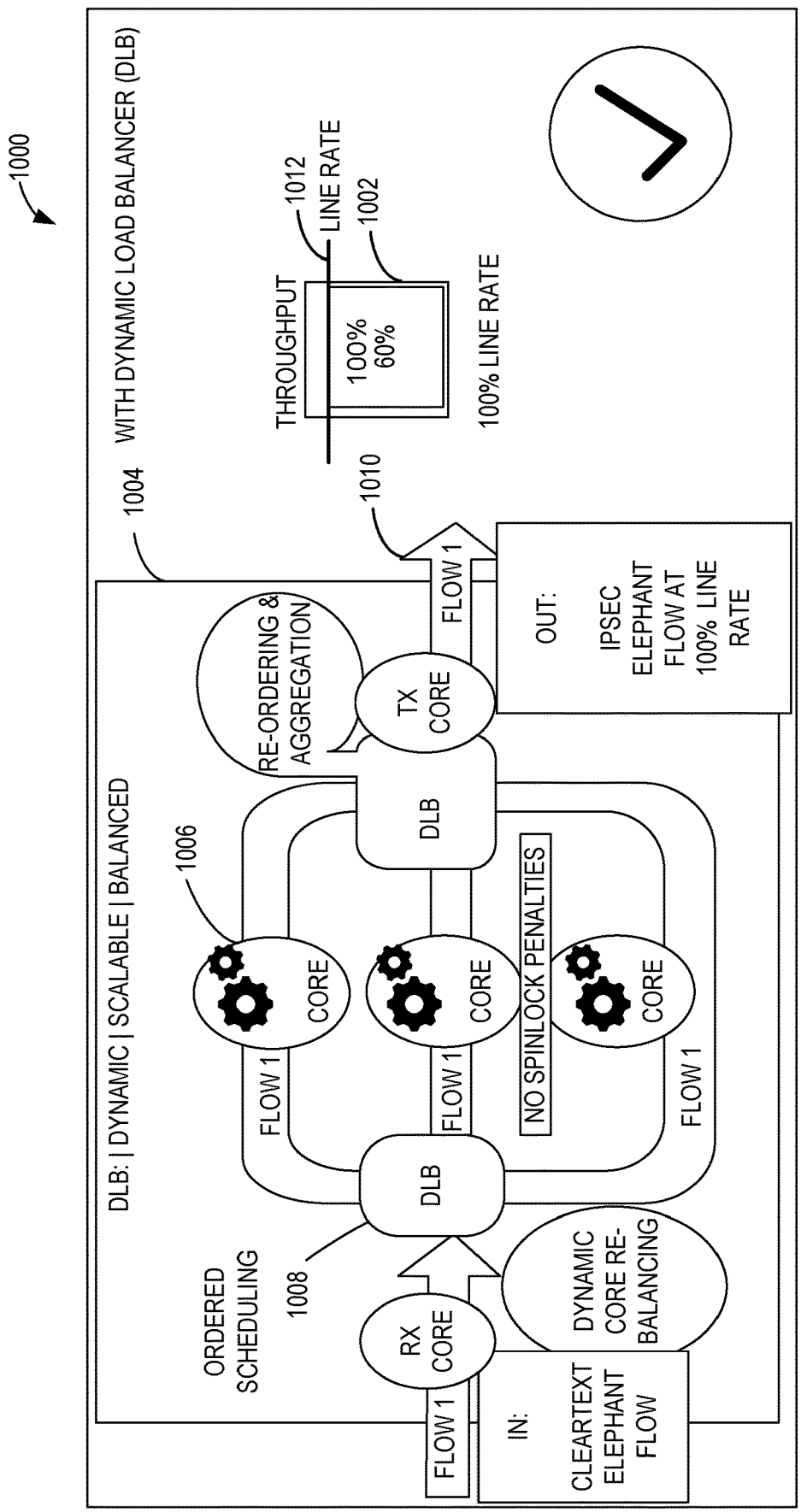
FIG. 10 is an illustration of example throughput in a CPU that includes one of the example DLBs of FIGS. 2-6.

FIG. 10 is an illustration 1000 of example throughput 1002 in an example CPU 1004 that includes a plurality of example worker cores 1006 and an example DLB 1008. For example, the DLB 1008 can correspond to and/or otherwise be an example implementation of the DLB 202 of FIG. 2, the DLB 304 of FIG. 3, the DLB 410 of FIGS. 4-6, and/or the DLB 808 of FIG. 8. In this example, the CPU 1004 obtains an example workload (FLOW1) 1010 and distributes the workload 1010 to one(s) of the worker cores 1006 to process the workload 1010. Advantageously, the CPU 1004 satisfies a throughput threshold (e.g., an example line rate 1012 of 100%). In this example, the DLB 1008 causes the CPU 1004 to satisfy the throughput threshold based on ordered scheduling. Additionally or alternatively, the DLB 1008 may use one or more other types of scheduling such as atomic scheduling. Advantageously, the DLB 1008 executes and/or otherwise processes the workload 1010 without spinlock penalties.

Figure 11:
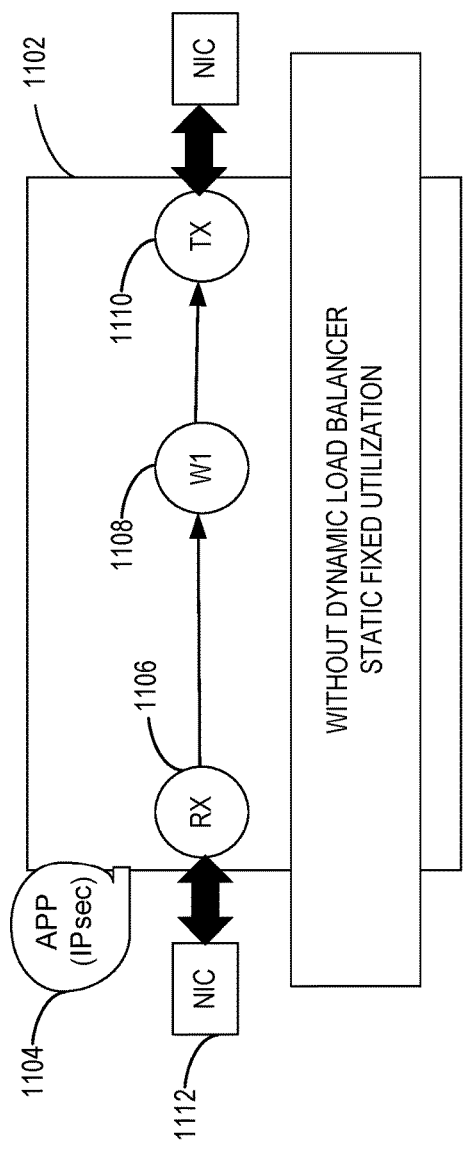
FIGS. 11-13 are illustrations of static fixed core utilization in a CPU.
Figure 12:
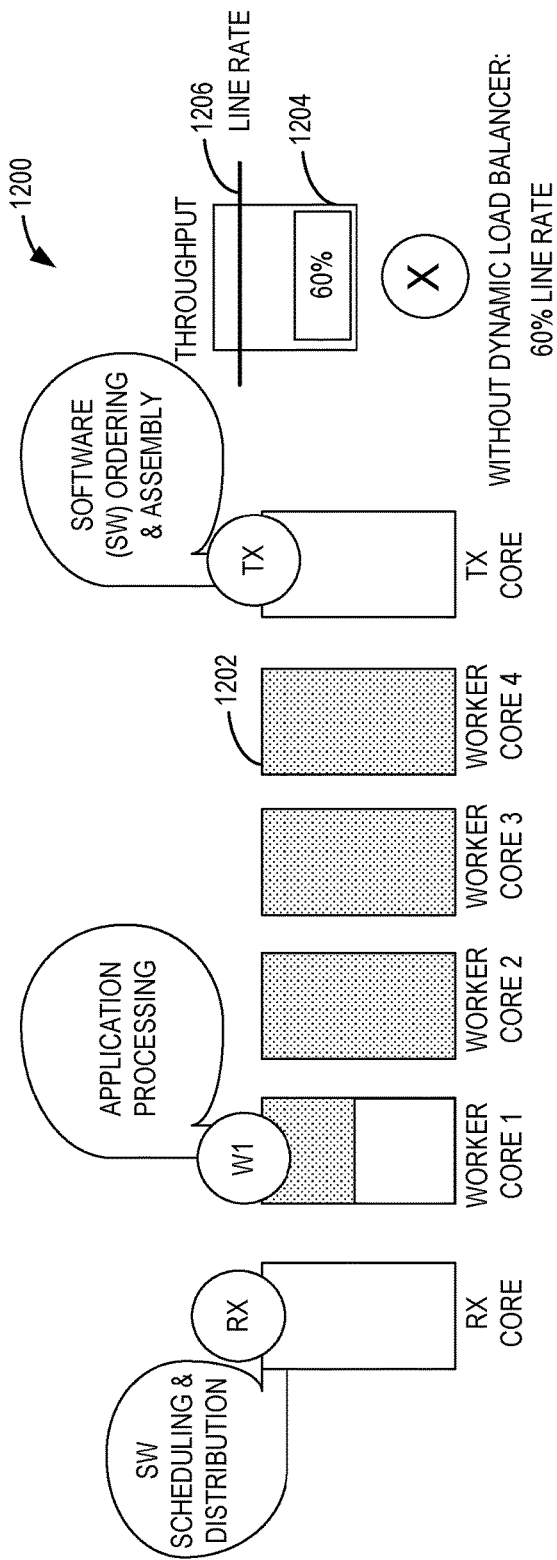
Figure 13:
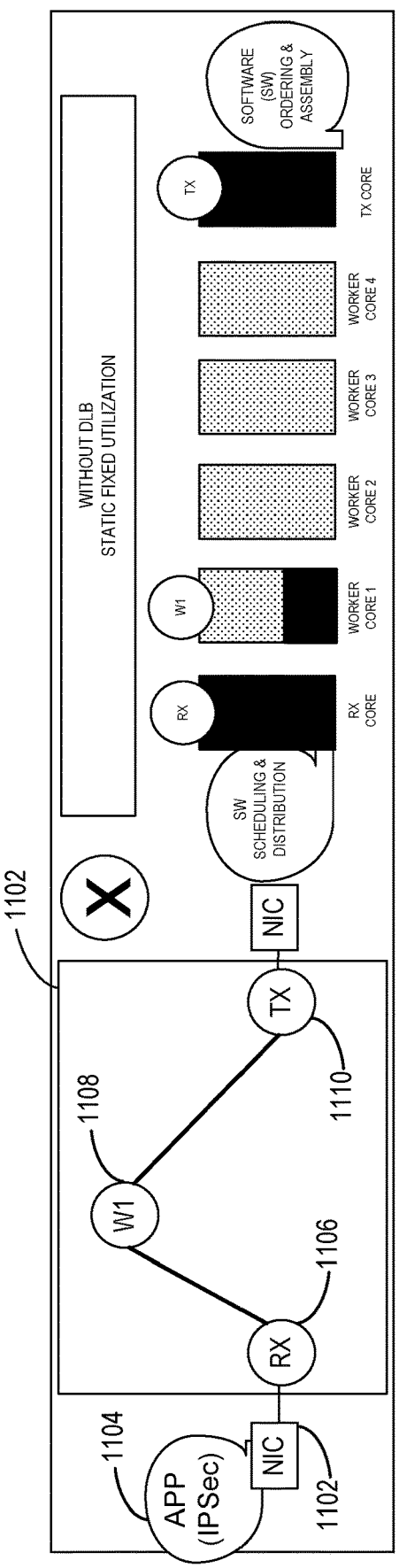

FIGS. 11-13 are illustrations of static fixed core utilization. FIG. 11 is an illustration of static fixed utilization in a CPU 1102 executing and/or otherwise effectuating an application 1104, such as an IPsec application (e.g., authentication, encryption, and/or decryption of data). For example, the CPU 1102 may not include a DLB, such as the DLB 202 of FIG. 2, the DLB 304 of FIG. 3, the DLB 410 of FIGS. 4-6, the DLB 808 of FIG. 8, and/or the DLB 1008 of FIG. 10. The CPU 1102 includes a producer core (RX) 1106, a worker core (W1) 1108, and a consumer core (TX) 1110.

FIG. 12 is an illustration 1200 of example processing core utilizations 1202 associated with the CPU 1102 of FIG. 11. In the examples of FIGS. 11-12, the producer core 1106 is a receive core because the producer core 1106 receives a workload from the NIC 1112. The producer core 1106 executes software scheduling and distribution tasks by assigning a single worker core (e.g., the worker core 1108) to process the entire workload (e.g., executing the processing of the IPsec application). In response to processing the entire workload, the worker core 1108 has a relatively high utilization and the remaining cores (e.g., Worker Core 2 (W2), Worker Core 3 (W3), Worker Core 4 (W4), etc.) are idle. As a result, the CPU 1102 achieves a throughput 1204 of 60% that falls short of a line rate 1206 of 100%.

FIG. 13 is another illustration of static fixed core utilization in the CPU 1102 of FIG. 11. The CPU 1102 may not include a DLB, such as the DLB 202 of FIG. 2, the DLB 304 of FIG. 3, the DLB 410 of FIGS. 4-6, the DLB 808 of FIG. 8, and/or the DLB 1008 of FIG. 10. In response to processing the entire workload, the worker core 1108 has a relatively high utilization and the remaining cores (e.g., Worker Core 2 (W2), Worker Core 3 (W3), Worker Core 4 (W4), etc.) are idle. As a result, the CPU 1102 achieves a throughput that falls short of the line rate of 100%.

Figure 14:
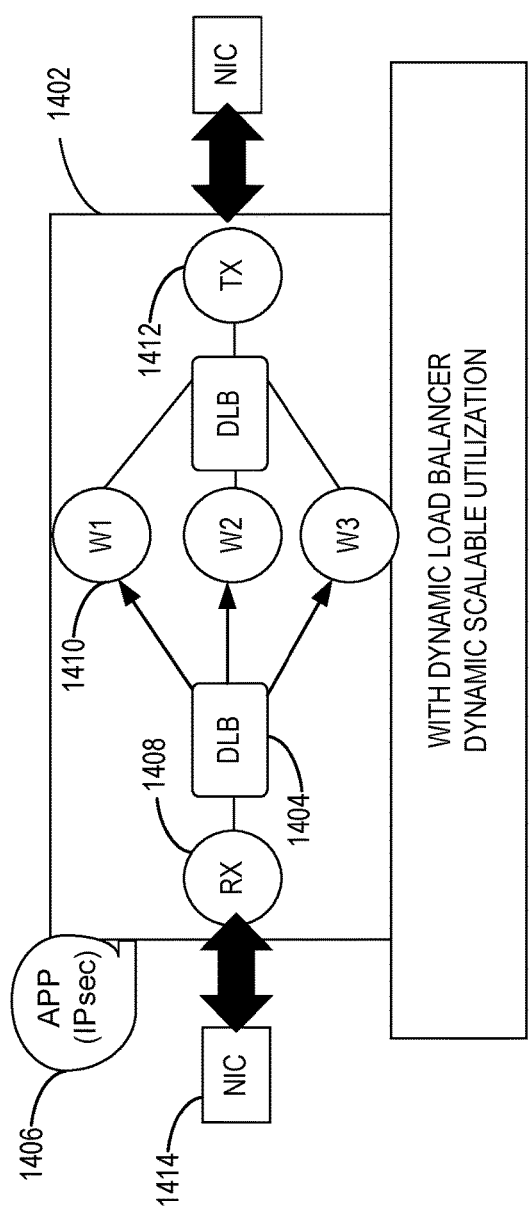
FIGS. 14-16 are illustrations of dynamic scalable core utilization in a CPU that includes one of the example DLBs of FIGS. 2-6.
Figure 15:
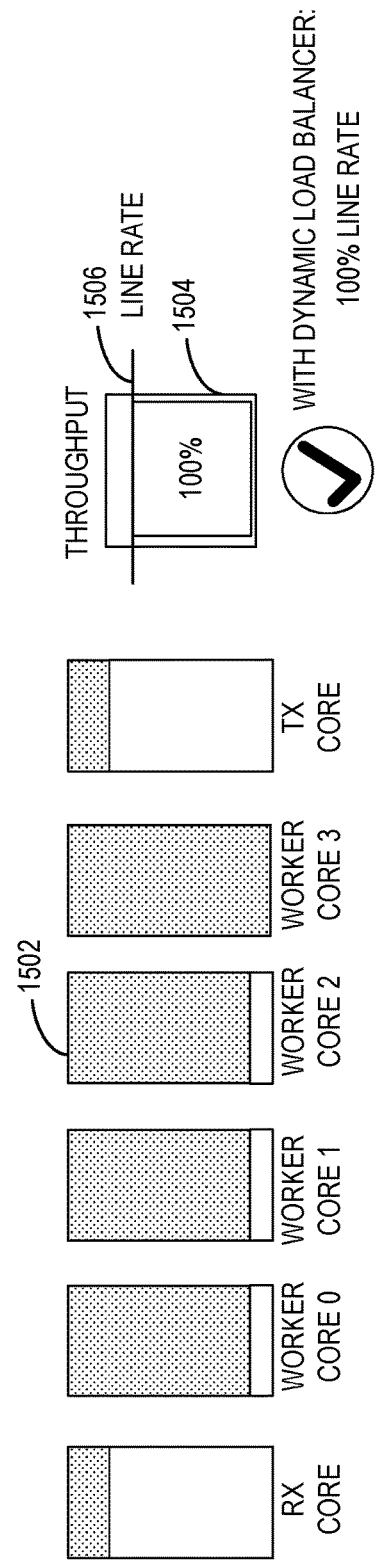

FIGS. 14-15 are illustrations of dynamic scalable core utilization in an example CPU 1402 that includes an example DLB 1404, such as the DLB 202 of FIG. 2, the DLB 304 of FIG. 3, the DLB 410 of FIGS. 4-6, the DLB 808 of FIG. 8, and/or the DLB 1008 of FIG. 10. In this example, the CPU 1402 includes the DLB 1404 to effectuate dynamic scalable utilization of the CPU 1402 executing and/or otherwise effectuating an application 1406, such as an IPsec application (e.g., authentication, encryption, and/or decryption of data). The CPU 1402 includes a producer core (RX) 1408, worker cores (W1, W2, W3) 1410, and a consumer core (TX) 1412. In this example, the CPU 1402 obtains a workload from a NIC 1414 and distributes the workload to ones of the worker cores 1410 to process the workload.

FIG. 15 is an illustration 1500 of example processing core utilizations 1502 associated with the CPU 1402 of FIG. 14. Advantageously, a throughput 1504 of the CPU 1402 satisfies a throughput threshold (e.g., an example line rate 1506 of 100%) based on the dynamic and scalable distribution of the workload to a plurality of the worker cores 1410. In response to ones of the worker cores 1410 processing the workload, the ones of the worker cores 1410 have relatively low utilizations and a substantially similar utilization to each other. Advantageously, the CPU 1402 achieves the throughput 1504 of 100% as depicted in the example of FIG. 15.

Figure 16:
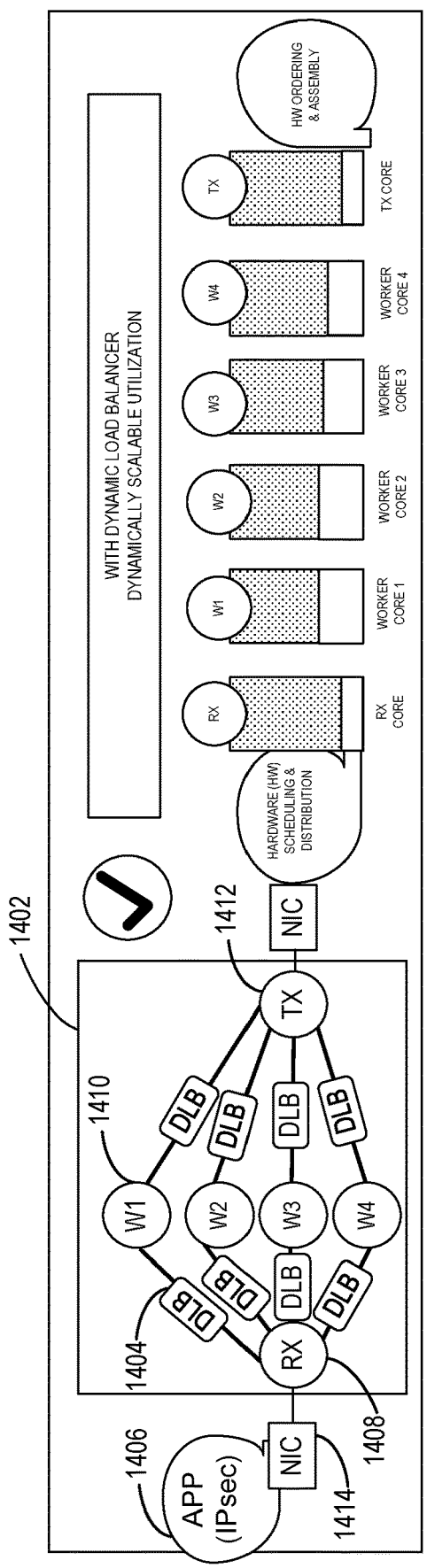

FIG. 16 is an illustration of dynamic scalable core utilization in the CPU 1402 of FIG. 14 that includes the DLB 1404. Although in FIG. 16 the DLB 1404 is depicted as having multiple instances, there is only one DLB 1404 in operation. For example, a single instance of the DLB 1404 can enqueue workloads from the producer core 1408 and dequeue the workloads to the worker cores 1410. In such examples, the DLB 1404 can enqueue the completed workloads from the worker cores 1410 and dequeue the completed workloads to the consumer core 1412. In some examples, more than one instance of the DLB 1404 may be used to improve scheduling and distribution of workloads.

The producer core 1408 executes hardware scheduling and distribution tasks by assigning multiple available ones of the worker cores 1410 to process the workload (e.g., execute the processing of the application 1406). In response to processing the workload with multiple ones of the worker cores 1410, the utilized ones of the worker cores 1410 have relatively low utilizations that are substantially similar to each other. Advantageously, the CPU 1402 achieves a throughput 1204 of 100% that meets and/or otherwise satisfies a desired or intended line rate of 100%.

FIG. 17 is a table 1700 depicting example throughput parameters (e.g., packet size in bytes, line rate in millions of packets per second (mpps), processed packets in mpps, etc.) based on a CPU with and without the DLB 202 of FIG. 2, the DLB 304 of FIG. 3, the DLB 410 of FIGS. 4-6, the DLB 808 of FIG. 8, the DLB 1008 of FIG. 10, and/or the DLB 1404 of FIG. 14. In this example, for a packet size of 512 bytes, a CPU without a DLB, such as the CPU 1102 of FIG. 11, can process 3.19 mpps for a throughput of 60%. Advantageously, a CPU that includes a DLB, such as the CPU 1402 of FIG. 14, can process more packets per second and/or have a higher throughput compared to the CPU that does not include the DLB. Advantageously, as demonstrated by data set forth in the table 1700 of FIG. 17, the DLB can increase the throughput from 44% to 89% to 100% by increasing the number of worker cores allocated to process a workload, such as executing an IPsec application, effectuating a streaming online auction, etc.

Figure 18:
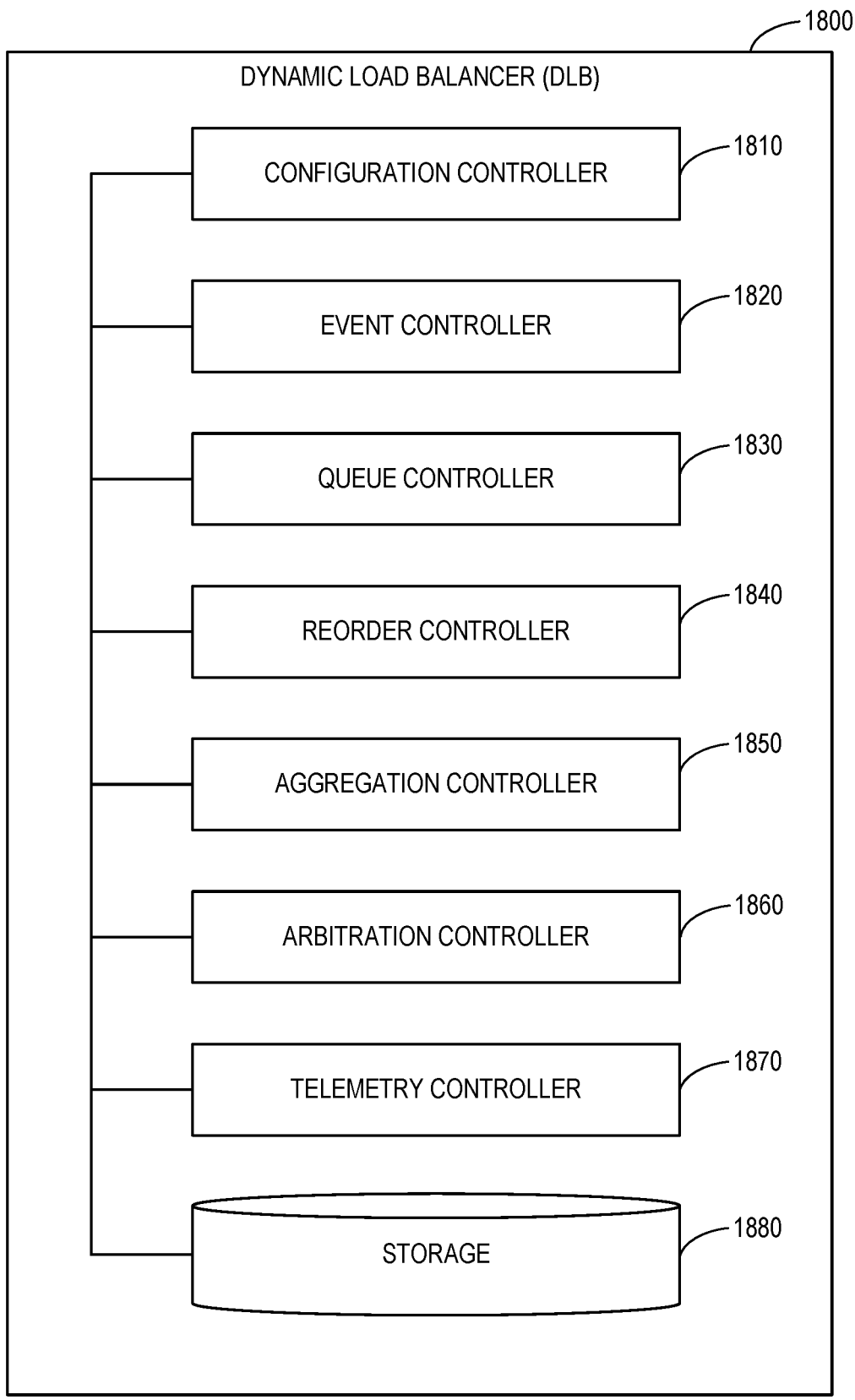
FIG. 18 is a block diagram of an example implementation of one(s) of the DLBs of FIGS. 2-6.

FIG. 18 is a block diagram of an example DLB 1800. In some examples, the DLB 1800 of FIG. 18 is an example implementation of the DLB 202 of FIG. 2, the DLB 304 of FIG. 3, the DLB 410 of FIGS. 4-6, the DLB 808 of FIG. 8, the DLB 1008 of FIG. 10, and/or the DLB 1404 of FIG. 14. The DLB 1800 includes an example configuration controller 1810, an example event controller 1820, an example queue controller 1830, an example reorder controller 1840, an example aggregation controller 1850, an example arbitration controller 1860, an example telemetry controller 1870, and example storage 1880.

In the illustrated example of FIG. 18, the DLB 1800 includes the configuration controller 1810 to adjust, modify, and/or otherwise control a configuration of the DLB 1800. For example, the configuration controller 1810 can configure one or more components (e.g., hardware, firmware, and/or software components), elements (e.g., hardware, firmware, and/or software elements), etc., of the DLB 1800. In some examples, the configuration controller 1810 adjusts a configuration of the DLB 1800 into a DLB. For example, the configuration controller 1810 can invoke the DLB 1800 to execute, perform, and/or otherwise effectuate load balance operations associated with a multi-core computing system (e.g., the multi-core computing system 200, 302, 402 of FIGS. 2-6).

In some examples, the configuration controller 1810 configures hardware or portion(s) thereof of the DLB 1800, such as at least one of producer port(s), reorder logic, queue(s) (e.g., storage queue(s)), arbiter(s) or arbiter logic, etc. For example, the configuration controller 1810 can configure a producer port of the DLB 1800 as a direct port, a load balanced port, etc. In other examples, the configuration controller 1810 can configure a queue as a direct queue, an unordered queue, an ordered queue, an atomic queue, etc. In yet other examples, the configuration controller 1810 can configure an arbiter as a first stage arbiter, a second stage arbiter, etc.

In the illustrated example of FIG. 18, the DLB 1800 includes the event controller 1820 to identify an event and facilitate the execution of computing tasks associated with the event. For example, the event controller 1820 can receive an event (EVENT_DEV). Responsive to the event, the event controller 1820 can extract data from the event, such as a data pointer, that references and/or otherwise identifies a data flow, a data packet of the data flow, etc., and/or a combination thereof.

In some examples, the event controller 1820 implements front-end logic (e.g., front-end logic circuitry) of the DLB 1800 that can interface with a NIC, a producer core, etc. In some examples, the event controller 1820 can identify the data flow as an elephant flow, a fat flow, etc., based on the event. For example, the event controller 1820 can identify an incoming elephant flow from a NIC and invoke the queue controller 1830 and/or, more generally, the DLB 1800, to begin processing computing tasks associated with the incoming elephant flow, such as identifying queues to store data pointers, identifying available one(s) of worker cores, etc., and/or a combination thereof.

In some examples, the event controller 1820 invokes an action in connection with an event based on information associated with the event. For example, the event controller 1820 can obtain a data pointer included in data associated with the event, included in the event, etc. The event controller 1820 can inspect the event to determine a priority of the data packet, whether the data packet is associated with a known data flow, etc. In response to an inspection of the event, the event controller 1820 can invoke an action such as directing one of the producer ports to transmit the data pointer to reorder logic, to one of the queues of the DLB, from one of the queues to either a first stage arbiter or a second stage arbiter, etc., and/or a combination thereof.

In some examples, the event controller 1820 packs multiple QEs into a cache line for mesh bandwidth efficiency. For example, the event controller 1820 can generate a first 16 B QE (e.g., a 16 B HCW as described below in FIG. 35) based on a first event, a second 16 B QE based on a second event, etc. In such examples, the event controller 1820 can pack and/or otherwise assemble four of the 16 B QEs into 64 B cache lines (e.g., a 64 B storage unit). In response to filling the 64 B cache lines, the event controller 1820 can execute a memory instruction. For example, the event controller 1820 can execute a LFENCE, a MFENCE, a SFENCE, etc., instruction to move the 64 B cache lines into a queue maintained by the queue controller 1830. In some examples, the event controller 1820 executes a move data instruction. For example, the event controller 1820 can execute the move data instruction by moving a double quadword from a source operand to a destination operand using a MOVDQA instruction.

In some examples, the event controller 1820 manages and/or otherwise controls a hardware-based crediting scheme, a software-based crediting scheme, a token management scheme, etc., and/or a combination thereof. For example, the event controller 1820 can identify a data source (e.g., a NIC, a core, a network, etc.) of the data pointer (e.g., the identifier) based on data stored in the event. In such examples, the event controller 1820 can determine whether the data source has a producer credit. In some examples, the queue controller 1830 enqueues the data pointer to the queue in response to the event controller 1820 determining that the data source has the producer credit. In such examples, the event controller 1820 can deduct the producer credit from a number of producer credits associated with the data source in response to the enqueuing. In some such examples, the number of producer credits are stored in system or main memory. In some examples, in response to the distribution of the data packet associated with the data pointer, the event controller 1820 adds the producer credit to the number of the producer credits.

In the illustrated example of FIG. 18, the DLB 1800 includes the queue controller 1830 to control queue operations such as enqueueing data from a producer core and/or dequeuing data to a worker core. In some examples, the queue controller 1830 generates, maintains, and/or otherwise operates a queue stored in the DLB 1800 for scheduling computing tasks, operations, etc., associated with an application, such as an IPsec application, an online auction application, etc. For example, the queue controller 830 can enqueue data from the producer core 310 of FIG. 3, dequeue data to ones of the worker cores 314 of FIG. 3, enqueue data from the ones of the worker cores 314, and/or dequeue data to the consumer core 312 of FIG. 3.

In some examples, the queue controller 1830 obtains data pointers from the event controller 1820, the reorder controller 1840 etc., and stores the data pointers into a tail pointer of a queue. In some examples, the queue controller 1830 transmits the data pointers to the arbitration controller 1860. In some examples, the queue controller 1830 invokes the arbitration controller 1860 to obtain the data pointers from a head pointer of a queue. In some examples, the queue controller 1830 implements a hardware-managed queue stored in the DLB 1800.

In some examples, the queue controller 1830 configures a queue to process a queue operation. For example, the queue controller 1830 can configure a queue to be an unordered queue, an ordered queue, an atomic queue, etc. In some examples, the queue controller 1830 generates identifiers (e.g., flow identifiers, data flow identifiers, queue identifiers, etc.) to facilitate the execution of workloads of interest.

In some examples, the queue controller 1830 configures a queue to be an unordered queue in response to one or more producers queueing up to communicate to multiple consumers with a requirement to balance a workload across the multiple consumers (e.g., without dynamic consumer affinity). For example, the queue controller 1830 can implement the unordered queue as a first-in first-out (FIFO) queue, a last-in first-out (LIFO) queue, etc.

In some examples, the queue controller 1830 configures a queue as an ordered queue in response to one or more producers queueing up to communicate to multiple consumers with a requirement to dynamically balance the work across the multiple consumers and then to restore the original enqueue order. For example, the queue controller 1830 can implement the ordered queue as a queue based on ordered tracking. In such examples, data can be processed out-of-order of an original sequence but can later be re-ordered into the original sequence by the reorder controller 1840.

In some examples, the queue controller 1830 configures a queue as an atomic queue in response to one or more of the producers queueing up to communicate to multiple consumers with a requirement to balance a workload across the multiple consumers with dynamic consumer affinity based on a flow identifier. Advantageously, the queue controller 1830 configuring the queue as an atomic queue effectuates the consumers to operate on per-flow variables without using locks. Consumer affinity is dynamic. For example, the affinity between the flow identifier and a given core (e.g., a producer core, a worker core, a consumer core, etc.) moves dynamically as the flow identifier appears and disappears from the multi-core computing system.

In the illustrated example of FIG. 18, the DLB 1800 includes the reorder controller 1840 to control data reordering operations associated with a workload. For example, the reorder controller 1840 can execute a reordering operation in connection with obtained and/or otherwise received events. In some examples, the reorder controller 1840 can reorder processed data obtained from a worker core, such as one of the worker cores 412 of FIG. 4. For example, the reorder controller 1840 can obtain unordered data and order the unordered data based on an identifier (e.g., a queue identifier, a flow identifier, etc.) associated with the unordered data.

In some examples, the reorder controller 1840 generates, maintains, and/or otherwise operates a buffer (e.g., a reorder buffer) to store enqueued data prior to moving the enqueued data to a different queue. For example, the reorder controller 1840 can reorder data packets that have been processed separately and/or out-of-order into a single stream for a subsequent task (e.g., a reception or transmission of the stream). In such examples, the reorder controller 1840 can reorder the data packets by reordering the corresponding data pointers. In some examples, the reorder controller 1840 implements reorder logic, such as reorder logic circuitry.

In the illustrated example of FIG. 18, the DLB 1800 includes the aggregation controller 1850 to control data aggregation operations associated with a workload. In some examples, the aggregation controller 1850 can aggregate processed data obtained from a worker core, such as one of the worker cores 412 of FIG. 4. For example, the aggregation controller 1850 can obtain data from the worker cores 412 and package the obtained data into a compiled data stream ready for transmission to different hardware, software, and/or firmware.

In the illustrated example of FIG. 18, the DLB 1800 includes the arbitration controller 1860 to facilitate processing of events based on priority. In some examples, the event controller 1820 can determine that an event is associated with one or more data packets having a priority value. In such examples, the event controller 1820 can determine that one or more data pointers included in the event that correspond to the one or more data packets have the priority value. In some such examples, the arbitration controller 1860 can retrieve the one or more data pointers from a queue based on the priority value. For example, the arbitration controller 1860 can implement a multiple-stage priority arbiter, where the one or more data pointers can be directed to one or more stages of the multiple-stage priority arbiter based on the priority value associated with the event. In some examples, the arbitration controller 1860 implements a first stage arbiter, a second stage arbiter, etc.

In some examples, the arbitration controller 1860 allocates one or more cores to dequeue identifiers from the queue (e.g., from one of the queues 2214 of FIG. 22) in response to the throughput parameter not satisfying a throughput threshold. In such examples, responsive to the allocation, the arbitration controller 1860 can cause the one or more cores to execute one or more operations on data packets, which correspond to the dequeued identifiers.

In the illustrated example of FIG. 18, the DLB 1800 includes the telemetry controller 1870 to obtain telemetry data and determine telemetry parameters based on the obtained telemetry data. In some examples, the telemetry controller 1870 obtains telemetry data from a core of a multi-core processor, such as the producer core 408, one(s) of the worker cores 412, the consumer core 414, etc., of FIGS. 4-6. For example, the telemetry controller 1870 can obtain telemetry data from a core, such as bandwidth, idle time, latency, throughput, utilization, etc., and/or a combination thereof of the core.

In some examples, the telemetry controller 1870 determines a telemetry parameter based on the telemetry data. For example, the telemetry controller 1870 can determine a first telemetry parameter, such as a core utilization parameter, based on utilization telemetry data from the core. In such examples, the core utilization parameter is a utilization percentage of the core, which is indicative of an availability of the core to execute a workload. In some such examples, the telemetry controller 1870 can obtain utilization telemetry data from one of the worker cores 412, determine a core utilization parameter of 10%, and determine that the core is underutilized because the core is only 10% utilized. In some such examples, the telemetry controller 1870 can identify the one of the worker cores 412 as available to receive a workload based on the core utilization parameter. For example, the telemetry controller 1870 can identify the one of the worker cores 412 as available to receive the workload based on the core utilization parameter of 10% being less than a core utilization threshold of 20%, 30%, etc., thereby satisfying the core utilization threshold.

In the illustrated example of FIG. 18, the DLB 1800 includes the storage 1880 to record and/or otherwise store data. For example, the storage 1880 can store configuration data or information (e.g., a configuration of the DLB 1800, a configuration of a queue, etc.), a credit count or total (e.g., a hardware credit, a software credit, a total number of used or unused credits, etc.), a data pointer, a data queue, event data or information, an identifier (e.g., a flow identifier, a queue identifier, etc.), telemetry data or information, etc. The storage 1880 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The storage 1880 may additionally or alternatively be implemented by one or more double data rate (DDR) memories, such as DDR, DDR2, DDR3, DDR4, mobile DDR (mDDR), etc. The storage 1880 may additionally or alternatively be implemented by one or more mass storage devices such as hard disk drive(s), compact disk drive(s), digital versatile disk drive(s), solid-state disk drive(s), etc. While in the illustrated example the storage 1880 is illustrated as a single instance of storage, the storage 1880 may be implemented by any number and/or type(s) of storage. Furthermore, the data stored in the storage 1880 may be in any data format such as, for example, binary data, comma delimited data, tab delimited data, structured query language (SQL) structures, etc.

While an example manner of implementing a DLB, such as the DLB 202 of FIG. 2, the DLB 304 of FIG. 3, the DLB 410 of FIGS. 4-6, the DLB 808 of FIG. 8, the DLB 1008 of FIG. 10, and/or the DLB 1404 of FIG. 14, is illustrated in FIG. 18, one or more of the elements, processes and/or devices illustrated in FIG. 18 may be combined, divided, re-arranged, omitted, eliminated and/or implemented in any other way. Further, the example configuration controller 1810, the example event controller 1820, the example queue controller 1830, the example reorder controller 1840, the example aggregation controller 1850, the example arbitration controller 1860, the example telemetry controller 1870, the example storage 1880 and/or, more generally, the example DLB 1800 of FIG. 18 may be implemented by hardware, software, firmware and/or any combination of hardware, software and/or firmware. Thus, for example, any of the example configuration controller 1810, the example event controller 1820, the example queue controller 1830, the example reorder controller 1840, the example aggregation controller 1850, the example arbitration controller 1860, the example telemetry controller 1870, the example storage 1880 or, more generally, the example DLB 1800 could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration controller 1810, the example event controller 1820, the example queue controller 1830, the example reorder controller 1840, the example aggregation controller 1850, the example arbitration controller 1860, the example telemetry controller 1870, and/or the example storage 1880 is/are hereby expressly defined to include a non-transitory computer readable storage device or storage disk such as a memory, a digital versatile disk (DVD), a compact disk (CD), a Blu-ray disk, etc. including the software and/or firmware. Further still, the example DLB 202 of FIG. 2, the example DLB 304 of FIG. 3, and/or the example DLB 410 of FIGS. 4-6 may include one or more elements, processes and/or devices in addition to, or instead of, those illustrated in FIG. 18, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 19:
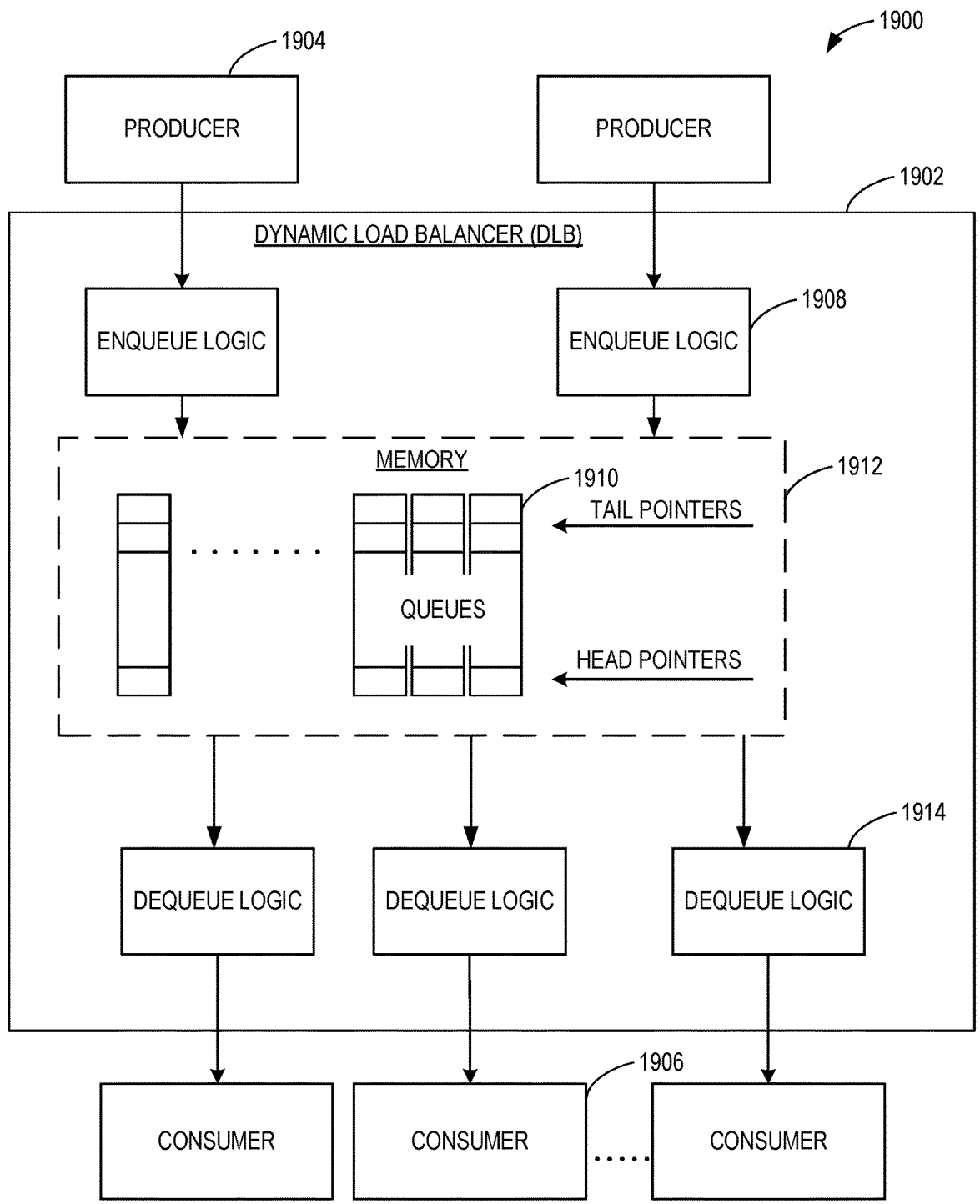
FIG. 19 is an illustration of an example producer and consumer scheduling system including one of the DLBs of FIGS. 2-6 and/or 18.

FIG. 19 is an illustration of an example producer and consumer scheduling system 1900 executed using an example DLB 1902. In this example, the DLB 1902 is hardware. For example, the DLB 1902 can be implemented by circuitry, such as one or more analog or digital circuit(s), logic circuits, programmable processor(s), programmable controller(s), GPU(s), DSP(s), ASIC(s), PLD(s), and/or FPLD(s). In such examples, the DLB 1902 can be implemented by hardware, software, firmware and/or any combination of hardware, software and/or firmware.

In the illustrated example of FIG. 19, the system 1900 includes the DLB 1902, example producers 1904, and example consumers 1906. In this example, the producers 1904 are cores (e.g., producer cores) of a multi-core processor, such as ones of the producer core 408 of the processor 406 of FIGS. 4-6. In this example, the consumers 1906 are cores (e.g., consumer cores) of a multi-core processor, such as ones of the consumer core 414 of the processor 406 of FIGS. 4-6

In the illustrated example of FIG. 19, the DLB 1902 includes example enqueue logic 1908 to obtain data (e.g., a data pointer) from the producers 1904 and store the data in one or more example queues 1910 stored in example memory 1912 of the DLB 1902. In this example, the queues 1910 implement a storage queue (e.g., an internal storage queue, an internal store queue, etc.). In this example, the DLB 1902 includes example dequeue logic 1914 to retrieve the data from the queues 1910 and provide the retrieved data to the consumers 1906 to execute a computing task in connection with the data.

In this example, the enqueue logic 1908 and/or the dequeue logic 1914 is/are hardware. For example, the enqueue logic 1908 and/or the dequeue logic 1914 can be implemented by one or more analog or digital circuit(s), logic circuits, programmable processor(s), programmable controller(s), GPU(s), DSP(s), ASIC(s), PLD(s), and/or FPLD(s). In such examples, the enqueue logic 1908 and/or the dequeue logic 1914 can be implemented using purpose-built gates to facilitate computing tasks in connection with the data identified by the producer 1904.

In some examples, the enqueue logic 1908 and/or the dequeue logic 1914 can be implemented by hardware, software, firmware and/or any combination of hardware, software and/or firmware. Advantageously, by replacing enqueuing functions typically implemented in software with the enqueue logic 1908 and/or replacing dequeuing functions typically implemented in software with the dequeue logic 1914, the DLB 1902 can facilitate performance gains of the system 1900 by freeing core cycles to do different computing tasks, facilitating lock-free access, reduction in polling, reducing an impact of memory and caching behaviors, facilitating high-queuing throughput, and achieving improved load balance across the consumers 1906.

In the illustrated example of FIG. 19, the queues 1910 are protected by credits, or a credit-based protection schema. In some examples, the producers 1904 must have a credit, a token, etc., available prior to performing an enqueue (e.g., an enqueue operation, an enqueue task, etc.) to the DLB 1902. In response to the DLB 1902 executing the enqueue, a credit count associated with the enqueueing one of the producers 1904 is decremented. For example, the producer 1904 can decrement a local credit count maintained by the producer 1904 or a different entity. In such examples, the DLB 1902 maintains track of the credits and updates a per-producer available credit count in the memory 1912 or main or system memory (e.g., memory external to the DLB 1902), which the producer 1904 can read to replenish the local credit count of the producer 1904.

In some examples, each of the producers 1904 have two sets of credits. A first set of credits can correspond to directed credits for enqueuing to directed queues. A second set of credits can correspond to load-balanced credits for enqueuing to load-balanced queues. Directed queues and load-balanced queues are described below in further detail in connection with FIG. 24 and/or FIGS. 25A-25D.

In some examples, the DLB 1902 uses control registers to map each of the queues 1910 to one or more of the consumers 1906. The DLB 1902 can examine, determine, and/or otherwise analyze a state of the queues 1910 and select a queue element (QE) stored in one of the queues 1910 for dequeue. For each of the consumers 1906, the DLB 1902 can write a small ring in the memory 1912 of the dequeued QE. In such examples, the ring can be implemented as a fixed-size FIFO with data stored in order in adjacent memory locations (e.g., no next data pointers).

Advantageously, by writing the small ring in the memory 1912 of the dequeued QE, the DLB 1902 can improve dequeue latency observed by the consumer 1906. The consumer 1906 can own a head pointer of the queues 1910 while the DLB 1902 can own a tail pointer of the queues 1910 as both the consumer 1906 and the DLB 1902 know a range of base addresses, lengths, etc., of the queues 1910.

Figure 20:
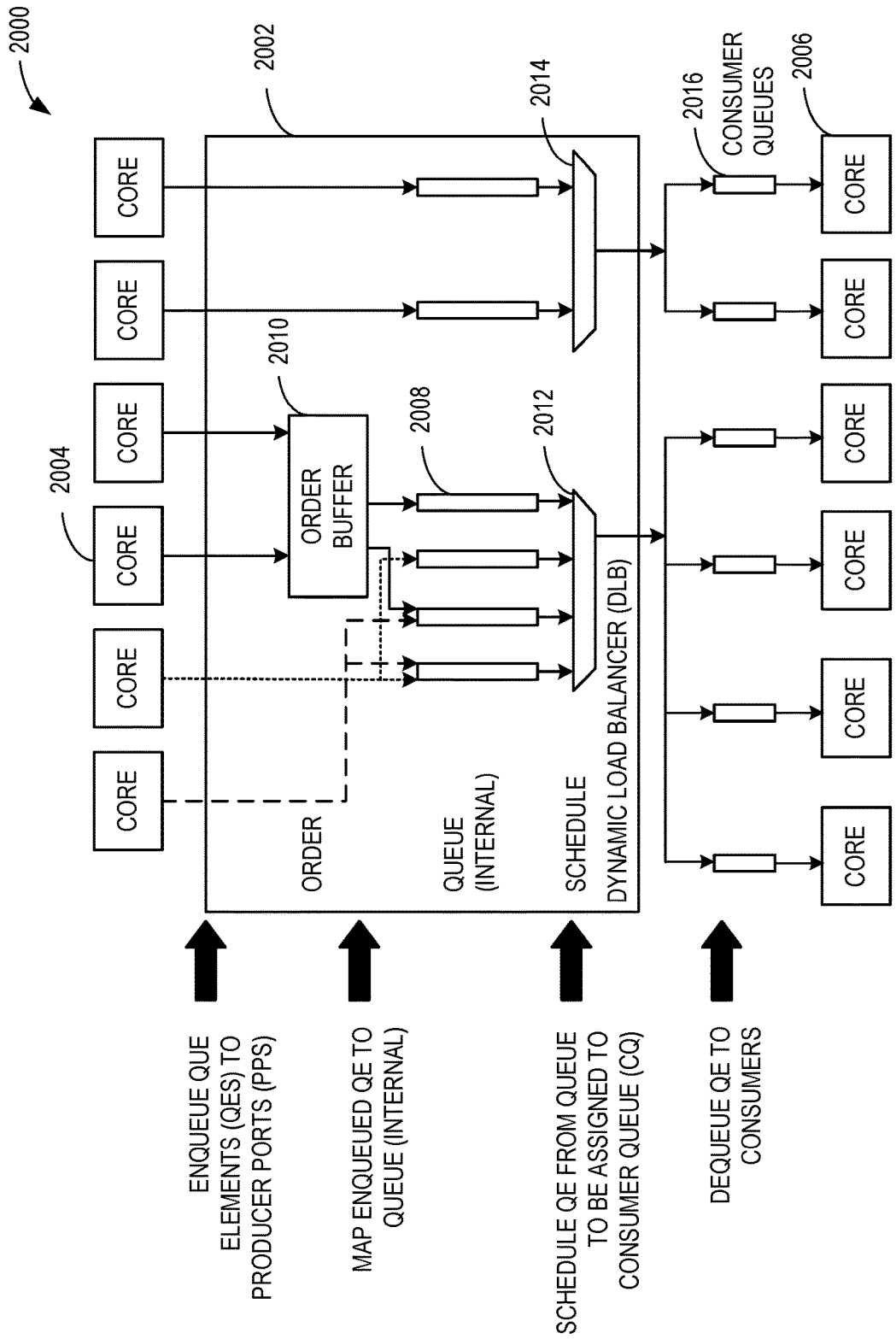
FIG. 20 is an illustration of one of the DLBs of FIGS. 2-6, 18, and/or 19 facilitating a scheduling of computing tasks across a multi-core computing architecture.

FIG. 20 is an illustration of one of the DLBs of FIGS. 2-6, 18, and/or 19 facilitating a scheduling of computing tasks across a multi-core computing architecture with a first example hardware queue scheduling or management system 2000 including an example DLB 2002. For example, the DLB 2002 can be an example implementation of the DLB 1800 of FIG. 18 and/or the DLB 1902 of FIG. 19.

In the illustrated example of FIG. 20, the first hardware queue scheduling system 2000 includes example producer cores 2004 and example consumer cores 2006. In this example, the DLB 2002 is in communication with the producer cores 2004 and the consumer cores 2006. In example operation, the producer cores 2004 enqueue data to the DLB 2002 by writing an event (e.g., a queue event, EVENT_DEV, etc.) to a producer port address in a memory-mapped I/O (MMIO) space of the DLB 2002 (e.g., in the memory 1912 of FIG. 19).

In this example, the DLB 2002 uses an incoming QE to map to an example queue (e.g., internal queue) 2008. The DLB 2002 maps the incoming QE to a tail (e.g., an end) of the queue 2008. In some examples, the QE can be buffered in an example order buffer 2010 waiting for previously ordered QEs (e.g., QEs associated with the incoming QE) to arrive and/or otherwise be enqueued at the producer ports.

In the illustrated example of FIG. 20, example arbiters 2012, 2014 schedule computing tasks by mapping data in a head (e.g., a beginning) of the queue 2008 to example consumer queues 2016. For example, the arbiters 2012, 2014 can determine scheduling inputs to include states of the internal queue 2008. In some examples, each of the arbiters 2012, 2014 can select one QE per round (e.g., a schedule round) to dequeue and send to a selected or identified one of the consumer queues 2016. In this example, the consumer queues 2016 dequeue the QEs stored in the consumer queues 2016 to the consumer cores 2006 by polling the consumer cores 2006, generating a hardware interrupt, etc.

Figure 21:
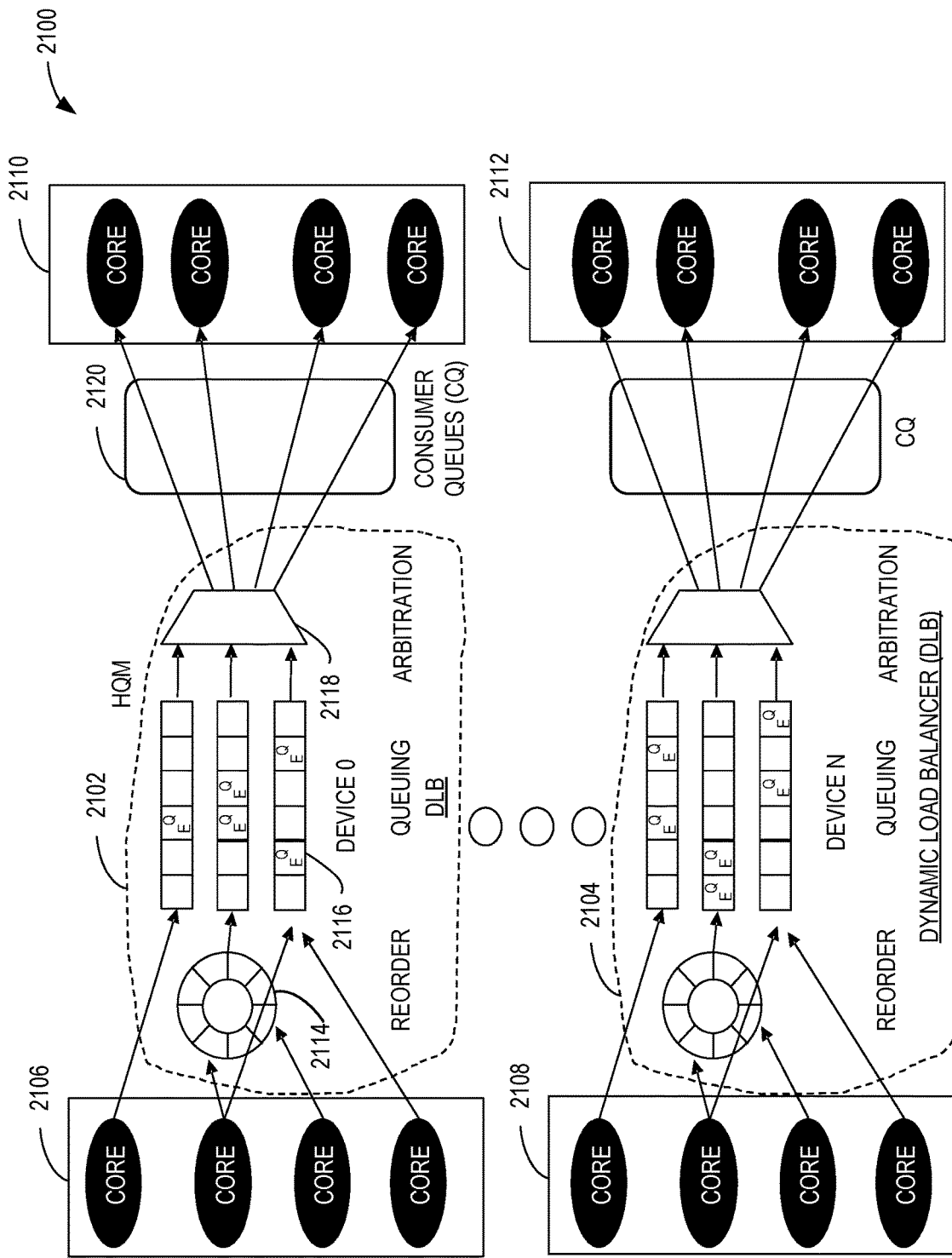
FIG. 21 is an illustration of one of the DLBs of FIGS. 2-6, 18, 19, and/or 20 to facilitate a scheduling of computing tasks across a multi-core computing architecture.

FIG. 21 is an illustration of one of the DLBs of FIGS. 2-6, 18, 19, and/or 20 facilitating a scheduling of computing tasks across a multi-core computing architecture with a second example hardware queue scheduling or management system 2100 including a first example DLB 2102 and a second example DLB 2104. For example, the first DLB 2102 and the second DLB 2104 can be an example implementation of the DLB 1800 of FIG. 18, the DLB 1902 of FIG. 19, and/or the DLB 2002 of FIG. 20.

In the illustrated example of FIG. 21, the second hardware queue scheduling system 2100 includes a first example producer cores 2106 and second example producer cores 2108 that are in communication with a respective one of the DLBs 2102, 2104. In this example, first example consumer cores 2110 and second example consumer cores 2112 are in communication with a respective one of the DLBs 2102, 2104. In some examples, fewer or more than the DLBs 2102, 2104 and/or fewer or more than the producer cores 2106, 2108 and/or consumer cores 2110, 2112 depicted in FIG. 21 may be used. In this example, there is no cross-device arbitration (e.g., DEVICE 0 does not arbitrate for DEVICE N), however, in other examples, there may be cross-device arbitration.

In the illustrated example of FIG. 21, the DLBs 2102, 2104 correspond to a hardware-managed system of queues and arbiters that link the producer cores 2106, 2108 and the consumer cores 2110, 2112. In some examples, one or both DLBs 2102, 2104 can be a peripheral component interconnect (PCI) or PCI express (PCI-E) device in a hardware processor. For example, one or both DLBs 2102, 2104 can be an accelerator (e.g., a hardware accelerator) included either in a hardware processor or in communication with the hardware processor.

In the illustrated example of FIG. 21, each of the DLBs 2102, 2104 includes example reorder logic 2114, example queueing logic 2116, and example arbitration logic 2118. In this example, the reorder logic 2114, the queuing logic 2116, and/or the arbitration logic 2118 are hardware. In some examples, the reorder logic 2114, the queuing logic 2116, and/or the arbitration logic 2118 can be implemented by hardware, software, firmware and/or any combination of hardware, software and/or firmware.

In the illustrated example of FIG. 20, the reorder logic 2114 can obtain data from one or more of the producer cores 2106, 2108 and facilitate reordering operations. For example, the reorder logic 2114 can inspect a data pointer from one of the producer cores 2106, 2108. In such examples, the data pointer can be associated with a data packet of a data flow. In some such examples, the reorder logic 2114 can determine that the data pointer is associated with a known sequence or data flow. In some examples, the producer cores 2106 can enqueue the data pointer with the queueing logic 2116 because the data pointer is not associated with a known data flow and may not be needed to be reordered and/or otherwise processed by the reorder logic 2114.

In some examples, the reorder logic 2114 stores the data pointer and other data pointers associated with data packets in the known data flow in a buffer (e.g., the order buffer 2010 of FIG. 20) until a portion of or an entirety of the data pointers in connection with the known data flow are obtained and/or otherwise identified. The reorder logic 2114 can transmit the data pointers to one or more of the queues maintained by the queueing logic 2116 to maintain an order of the known data flow. For example, the queues can store the data pointers as QEs.

In the illustrated example of FIG. 21, the queueing logic 2116 implements a plurality of queues or buffers to store data pointers or other information. In some examples, the queueing logic 2116 transmits data pointers when an entirety of the queue(s) is/are full. In some examples, the queueing logic 2116 transmits data pointers from one or more of the queues to the arbitration logic 2118 on an asynchronous or synchronous basis.

In this example, the arbitration logic 2118 is configured to perform an arbitration by selecting a given one of the consumer cores 2110, 2112. For example, the arbitration logic 2118 implements one or more arbiters, sets of arbitration logic (e.g., first arbitration logic, second arbitration logic, etc.), etc., where each of the one or more arbiters, each of the sets of arbitration logic, etc., can correspond to a respective one of the consumer cores 2110, 2112. In some examples, the arbitration logic 2118 is based on consumer readiness (e.g., a consumer core having space available for an execution or completion of a task), task availability, etc. In this example, the arbitration logic 2118 transmits and/or otherwise facilitates a passage of data pointers from the queueing logic 2116 to example consumer queues 2120.

In this example, the consumer cores 2110, 2112 are in communication with the consumer queues 2120 to obtain data pointers for subsequent processing. In some examples, a length (e.g., a data length) of one or more of the consumer queues 2120 are programmable and/or otherwise configurable. In some examples, the DLBs 2102, 2104 generate an interrupt (e.g., a hardware interrupt) to one of the consumer cores 2110, 2112 in response to a status, a change in status, etc., of the consumer queues 2120. Responsive to the interrupt, the one of the consumer cores 2110, 2112 can retrieve the data pointer(s) from the consumer queues 2120.

In the illustrated example of FIG. 21, the DLBs 2102, 2104 can check a status (e.g., full, not full, not empty, etc.) of the consumer queues 2120. The DLBs 2102, 2104 can track fullness of the consumer queues 2120 by observing enqueues on an associated producer port of the DLBs 2102, 2104. For example, in response to each enqueueing, the DLBs 2102, 2104 can determine that a corresponding one of the consumer cores 2110, 2112 has completed work on a QE and, thus, a location of the QE is now available in the queues maintained by the queuing logic 2116. For example, a format of the QE can include a bit that is indicative whether a consumer queue token, which can represent a location of the QE in the consumer queues 2120, is being returned. In some examples, new enqueues that are not completions of prior dequeues do not return consumer queue tokens because there is no associated entry in the consumer queues 2120.

Figure 22:
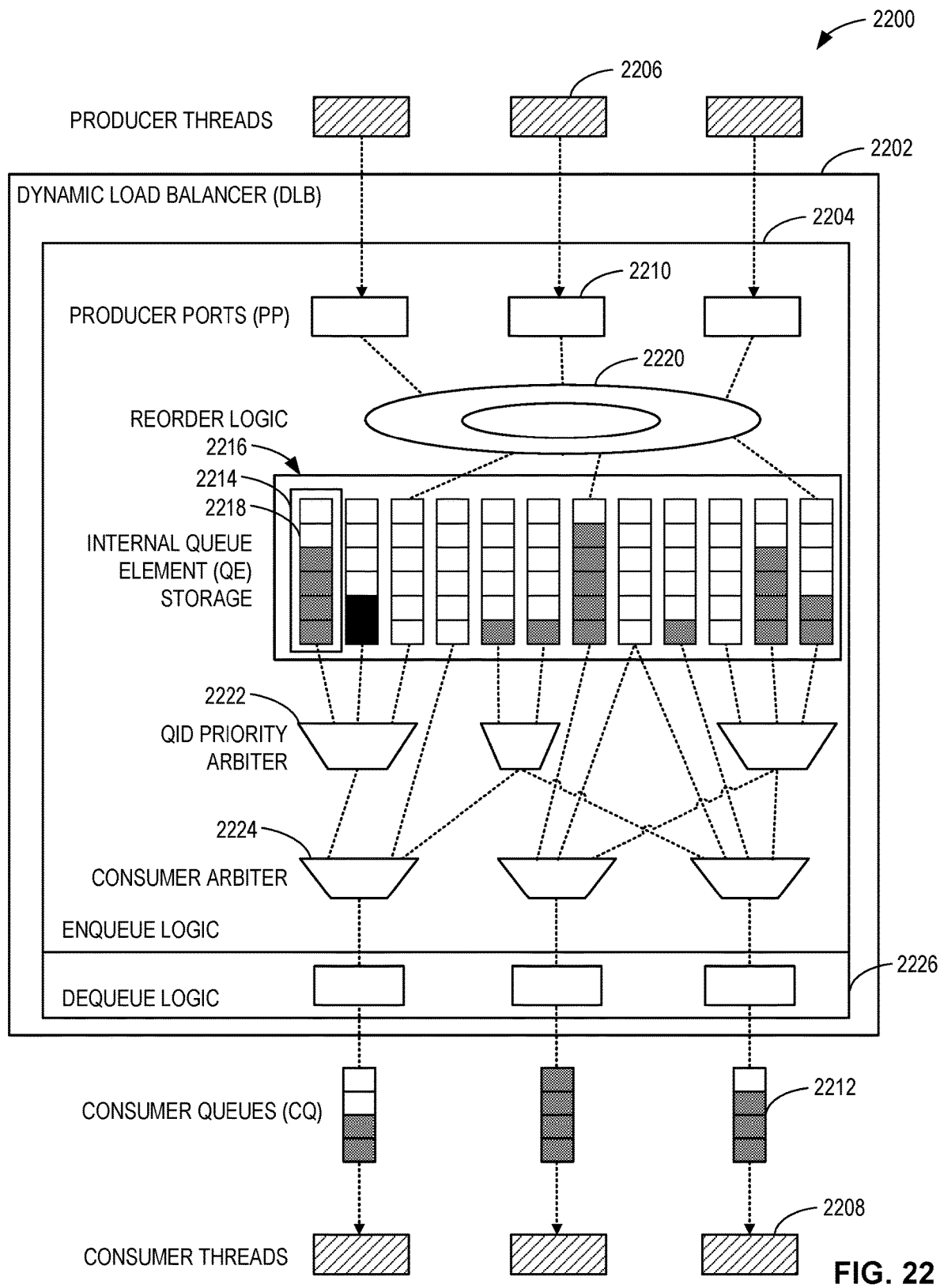
FIG. 22 is an illustration of one of the DLBs of FIGS. 2-6, 18, 19, 20, and/or 21 to facilitate a scheduling of computing tasks across a multi-core computing architecture.

FIG. 22 is an illustration of one of the DLBs of FIGS. 2-6, 18, 19, 20, and/or 21 to facilitate a scheduling of computing tasks across a multi-core computing architecture with a third example hardware queue scheduling or management system 2200 including an example DLB 2202. For example, the DLB 2202 can be an example implementation of the DLB 1800 of FIG. 18, the DLB 1902 of FIG. 19, the DLB 2002 of FIG. 20, and/or the DLB 2102, 2104 of FIG. 21.

In the illustrated example of FIG. 22, the DLB 2202 includes example enqueue logic 2204. For example, the enqueue logic 2204 can be an example implementation of the enqueue logic 1908 of FIG. 19. In this example, the DLB 2202 is in communication with example producer threads 2206 and example consumer threads 2208. In this example, the producer threads 2206 and/or the consumer threads 2208 are software threads. In some examples, one or more of the producer threads 2206 and/or the consumer threads 2208 may be hardware threads and/or firmware threads. The producer threads 2206 write hardware control words (HCWs) to example producer ports (PP) 2210. In this example, an HCW is data in HCW format described below in connection with FIG. 35. For example, an HCW can include a queue element (QE) to be enqueued on the producer ports 2210.

In some examples, the HCW can return one or more consumer queue tokens for the producer ports 2210 thereby indicating that space is available in example consumer queues 2212, as described in further detail below. In some examples, the HCW includes a completion (e.g., a completion notification, completion indicator, a completion flag, completion data, etc.) for an oldest (e.g., a least recently written QE to a consumer queue) outstanding load-balanced QE. For example, the HCW can include a byte having a value that indicates whether an operation has been completed by a worker core. In such examples, the byte can be a flag, an identifier, a status, etc., indicative of completion or no completion. For example, in response to a worker core completing an operation on a data packet, the worker core can set the completion byte and/or otherwise adjust a value of the completion byte to be indicative of completing the operation. In such examples, the worker core can return the HCW to the DLB 2202. In some such examples, the producer ports 2210 can determine that the worker core completed the operation on the data packet based on the completion byte having the value indicative of the completion. In such examples, the producer ports 2210 can enqueue the data pointer of the HCW based on the determination.

In some examples, a QE corresponds to a unit of data that can be enqueued to the DLB 2202 and/or subsequently stored into one or more units of storage in example queues 2214 of example internal QE storage 2216. For example, the queues 2214 can be implemented with random access memory (RAM) (e.g., static RAM (SRAM), dynamic RAM (DRAM), etc.). In this example, the internal QE storage 2216 includes a plurality of the queues 2214 and each of the queues 2214 can store a plurality of example QEs 2218. In some examples, the QE obtained from the producer threads 2206 have a data size of 16 bytes (i.e., 16 B). In some examples, the QE may have any other data size. In this example, four of the 16 B QEs can be packed up into 64 B cache lines for mesh bandwidth efficiency. Accordingly, the relatively small QE size is indicative that most of the data or information communicated from the producer threads 2206 to the consumer threads 2208 are stored elsewhere in memory (e.g., memory external to the DLB 2202) and a user-defined portion of the QE, in some examples, holds a pointer to that data or information. For example, the QE obtained from the producer threads 2206 can include a data pointer to a network data packet stored elsewhere than the DLB 2202.

In the illustrated example, the producer threads 2206 write HCW to the producer ports 2210 with any transmitted data packets and noting completion if required. The QE included in the HCW, unless reordered by example reorder logic 2220, gets inserted into a specified one of the queues 2214. In this example, the queues 2214 include the internal QE storage elements 2218. In this example, the reorder logic 2220 may optionally (e.g., via one or more configuration inputs, via one or more producer ports, etc.) be applied to incoming QE from the producer threads 2206 received by the producer ports 2210. The reorder logic 2220 be an example implementation of the reorder controller 1840 of FIG. 18 and/or the reorder logic 2114 of FIG. 21. The queues 2214 and/or, more generally, the internal queue storage 2216, can be an example implementation of the queue controller 1830 of FIG. 18, the queues 1910 of FIG. 19, the queue 2008 of FIG. 20, and/or the queueing logic 2116 of FIG. 21.

In example operation, the DLB 2202 schedules QE from the queues 2214 to the consumer threads 2208 based on a two-stage priority arbiter. In some examples, fewer or more stages of priority arbiters may be used. The DLB 2202 includes a first example stage arbiter 2222 and a second example stage arbiter 2224. In this example, the first stage arbiter 2222 and/or the second stage arbiter 2224 are hardware. In some examples, one or both arbiter stages 2222, 2224 can be implemented by hardware, software, firmware and/or any combination of hardware, software and/or firmware.

In some examples, the first stage arbiter 2222 and/or the second stage arbiter 2224 effectuates the distribution and prioritization of data in a data flow. For example, the second device 110 can transmit a data flow to a first one of the DUs 122 in the edge network 104 of FIG. 1. In such examples, the DLB 2202 can be included in the first one of the DUs 122. In some such examples, the DLB 2202 can prioritize the data flow from the second device 110 because the second device is a vehicle, such as an autonomous vehicle. For example, the producer ports 2210 can determine that data pointers associated with the data flow have a relatively high priority value. In such examples, the producer ports 2210 can enqueue the data pointers having the relatively high priority to one(s) of the queues 2214 that can be processed expeditiously. In some such examples, the first stage arbiter 2222 can allocate the data pointers having the relatively high priority to the second stage arbiter 2224 for distribution to the one(s) of the consumer queues 2212 to be processed before other data pointers having a lower priority.

In the illustrated example of FIG. 22, the first stage arbiter 2222 is a queue identifier (QID) priority arbiter. In some examples, based on information included in a QE (e.g., a data pointer, a priority value, etc.) from one of the producer threads 2206, the producer ports 2210 can determine the QE has a priority. In response to determining that the QE has a priority, the QE is routed from one of the producer ports 2210 to one of the queues 2214 that can correspond to and/or otherwise be associated with maintaining priority of incoming QEs. In response to the DLB 2202 routing the QE to one of the queues 2214 that can implement and/or otherwise facilitate priority-based scheduling, the DLB 2202 routes the QE to the first stage arbiter 2222.

In some examples, the first stage arbiters 2222 each have a different priority. For example, a first one of the first stage arbiters 2222 can have a first priority, a second one of the first stage arbiters 2222 can have a second priority less than the first priority, etc. In such examples, the DLB 2202 can route a first one of the internal QE storage elements 2218 from a first one of the queues 2214 to the first one of the first stage arbiters 2222 by mapping a first priority value stored in the first one of the internal QE storage elements 2218 to the first one of the first stage arbiters 2222 having the first priority based on the first priority value. Alternatively, one or more of the first stage arbiters 2222 may have the same priority.

In the illustrated example of FIG. 22, in response to routing the QE to the first stage arbiter 2222, the DLB 2202 routes the QE to a corresponding second stage arbiter 2224, which in this example, is a consumer arbiter. In this example, the second stage arbiter 2224 is a consumer arbiter because the second stage arbiter 2224 determines, identifies, and/or otherwise selects a corresponding one of the consumer queues 2212 to store a QE. In this example, the second stage arbiters 2224 are each assigned to a unique consumer queue. For example, a first one of the second stage arbiters 2224 is assigned and/or otherwise associated with a first one of the consumer queues 2212 and a first one of the consumer cores 2208, a second one of the second stage arbiters 2224 is assigned and/or otherwise associated with a second one of the consumer queues 2212 and a second one of the consumer cores 2208, etc.

In the illustrated example of FIG. 22, in response to routing the QE to the second stage arbiter 2224, example dequeue logic 2226 writes the QE to a corresponding one of the consumer queues 2212. Additionally or alternatively, the dequeue logic 2226 may include at least one of the first stage arbiter 2222 or the second stage arbiter 2224. In this example, the consumer queues 2212 are system or main-memory based consumer queues, where a corresponding one of the consumer threads 2208 can read the QE from and execute one or more computing tasks on a data packet that corresponds to the QE.

Figure 23:
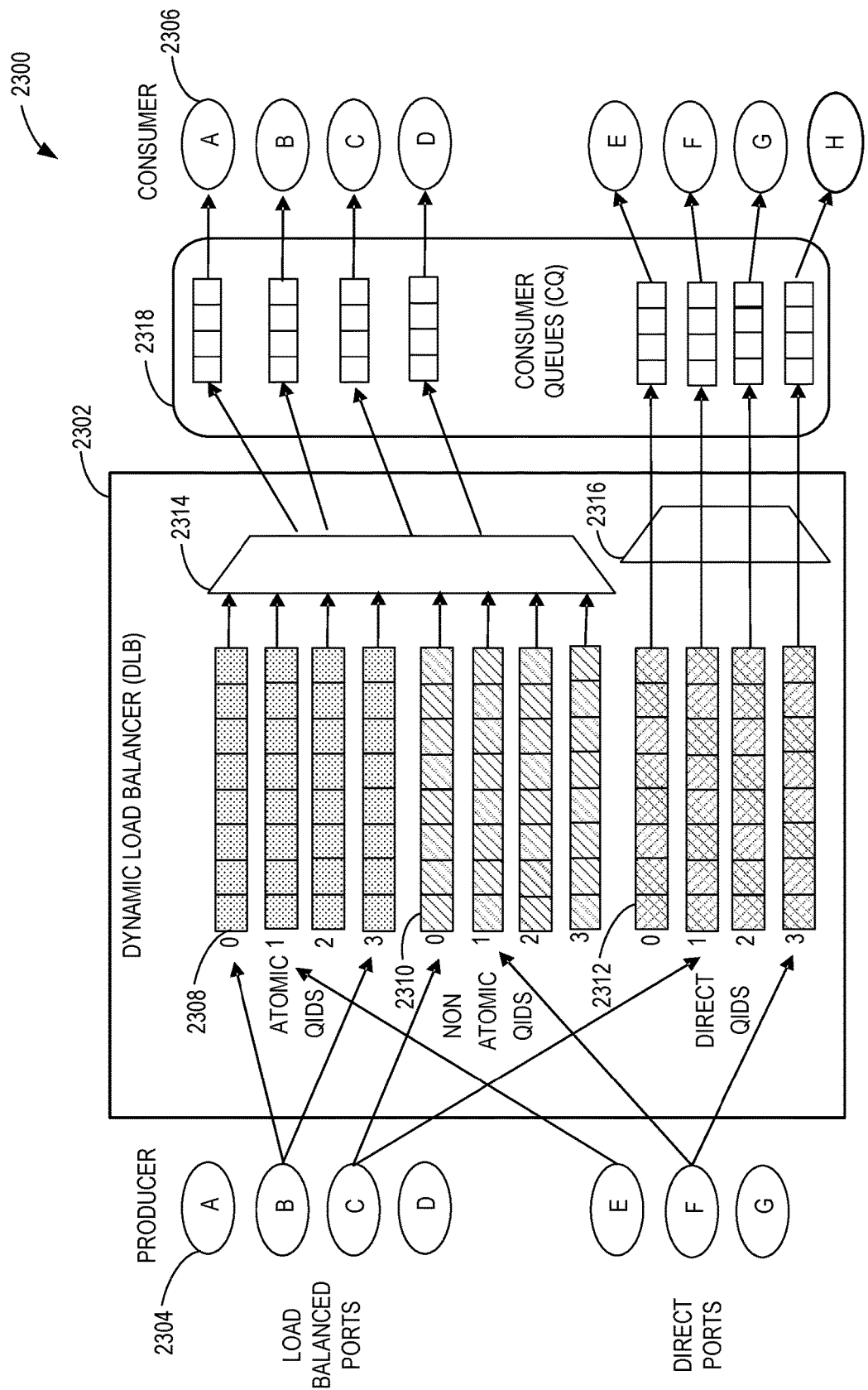
FIG. 23 is an illustration of one of the DLBs of FIGS. 2-6, 18, 19, 20, 21, and/or 22 to facilitate a scheduling of computing tasks across a multi-core computing architecture.

FIG. 23 is an illustration of an example DLB 2302 to facilitate scheduling of computing tasks across a multi-core computing architecture in a fourth example hardware queue scheduling or management system 2300. For example, the DLB 2302 can be an example implementation of the DLB 1800 of FIG. 18, the DLB 1902 of FIG. 19, the DLB 2002 of FIG. 20, the DLB 2102, 2104 of FIG. 21, and/or the DLB 2202 of FIG. 22.

In the illustrated example of FIG. 23, the DLB 2302 is in communication with example producer threads 2304 and example consumer threads 2306. In this example, a first set of the producer threads 2304 (e.g., producer threads A-D) are in communication with producer ports of the DLB 2302 that are configured and/or otherwise designated as load balanced ports. In this example, a second set of the producer threads 2304 (e.g., producer threads E-G) is in communication with producer ports of the DLB 2302 that are configured and/or otherwise designated as direct ports. For example, producer ports of the DLB 2302 can process any type of traffic (e.g., data traffic) in response to and/or otherwise based on checking write permissions of the producer ports.

In the illustrated example of FIG. 23, the DLB 2302 includes example queues 2308, 2310, 2312 and example arbiters 2314, 2316. In this example, the queues 2308, 2310, 2312 include first example queues 2308 that have atomic QIDs, second example queues 2310 that have non-atomic QIDs, and third example queues 2312 that have direct QIDs.

Figure 25A:
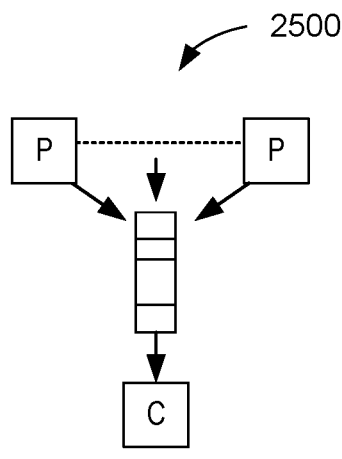
FIGS. 25A-25D depict example implementations of different types of queues implemented by the DLB(s) of FIGS. 2-6, 18, 19, 20, 21, 22, 23, and/or 24.

In this example, direct QIDs (e.g., direct queue identifiers) are direct queues that are used for multiple producers (e.g., multiple ones of the producer threads 2304) queuing up for communication to one consumer (e.g., a first one of the consumer threads 2306). In some examples, direct queues can be used for a single producer (e.g., a first one of the producer threads 2304) targeting a single consumer. An example implementation of the direct queues is illustrated by an example direct queue 2500 in FIG. 25A. For example, the direct queue 2500 of FIG. 25A is based on direct ordering.

Figure 25B:
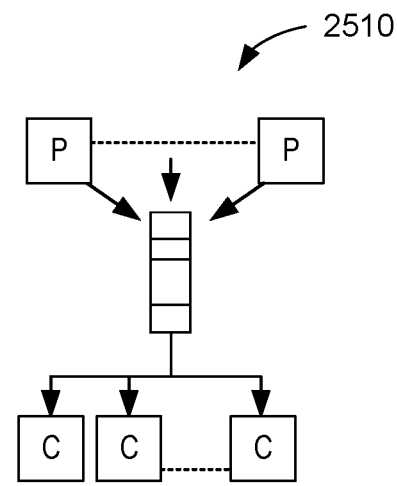
Figure 25C:
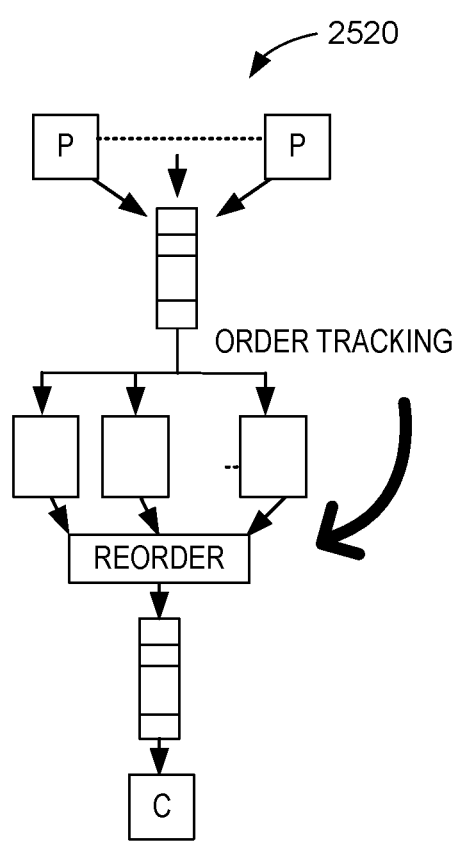

In this example, non-atomic QIDs (e.g., non-atomic queue identifiers) are non-atomic queues. Example non-atomic queues include unordered queues (e.g., non-atomic unordered queues) and ordered queues (e.g., non-atomic ordered queues). Unordered queues are used when one or more producers are queueing up to communicate to multiple consumers with a requirement to balance a workload across the multiple consumers (e.g., without dynamic consumer affinity). An example implementation of the unordered queues is illustrated by an example unordered queue 2510 in FIG. 25B. For example, the unordered queue 2510 of FIG. 25B is not based on ordering.

In some examples, ordered queues are used when there are one or more producers queueing up to communicate to multiple consumers with a requirement to dynamically balance the work across the multiple consumers and then to restore the original enqueue order. In some examples, the DLB 2302 restores the original enqueue order by having a QE of interest pass through the DLB 2302 at least twice. The DLB 2302 can use the first pass to establish a required order, dequeue with load balancing across the consumers, and initialize internal tracking logic of the DLB 2302. The DLB 2302 can use the second pass to allow the load-balanced consumers to complete assigned workloads, become producers, and enqueue to the DLB 2302 in any order. The DLB 2302 can hold the enqueues in a reorder buffer, and then move the ordered QEs to the next queue. An example implementation of the ordered queues is illustrated by an example ordered queue 2520 in FIG. 25C.

Figure 25D:
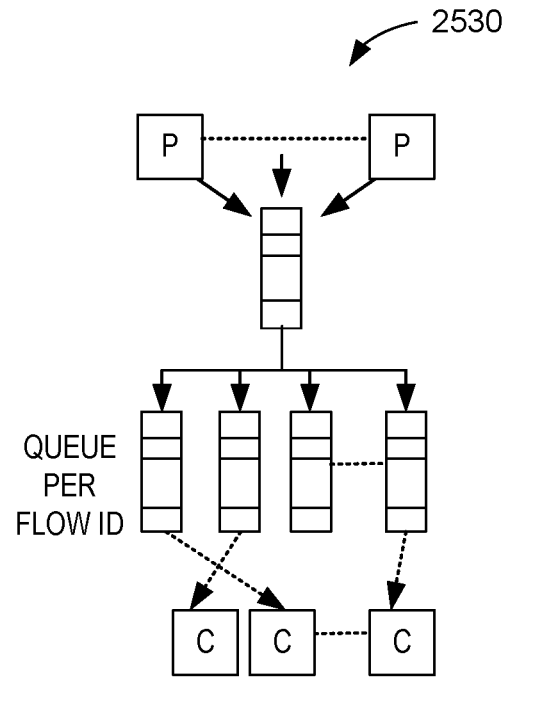

In this example, atomic QIDs (e.g., atomic queue identifiers) are atomic queues that are used when one or more of the producers are queueing up to communicate to multiple consumers with a requirement to balance a workload across the multiple consumers with dynamic consumer affinity based on a flow identifier (e.g., a flow ID). This allows the consumers to operate on per-flow variables without using locks. Consumer affinity is dynamic. For example, the affinity between the flow identifier and a given core (e.g., a producer core, a consumer core, etc.) moves dynamically as the flow identifier appears and disappears from the fourth system 2300. An example implementation of the atomic queues is illustrated by an example atomic queue 2530 in FIG. 25D. For example, the atomic queue 25430 of FIG. 25D is based on atomic ordering, atomicity, etc.

In the illustrated example of FIG. 23, each of the queues 2308, 2310, 2312 have eight storage elements per QID (e.g., QID 0, QID 1, QID 2, QID 3) that can be used for priority purposes. In some examples, one or more of the queues 2308, 2310, 2312 may include fewer or more storage elements than depicted in FIG. 23. In this example, the second queues 2310 having the non-atomic QIDs can carry, store, etc., ordered or unordered traffic in the same queues. For example, a first one of the non-atomic QIDs can store either ordered or unordered QEs.

In the illustrated example of FIG. 23, the arbiters 2314, 2316 include a first example arbiter 2314 and a second example arbiter 2316. In this example, the first arbiter 2314 implements and/or otherwise effectuates load balance arbitration. For example, the first arbiter 2314 can facilitate load balance traffic from the load balanced ports. The first arbiter 2314 can be configured to map which of the first queues 2308 and/or the second queues 2310 that one(s) of the consumer threads 2306 can retrieve data. In this example, the second arbiter 2316 implements and/or otherwise effectuates direct arbitration. For example, the second arbiter 2316 can map direct traffic to one(s) of the consumer threads 2306 on a one-to-one basis. In this example, the arbiters 2314, 2316 and the consumer threads 2306 are in communication with example consumer queues 2318. In this example, the consumer queues 2318 are rings (e.g., ring buffers) in dynamic RAM (DRAM). Alternatively, the consumer queues 2318 may be configured as any other type of data organization and/or any may be any other type of memory.

Figure 24:
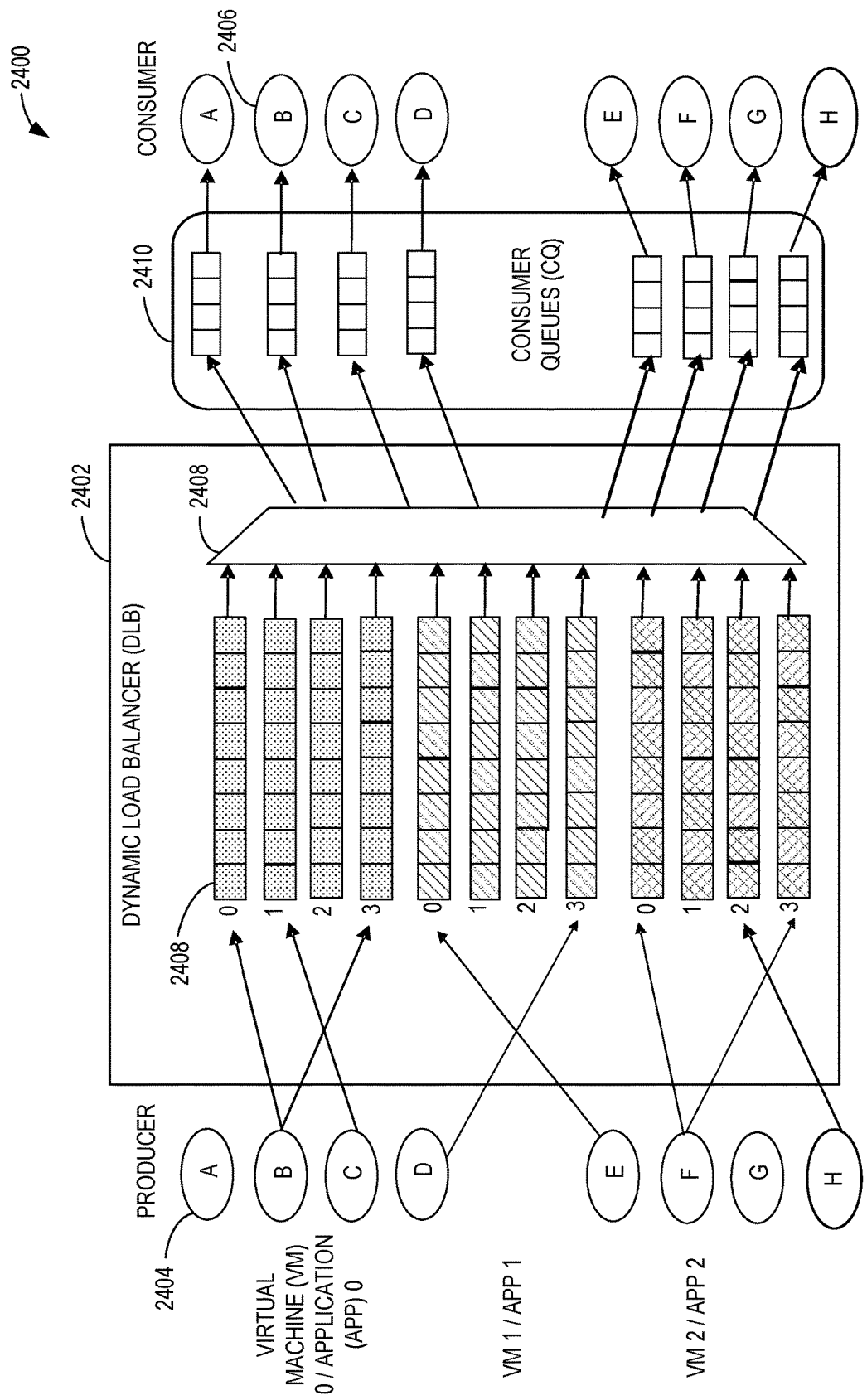
FIG. 24 is an illustration of an example virtualized implementation of the DLB(s) of FIGS. 2-6, 18, 19, 20, 21, 22, and/or 23 facilitating a scheduling of computing tasks across a multi-core computing architecture.

FIG. 24 is an illustration of an example virtualized implementation of one of the DLBs of FIGS. 2-6, 18, 19, 20, 21, and/or 22 to facilitate a scheduling of computing tasks across a multi-core computing architecture with a fifth example hardware queue scheduling or management system 2400 including an example DLB 2402. For example, the DLB 2402 can be an example implementation of the DLB 1800 of FIG. 18, the DLB 1902 of FIG. 19, the DLB 2002 of FIG. 20, the DLB 2102, 2104 of FIG. 21, the DLB 2202 of FIG. 22, and/or the DLB 2302 of FIG. 23.

In the illustrated example of FIG. 24, the fifth hardware queue scheduling system 2400 corresponds to a virtualization of the producer and consumer scheduling system 1900 of FIG. 19. For example, the fifth hardware queue scheduling system 2400 can correspond to and/or otherwise be representative of software abstractions of the fourth hardware queue scheduling system 2300 of FIG. 23. In this example, the DLB 2402 is a virtualization and/or otherwise software abstraction of the DLB 2302 that can be used to configure and/or otherwise facilitate execution of the DLB 2302 using software while computing tasks associated with data are executed using hardware.

In the illustrated example of FIG. 24, the DLB 2402 is in communication with first example threads (e.g., producer threads) 2404 and second example threads (e.g., consumer threads) 2406. In this example, the producer threads 2404 can correspond to a virtualization and/or otherwise a software abstraction of the producer threads 2304 of FIG. 23. In this example, the consumer threads 2306 can correspond to a virtualization and/or otherwise a software abstraction of the consumer threads 2306 of FIG. 23. Advantageously, by virtualizing the producer threads 2304, the consumer threads 2306, the DLB 2302, etc., of FIG. 23, service assurance can be improved. For example, quality-of-service (QoS) parameters can be calculated, analyzed, etc., in software.

Advantageously, by virtualizing the producer threads 2304, the consumer threads 2306, the DLB 2302, etc., of FIG. 23, as depicted in FIG. 24, portion(s) thereof can be allocated to different applications to complete workloads. For example, the DLB 2402 or portion(s) thereof can be allocated to the application layer 128 of FIG. 1. In such examples, a first portion of the DLB 2402 can be allocated to execute workloads for BSS, a second portion of the DLB 2402 can be allocated to executed workloads for OSS, a third portion of the DLB 2402 can be allocated to execute workloads for 5GC), Internet Protocol multimedia core network subsystems (IMS), etc.

In the illustrated example of FIG. 24, a first set of the producer threads 2404 (e.g., producer threads A-C) is in communication with producer ports (e.g., virtualizations and/or otherwise software abstractions of the producer ports) of the DLB 2402. In this example, the first set of the producer threads 2404 correspond to and/or otherwise implement a first virtual machine (VM 0), a first application (APP 0), VM 0 executing APP 0, etc.

In this example, a second set of the producer threads 2404 (e.g., producer threads D-E) is in communication with the producer ports of the DLB 2402. In this example, the second set of the producer threads 2404 correspond to and/or otherwise implement a second virtual machine (VM 1), a second application (APP 1), VM1 executing APP 1, etc. In this example, a third set of the producer threads 2404 (e.g., producer threads F-H) is in communication with the producer ports of the DLB 2402. In this example, the third set of the producer threads 2404 correspond to and/or otherwise implement a third virtual machine (VM 2), a third application (APP 2), VM2 executing APP 2, etc.

In the illustrated example of FIG. 24, the DLB 2402 includes an example arbiter (e.g., arbitration logic) 2408 to facilitate communication between the DLB 2402 and example consumer queues 2410. In this example, the arbiter 2408 can correspond to a virtualization and/or otherwise a software abstraction of the first arbiter 2314 and/or the second arbiter 2316 of FIG. 23. In this example, the consumer queues 2410 can correspond to a virtualization and/or otherwise a software abstraction of the consumer queues 2318 of FIG. 23.

Figure 26:
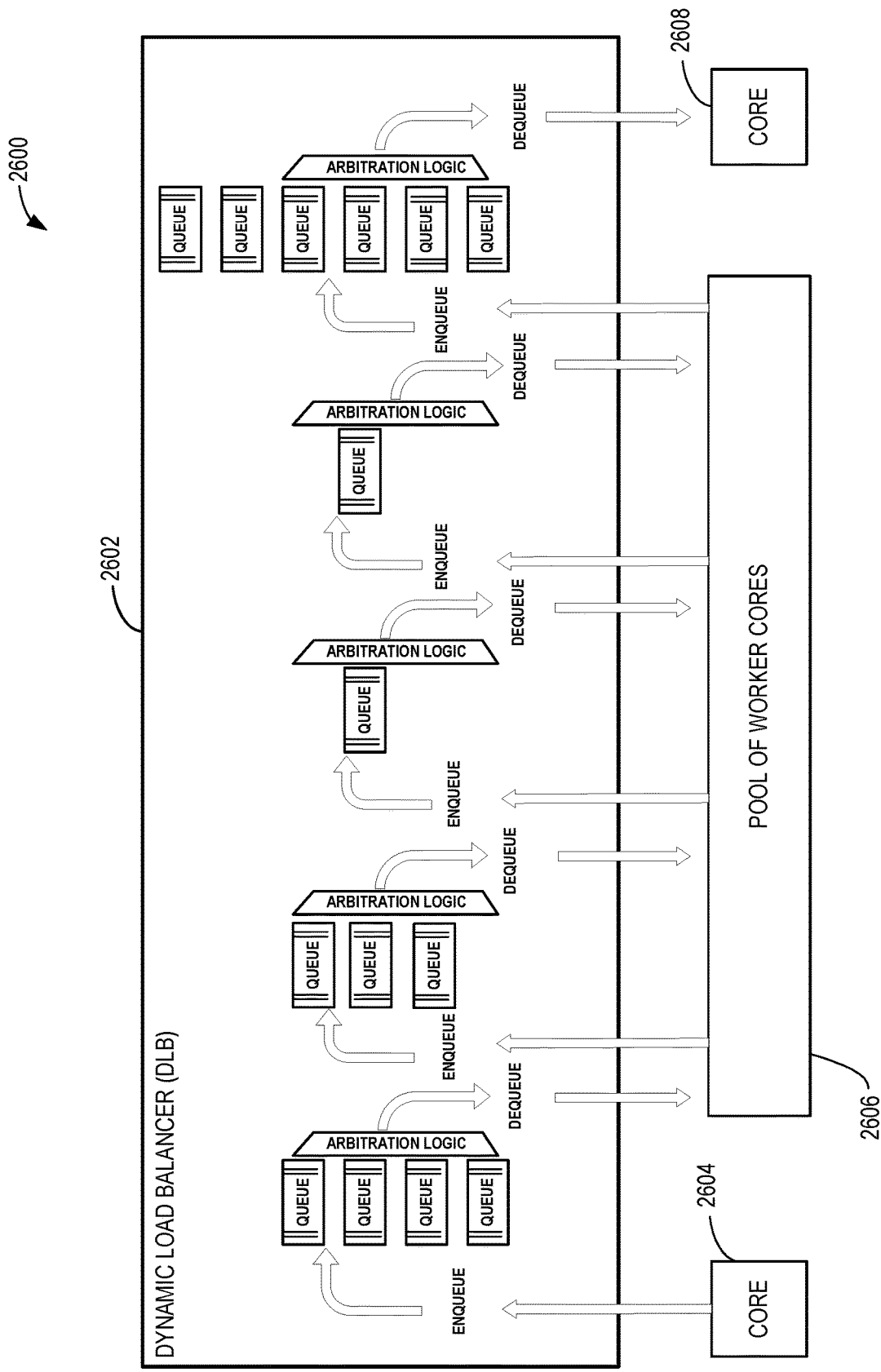
FIG. 26 is an illustration of a fourth example workflow using the DLB(s) of FIGS. 2-6, 18, 19, 20, 21, 22, 23, and/or 24.

FIG. 26 is an illustration of a fourth example workflow 2600 using a DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, and/or the DLB 2402 of FIG. 24. In some examples, the fourth workflow 2600 can correspond to an example producer/consumer pipeline. For example, the producer/consumer pipeline can implement a chain or pipeline of operations.

During the fourth workflow 2600, a first example core 2604 is operating as a consumer core by completing a computing task (e.g., authenticating a data packet, decrypting/encrypting the data packet, etc.). In response to the first core 2604 completing the computing task, the first core 2604 can transition from operating as a consumer core to operating as a producer core. For example, the first core 2604 can enqueue data associated with the completed computing task to the DLB 2602. In such examples, the DLB 2602 can dequeue the data to one(s) of the pool of worker cores 2606. In response to the one(s) of the pool of worker cores 2606 completing computing task(s) associated with the dequeued data, the one(s) of the pool of worker cores 2606 can enqueue the data to the DLB 2602. In response to the enqueuing, the DLB 2602 can dequeue the data to a second example core 2608. In this example, the second core 2608 is operating as a consumer core.

During the fourth workflow 2600, each pass through the DLB 2602 can provide an opportunity to load balance a subsequent computing task across multiple cores of an example pool of worker cores 2606. In this example, the pool of worker cores 2606 implements a multi-core processor. Alternatively, the pool of worker cores 2606 may implement a distributed multi-core environment, where a first set of the worker cores in the pool 2606 are included in a first multi-core processor, a second set of the worker cores in the pool 2606 are included in a second multi-core processor, etc.

In some examples, such as processing a communication workload example associated with the multi-core computing environment 100 of FIG. 1, a complete set of computing tasks that goes through the producer/consumer pipeline of the illustrated example can correspond to a data packet (e.g., receiving a data packet, transmitting a data packet, etc.). In such examples, the data packet can be handled across many cores (e.g., the first core 2604, one(s) of the pool of worker cores 2606, the second core 2608, etc.) via multiple passes through the DLB 2602.

In some examples, the fourth workflow 2600 effectuates applications such as an online-facilitated auction (e.g., a live enterprise auction). For example, the first core 2604 can receive events representative of auction bids from devices, such as the first device 108 of FIG. 1. In such examples, the DLB 2602 can enqueue data pointers identifying the auction bids in order of receipt. The DLB 2602 can dequeue the data pointers to the pool of worker cores 2606 to complete operations on the auction bids. For example, the pool of worker cores 2606 can extract timestamp data, auction item description data, pricing data, payment data, etc., from the auction bids, process the extracted data, store the extracted data, etc. In such examples, in response to completing the operations on the auction bids, the pool of worker cores 2606 can enqueue the data pointers to the DLB 2602 with indications that the operations have been completed.

In some examples, the fourth workflow 2600 effectuates applications such as an autonomous movement (e.g., autonomous driving, autonomous flying, etc.). For example, the first core 2604 can receive events representative of autonomous movement data (e.g., a vehicle speed, a flight speed, vehicle or UAV geosynchronous position data (GPS), an altitude, etc.) from devices, such as the second device 110, the third device 112 of FIG. 1, the fourth device 114 of FIG. 1, etc. In such examples, the DLB 2602 can enqueue data pointers identifying the autonomous movement data in order of receipt. The DLB 2602 can dequeue the data pointers to the pool of worker cores 2606 to complete operations on the autonomous movement data. For example, the pool of worker cores 2606 can determine a set of directions to move the second device 110 from a first position to a second position, a flight path to move the third device 112 from a third position to a fourth position, etc., based on the autonomous movement data. In such examples, in response to completing the operations on the autonomous movement data, the pool of worker cores 2606 can enqueue the data pointers to the DLB 2602 with indications that the operations have been completed.

Figure 27:
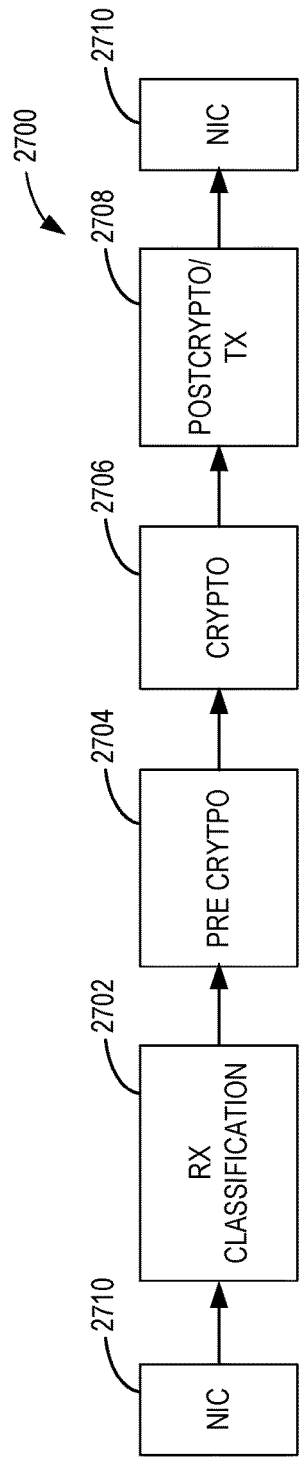
FIG. 27 is an illustration of an example application that may be implemented using the DLB(s) of FIGS. 2-6, 18, 19, 20, 21, 22, 23, and/or 24.

FIG. 27 is an illustration of an example application 2700 that may be implemented using one or more DLBs, such as one(s) of the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, and/or the DLB 2602 of FIG. 26. In this example, the application 2700 is a multi-stage processing application in which the operation is improved using the one or more DLBs described herein.

In the illustrated example of FIG. 27, the application 2700 can correspond to and/or otherwise be representative of an application that has strict latency, data throughput, dynamic load balancing, and/or scalability requirements. For example, the application 2700 can implement a 4G or a 5G cellular network packet processing application in which the one or more DLBs can be used to improve operations in connection with example receive (RX) classification tasks or operations 2702, example pre-cryptographic (PRE-CRYPTO) tasks or operations 2704, example cryptographic (CRYPTO) tasks or operations (e.g., an encryption operation) 2706, example post-cryptographic (POSTCRYPTO) and/or transmission (TX) operations 2708.

In example operation, an example NIC 2710, such as the NIC 1414 of FIG. 14, can enqueue a data pointer to the DLB 2602 of FIG. 26, where the data pointer corresponds to a data packet stored in memory (e.g., system or main memory of a processor platform). For example, the data packet can be a first data packet of a plurality of data packets in a data flow. The DLB 2602 can dequeue the data pointer to a worker core in the pool of worker cores 2606 of FIG. 26. In example operation, the worker core can retrieve the data packet from the memory, complete the RX classification operation 2702 on the data packet, and return the processed data packet to the memory.

In example operation, responsive to the completion of the RX classification operation 2702, the worker core can enqueue data to the DLB 2602, which can include the data pointer of the processed data packet and/or an indication of the completion of the RX classification operation 2702. In example operation, the DLB 2602 can dequeue the data pointer to the worker core or a different worker core to execute the pre-cryptographic operation 2704 on the data packet. In example operation, the NIC 2710 can enqueue another data pointer of the data flow. The DLB 2602 can dequeue the data pointer to a worker core of the pool of worker cores 2606 to execute the RX classification operation 2702 while a different worker core of the pool of worker cores 2606 processes the pre-cryptographic operation 2704. Advantageously, the DLB 2602 can execute the application 2700 by assigning operations of the application 2700 to be completed by one(s) of the pool of worker cores 2606.

Figure 28:
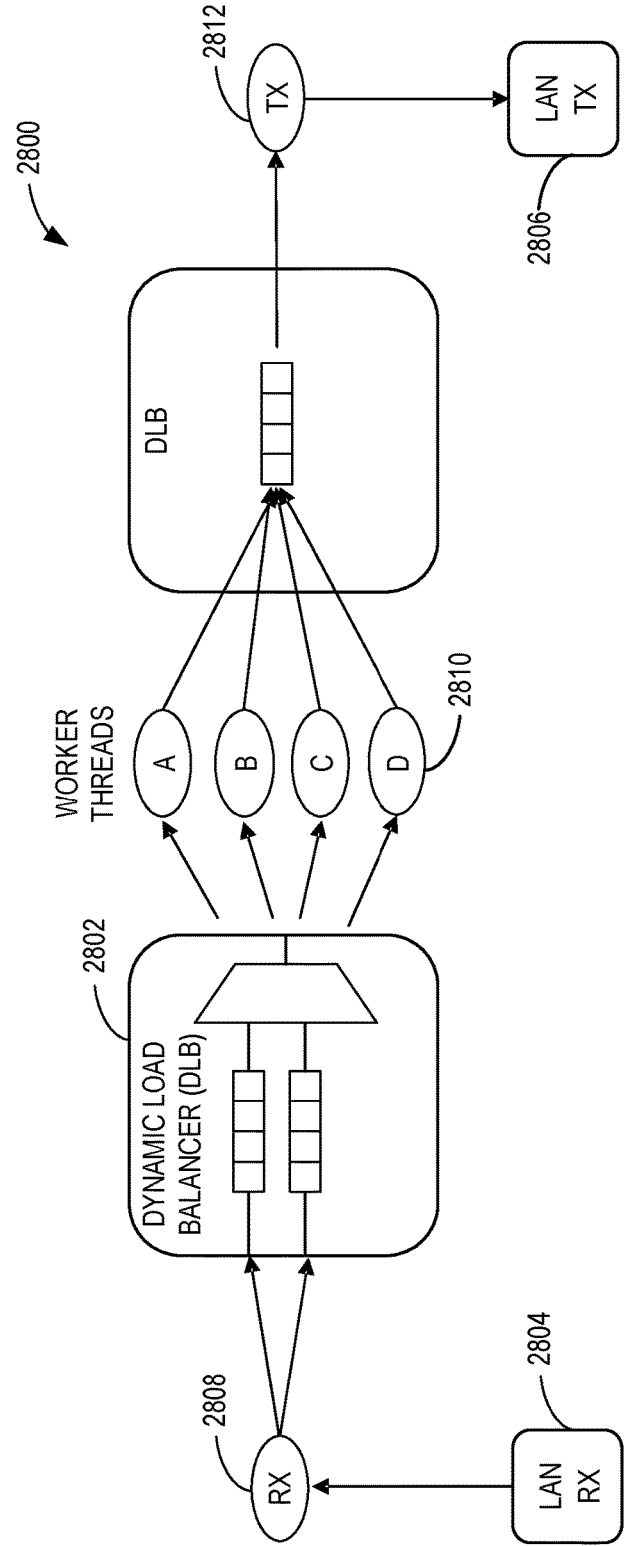
FIG. 28 is an illustration of another example application that may be implemented using the DLB(s) of FIGS. 2-6, 18, 19, 20, 21, 22, 23, 24, and/or 26.

FIG. 28 is an illustration a sixth example hardware queue scheduling or management system 2800 including an example DLB 2802 to execute an application, such as the application 2700 of FIG. 27. For example, the DLB 2802 can be an example implementation of the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, and/or the DLB 2602 of FIG. 26. In this example, the sixth hardware queue scheduling system 2800 includes an example local area network (LAN) receive (RX) interface 2804, an example LAN transmit (TX) interface 2806, an example receive thread (e.g., a receive core, a virtualization of the receive core, etc.) 2808, example worker threads (e.g., worker cores, virtualizations of the worker cores, etc.) 2810, an example transmit thread (e.g., a transmit core, a virtualization of the transmit core, etc.) 2812.

Figure 29:
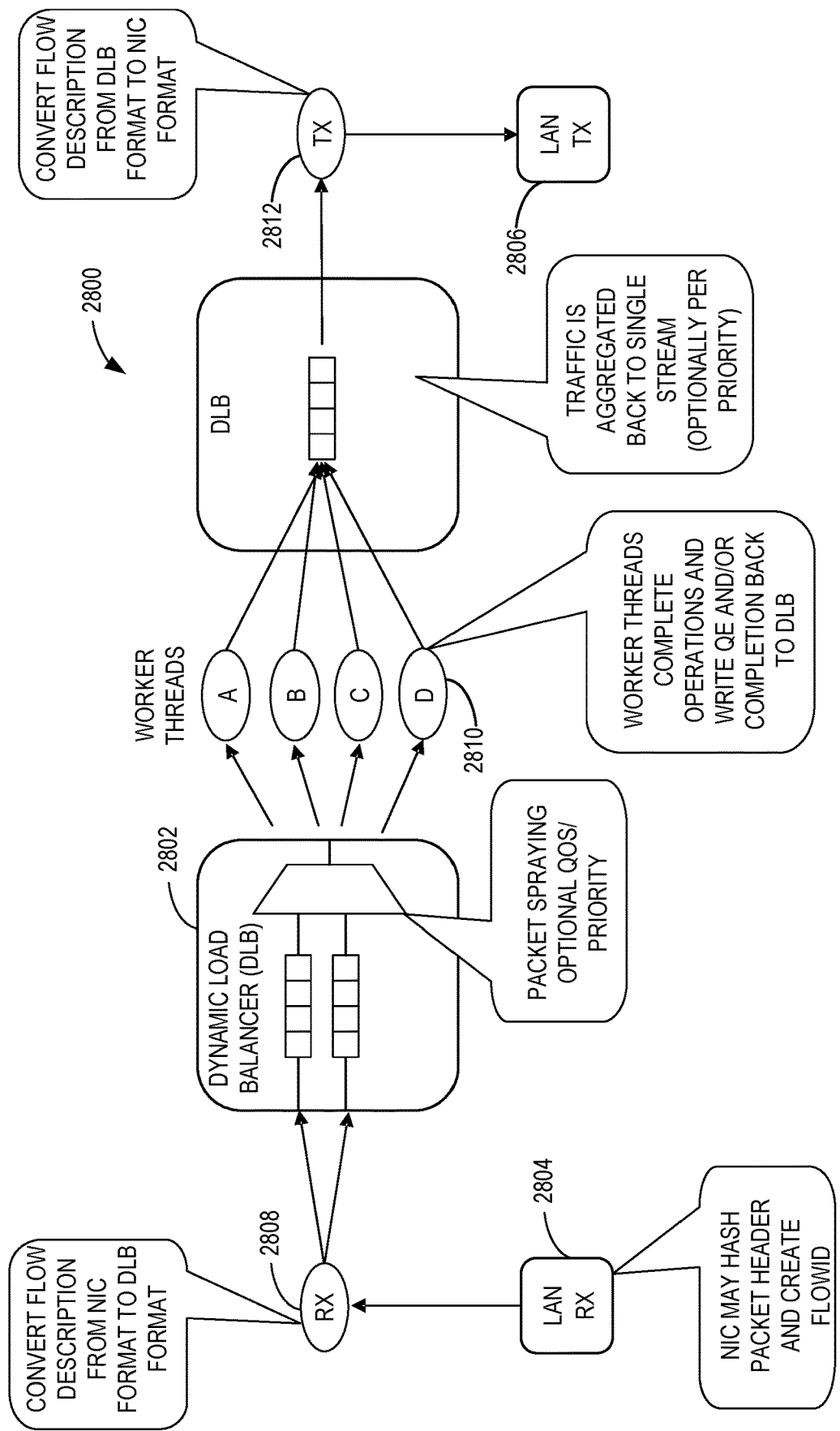
FIG. 29 is an annotated illustration of the example application of FIG. 28.

FIG. 29 is an annotated illustration of the sixth hardware queue scheduling system 2800 of FIG. 28 effectuating an application, such as a communication application (e.g., an IPsec application). For example, the application can be in connection with a network gateway or other type of network interface that may incorporate the DLB 2802 of FIG. 28. In this example, a NIC can implement the LAN RX interface 2804 and the LAN TX interface 2806. In this example, the NIC can hash a packet header of the data packet and generate a flow identifier (FLOWID) associated with the data packet, a data flow that includes the data packet, etc. The NIC and/or front-end logic circuitry of the DLB 2802 can convert a first description of the flow identifier in a NIC format to a second description of the flow identifier in a DLB and/or a QE format. For example, a receive thread (e.g., a receive core, a virtualization of the receive core, etc.) 2808 can execute a conversion operation to convert the first description to the second description. The converted flow identifier can be transmitted to the DLB 2802 as a new event. The DLB 2802 can process the new event using atomic load balancing based on the flow identifier, where the new event may optionally have priority. For example, the DLB 2802 can packet spray and/or otherwise transmit the new event to example worker threads 2810, which can execute the new event.

In response to one of the worker threads 2810 processing the new event, the DLB 2802 can obtain the new event and aggregate data pointers including a first data pointer corresponding to the new event and second data pointers corresponding to associated data packets in the data flow. In response to aggregating the data pointers (e.g., aggregating the data packets by aggregating the data pointers) back together into a single stream, the DLB 2802 can dequeue the aggregated data pointers to an example transmit thread (e.g., a transmit core, a virtualization of the transmit core, etc.) 2812. For example, the transmit thread 2812 can convert the second description of the aggregated data pointers into the first description. In response to the dequeuing, the NIC can transmit the stream to different hardware, software, and/or firmware during the LAN TX operation 2806.

Figure 30:
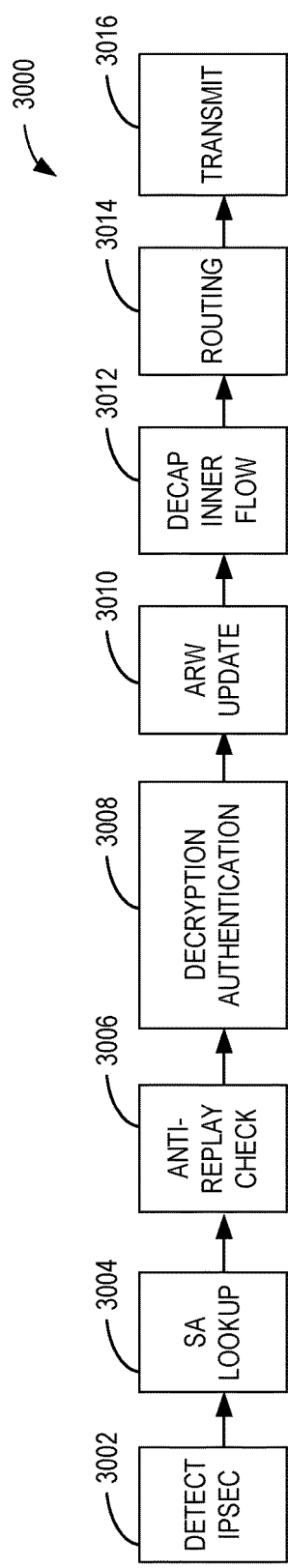
FIG. 30 is an illustration of another example application that may be implemented using the DLB(s) of FIGS. 2-6, 18, 19, 20, 21, 22, 23, 24, 26, and/or 28.

FIG. 30 is an illustration another example application 3000 that may be implemented and/or otherwise effectuated by a DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, and/or the DLB 2802 of FIG. 28. In this example, the application 3000 is an IPsec router application including an example detect IPsec operation 3002, an example security association (SA) lookup operation 3004, an example anti-replay check operation 3006, an example decryption authentication operation 3008, an example anti-replay window (ARW) update operation 3010, an example decapsulate (DECAP) inner flow operation 3012, an example routing operation 3014, and an example transmit operation 3016.

In example operation, a NIC, such as the NIC 2710 of FIG. 27, can receive a first data packet of a data flow. In such examples, the NIC 2710 can provide and/or otherwise enqueue a first data pointer identifying the first data packet to the DLB. In some such examples, the DLB can dequeue the first data pointer to a first worker core of a multi-core processor to execute the detect IPsec operation 3002 on the first data packet.

In some examples, responsive to the first worker core enqueuing the completion of the IPsec operation 3002 to the DLB, the DLB can dequeue the first data pointer to the first worker core or a second worker core to execute the SA lookup operation 3004 on the first data packet. In such examples, while the first worker core or the second worker core is executing the SA lookup operation 3004 on the first data packet, the DLB can dequeue a second data pointer to an available one of the first worker core, the second worker core, or a third worker core to process the detect IPsec operation 3002 on the second data packet. In some such examples, the DLB and the worker cores can process the first data packet, the second data packet, etc., through each of the operations of the application 3000 to process the data flow. Advantageously, the DLB and the worker cores of the multi-core processor can process the data flow through the chain of operations depicted in the example of FIG. 30 by offloading the scheduling of the operations to the DLB to be implemented in hardware and increasing availability of the worker cores to complete the operations of the application 3000.

Figure 31:
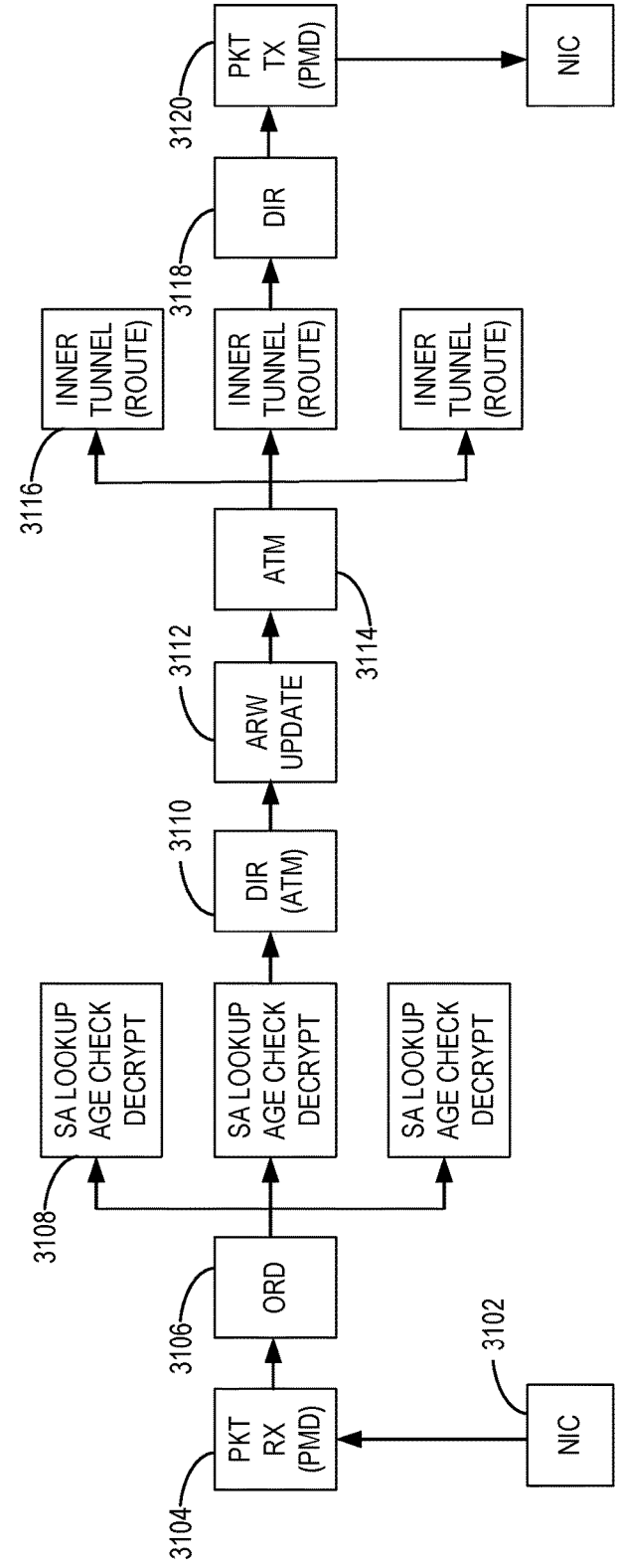
FIG. 31 is an illustration of yet another example application may be implemented using the DLB(s) of FIGS. 2-6, 18, 19, 20, 21, 22, 23, 24, 26, and/or 28.

FIG. 31 is an illustration of yet another example application 3100 that may be implemented and/or otherwise effectuated by a DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, and/or the DLB 2802 of FIG. 28. In this example, the application 3100 is an IPsec router application including a combination of large outer communication tunnels with optional encryption.

The application 3100 of the illustrated example of FIG. 31 can include a large number of inner communication flows. The application 3100 can have a quantity of worker cores or threads that each run outer tunnel processing, a router algorithm based on inner tunnel processing, etc. The application 3100 can implement anti-replay checks and updates based on atomicity. The application 3100 can determine a flow identifier based on an inspection of a packet header of a data packet obtained by an example NIC 3102 (e.g., the NIC 2710 of FIG. 27), where the flow identifier can be calculated based on an inner packet header (e.g., a 5-tuple hash).

In this example, the application 3100 is a multi-stage IPsec application including an example packet receive operation executed with a poll mode driver (PMD) 3104, an example ordering (ORD) operation 3106, one or more example security association (SA) lookup age check decrypt operations 3108, an example Asynchronous Transfer Mode (ATM) directory (DIR) operation 3110, an example anti-replay window (ARW) update operation 3112, an example ATM operation 3114, one or more example inner tunnel routing operations 3116, an example DIR operation 3118, and an example packet transmit operation executed with the PMD 3120. Advantageously, the DLB can sequentially dequeue data pointers associated with data packets of a data flow to one(s) of worker cores in a multi-core processor in response to the one(s) of the worker cores completing the operations depicted in the application 3100 of FIG. 31.

Figure 32:
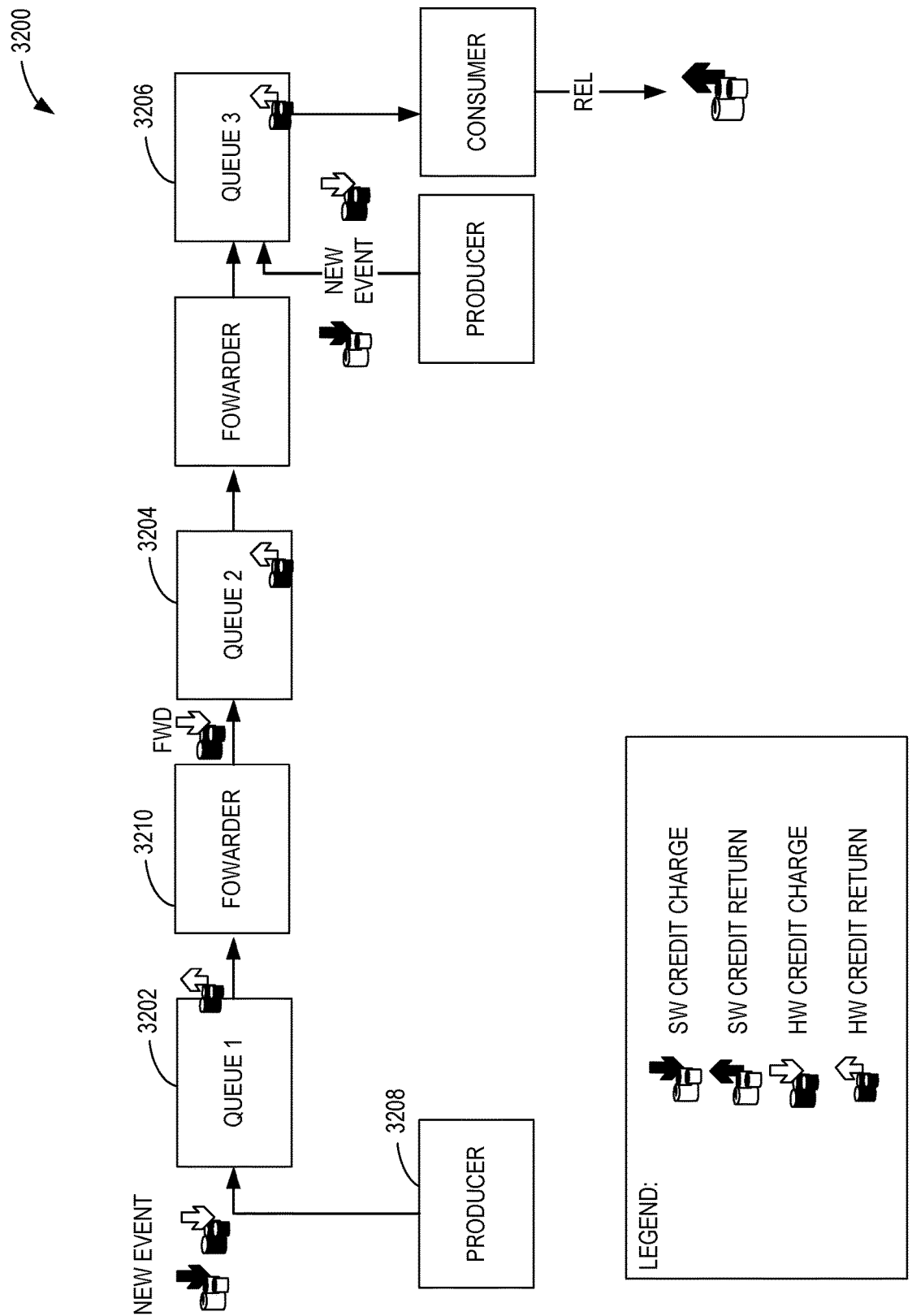
FIG. 32 is an illustration of a fifth example workflow corresponding to charging and returning points in an example three-stage pipeline that may be implemented using the DLB(s) of FIGS. 2-6, 18, 19, 20, 21, 22, 23, 24, 26, and/or 28.

FIG. 32 is an illustration of a fifth example workflow 3200 corresponding to charging and returning points in an example three-stage pipeline that may be implemented using a DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, and/or the DLB 2802 of FIG. 28. In this example, the fifth workflow 3200 is based on a hardware and/or software credit scheme to prevent software (e.g., an application, one or more software threads, etc.) from overflowing hardware event storage in connection with the DLB. For example, each unit of memory or storage included in and/or otherwise associated with the DLB can be represented by a credit.

In the illustrated example of FIG. 32, a port (e.g., the producer port 2210 of FIG. 22) spends a credit to enqueue an event (e.g., an event indicating of enqueuing data, enqueuing a data pointer, etc.). The DLB can refill the port with a credit as the event that caused a disbursement of the credit has left the internal storage of the DLB. In this example, credit refills come from credit pools, and each port can be a member of one load-balanced credit pool and one directed credit pool.

In the illustrated example of FIG. 32, the DLB can layer a software credit scheme on top of a hardware credit scheme to comply with a per-port backpressure. The hardware scheme of the DLB is local to example queue/pipeline stages 3202, 3204, 3206 including a first example queue stage (QUEUE 1) 3202, a second example queue stage (QUEUE 2) 3204, and a third example queue stage (QUEUE 3) 3206. In this example, the DLB implements and/or otherwise includes the queue stages 3202, 3204, 3206. For example, a port can spend a credit when the port enqueues to a queue (e.g., a producer 3208 enqueues data to the first queue stage 3202) and a credit is later replenished after the event (e.g., the data enqueued to the first queue stage 3202) is dequeued and released (e.g., dequeued from the first queue stage 3202 and forwarded (FWD) to the second queue stage 3204). Example forwarders 3210 corresponding to hardware can forward data between queues. For example, the DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, and/or the DLB 2802 of FIG. 28, can include the forwarders 3210 as implemented by hardware logic.

In the illustrated example of FIG. 32, in the software credit scheme, a credit is consumed when a new event is injected into the system (e.g., injected into and/or otherwise enqueued to the DLB) and the credit is replenished when the event is released from the system. For example, an event is "in the system" from an enqueuing of the event until the event is dequeued. In some examples, the event is still considered "in the system" if the event goes through multiple event queues while being processed by a thread (e.g., a worker thread).

In some examples, a port of the DLB will fail to enqueue in response to a number of events in the system exceeding a threshold (e.g., an event threshold, a new event threshold, etc.), which can be configurable. In some examples, a port of the DLB will fail to enqueue in response to the port not having enough hardware credits to enqueue the new event.

In some examples, there may be different types of hardware credits. For example, a first type of hardware credit can be a load-balanced credit that can be used to enqueue to a load-balanced queue of the DLB. In such examples, the load-balanced queue can correspond to one(s) of the queues 2308, 2310, 2312 of FIG. 23 that are in communication with the first set of the producer threads 2304 (e.g., producer threads A-D). A second type of hardware credit can be directed credit that can be used to enqueue to a directed queue of the DLB. For example, the directed queue can correspond to one(s) of the queues 2308, 2310, 2312 of FIG. 23 that are in communication with the second set of the producer threads 2304 (e.g., producer threads E-F).

In some examples, if a worker thread lacks a credit to enqueue a first event, the worker thread can dequeue a second event before the worker thread can recover a credit needed to enqueue the first event (e.g., the new event). Advantageously, the DLB can avoid, mitigate, or prevent a credit deadlock scenario or operating condition by (i) stopping and/or otherwise ceasing to retry to enqueue a new event, (ii) releasing the new event the DLB is attempting to enqueue, and/or (iii) dequeuing one or more previously enqueued events to make room for the new event.

Figure 33:
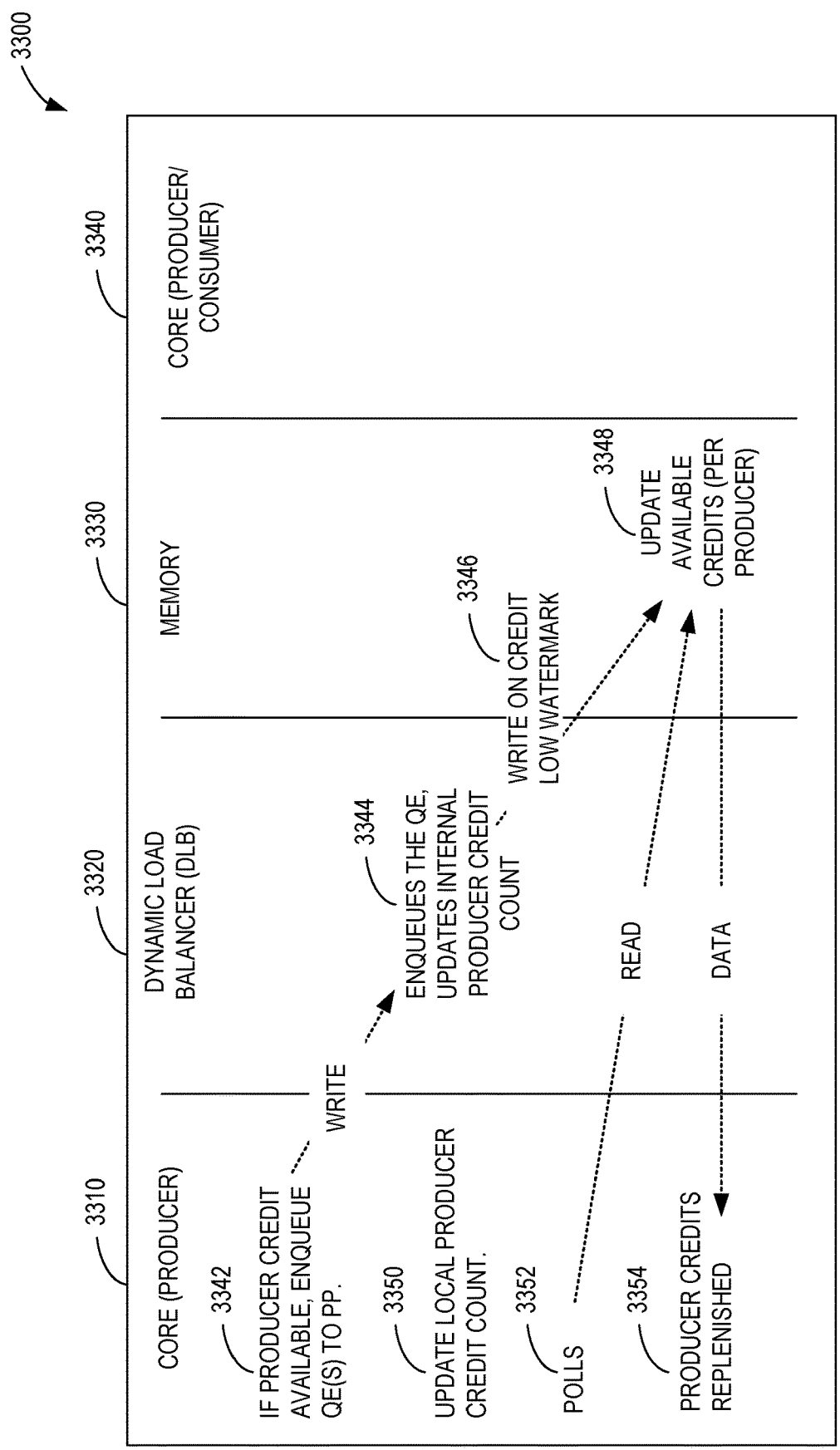
FIGS. 33-34 depict example data flow diagrams corresponding to operation of the producer and consumer scheduling system of FIG. 19.

FIG. 33 depicts a first example data flow diagram 3300 corresponding to operation of a hardware queue scheduling or management system, such as the producer and consumer scheduling system 1900 of FIG. 19 and/or one(s) of the hardware scheduling queue or management systems 2000, 2100, 2200, 2300, 2400, 280 of FIGS. 20-24 and/or 28. The first data flow diagram 3300 includes example operations executed by at least one of a first example core 3310, an example DLB 3320, example memory 3330, or a second example core 3340.

In the illustrated example of FIG. 33, the first core 3310 can correspond to the producer 1904 of FIG. 19, one of the producer cores 2004 of FIG. 20, etc. In this example, the second core 3340 can correspond to either a producer core or a consumer core. For example, the second core 3340 as a producer core can correspond to the producer 1904 of FIG. 19, one of the producer cores 2004 of FIG. 20, etc. In other examples, the second core 3340 as a consumer core can correspond to the consumer 1906 of FIG. 19, one of the consumer cores 2006 of FIG. 20, etc.

In this example, the DLB 3320 can correspond to the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, and/or the DLB 2802 of FIG. 28. In this example, the memory 3330 can correspond to system or main memory of a computing system. For example, the memory 3330 can store the consumer queues 2016 of FIG. 20, the consumer queues 2120 of FIG. 21, etc.

During a first example operation 3342, the first core 3310 can enqueue a queue element (QE) to a producer port (PP) via an example write operation (e.g., a memory-mapped I/O (MMIO) write operation) if the first core 3310 has an available producer credit. During a second example operation 3344, the DLB 3320 can update an internal producer count in response to enqueuing the QE. During a third example operation 3346, the DLB 3320 writes on a credit low watermark of the memory 3330. During a fourth example operation 3348, the available credits per producer are updated in the memory 3330. During a fifth example operation 3350 (e.g., after the first operation 3342), the first core 3310 can update a local producer credit count associated with the first core 3310. During a sixth example operation 3352, the first core 3310 can poll the available credits stored in the memory 3330. During a seventh example operation 3354, responsive to the polling during the sixth operation 3352, the producer credits of the first core 3310 are replenished.

Figure 34:
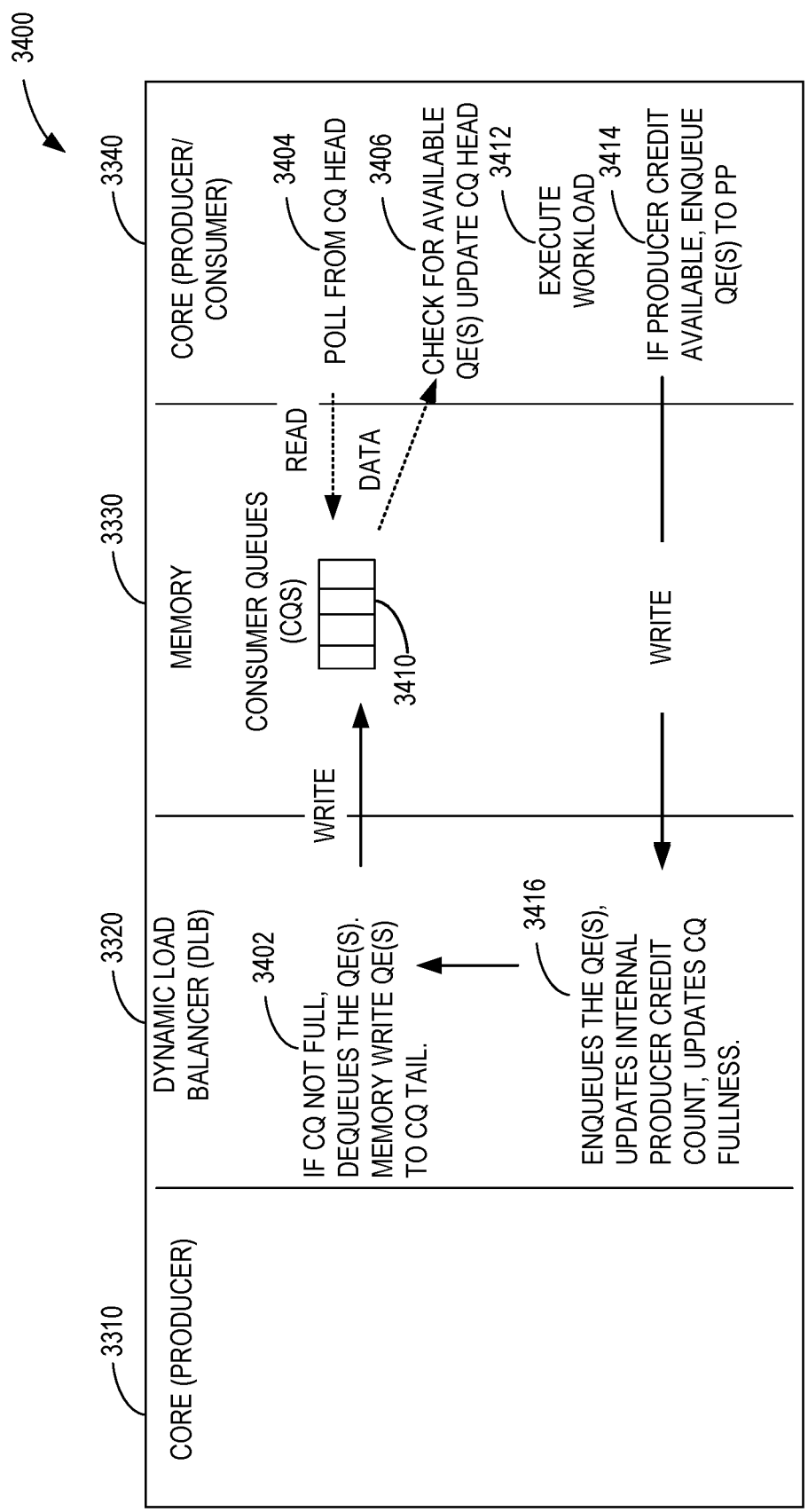

FIG. 34 depicts a second example data flow diagram 3400 corresponding to operation of the hardware queue scheduling or management system, such as the producer and consumer scheduling system 1900 of FIG. 19 and/or one(s) of the hardware scheduling queue or management systems 2000, 2100, 2200, 2300, 2400, 280 of FIGS. 20-24 and/or 28. The second data flow diagram 3400 includes example operations executed by at least one of the first core 3310, the DLB 3320, the memory 3330, or the second example core 3340 of FIG. 33. For example, the second data flow diagram 3400 can be a continuation, or extension of, the first data flow diagram 3300 of FIG. 33. In such examples, the operations of the first data flow diagram 3300 and the second data flow diagram 3400 can occur in connection with each other.

In example operation, during an eighth example operation 3402, the DLB 3320 dequeues the QE (e.g., the QE enqueued during the second operation 3344 of FIG. 33) by writing the QE to a tail of an example consumer queue 3410 stored in the memory 3330. For example, the consumer queues 3410 can correspond to the consumer queues 2016 of FIG. 20, the consumer queues 2120 of FIG. 21, etc. During a ninth example operation 3404, the second core 3340 can poll the consumer queues 3410 from a head of the consumer queues 3410. During a tenth example operation 3406, responsive to the polling, the second core 3340 checks for available QE(s) and update the head of the consumer queues 3410. For example, responsive to the polling, the second core 3340 can retrieve data packet(s) stored in the memory 3330 that correspond to the QE(s) written during the eighth operation 3402. In such examples, the second core 3340 can execute a workload on the retrieved data packet(s) at an eleventh example operation 3412.

During a twelfth example operation 3414, the second core 3340 enqueues the QE(s) associated with the workload to the producer ports of the DLB 3320 if the second core 3340 has an available producer credit. For example, the second core 3340 can write (e.g., a MMIO write) the QE(s) to the producer port(s) of the DLB 3320. During a thirteenth example operation 3416, the DLB 3320 enqueues the QE(s), updates the internal producer credit count maintained by the DLB 3320, and updates the fullness of the consumer queues 3410.

FIG. 35 is an example table 3500 depicting an example implementation of a hardware control word (HCW) and a consumer queue element (QE) that may be implemented using a DLB, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, and/or the DLB 3320 of FIGS. 33-34. In this example, the HCW as depicted is a 16 byte (i.e., 16 B) implementation. Alternatively, the HCW may be implemented with a different data size (e.g., 32 B, 64 B, etc.). In this example, the HCW implements a flexible queue entry or queue element. For example, the HCW depicted in FIG. 35 can implement one(s) of the QE internal storage elements 2218 of FIG. 22.

In the illustrated example of FIG. 35, the HCW is data, such as metadata. For example, the HCW can include first metadata and second metadata. In such examples, the first metadata can include information relating to the queue entry itself, such as queue ID (QID), priority, format, and length. In some such examples, the DLB can use the first metadata to perform enqueue and/or dequeue-related operations on that queue entry. In some examples, the second metadata includes actual data (e.g., one or more data packets), or pointer(s) to the actual data, which is/are to be shared with a consumer core, thread, device, etc., via a dequeue request or operation. In such examples, the DLB may ignore and/or otherwise not process the second metadata.

In the illustrated example of FIG. 35, the 16 B HCW includes 1 byte (i.e., 1 B) corresponding to a command field (CMD) indicative of QE, comp, and/or tokens. In this example, the 16 B HCW includes 1 B corresponding to a miscellaneous field (MISC) for debugging or other miscellaneous features. In this example, the 16 B HCW includes 2 B corresponding to a lock identifier (LOCKID) field used for atomic queueing purposes.

In the illustrated example of FIG. 35, the 16 B HCW includes 2 B corresponding to a QE field used for QE information (Q_INFO). For example, the Q_INFO field can store information on atomicity, fragmentation, load-balancing, reordering requirements, sequencing, etc., of data, pointer(s) referencing the data, etc. In some examples, the atomicity information can describe whether a QE is to be submitted to a single core at a time. In some examples, the fragmentation information is used when deciding whether or not to break up the data for traffic shaping. In some examples, the load balancing information indicates whether load balancing across multiple output queues may be utilized. In some examples, the reordering information is used to indicate whether reordering based on a sequence number is needed when entries are sent to the output or consumer queues.

In this example, the Q_INFO field includes a type of a load balancer (LB) or LB operation required to process the QE, an index of an internal queue identifier (QID), and/or a priority value (e.g., a value in a range of 0-7). For example, a DLB, such as the DLB 2202 of FIG. 22, can execute a reordering operation (e.g., with the reorder logic 2220 of FIG. 22) based on the index of the QID. In such examples, the DLB, such as the DLB 2202, can execute an arbitration operation (e.g., with the first stage arbiter 2222 of FIG. 22 and/or the second stage arbiter 2224 of FIG. 22) based on the priority value.

In this example, the 16 B HCW includes 10 B corresponding to a software (SW) field that can be used by a virtualization and/or otherwise a software abstraction layer of the DLB. Alternatively, the software field may be used to store actual data (e.g., one or more data packets), or data pointer(s) associated with the actual data. In some examples, the first metadata includes at least one of the command field, the miscellaneous field, the lock identifier field, or the QE field. In such examples, the second metadata can include the software field. In some such examples, the command field, the miscellaneous field, the lock identifier field, the QE field, and/or the software field are metadata tag(s), metadata portion(s), etc.

In the illustrated example of FIG. 35, the implementation of the consumer QE includes the QE field (Q_INFO) and the SW field (SW) from the producer HCW. The implementation of the consumer QE includes 1 B corresponding to a status field (STATUS), 1 B corresponding to a miscellaneous field (MISC) for debugging or other miscellaneous features, and 2 B corresponding to a debug field (DEBUG) used for debugging purposes.

Figure 36:
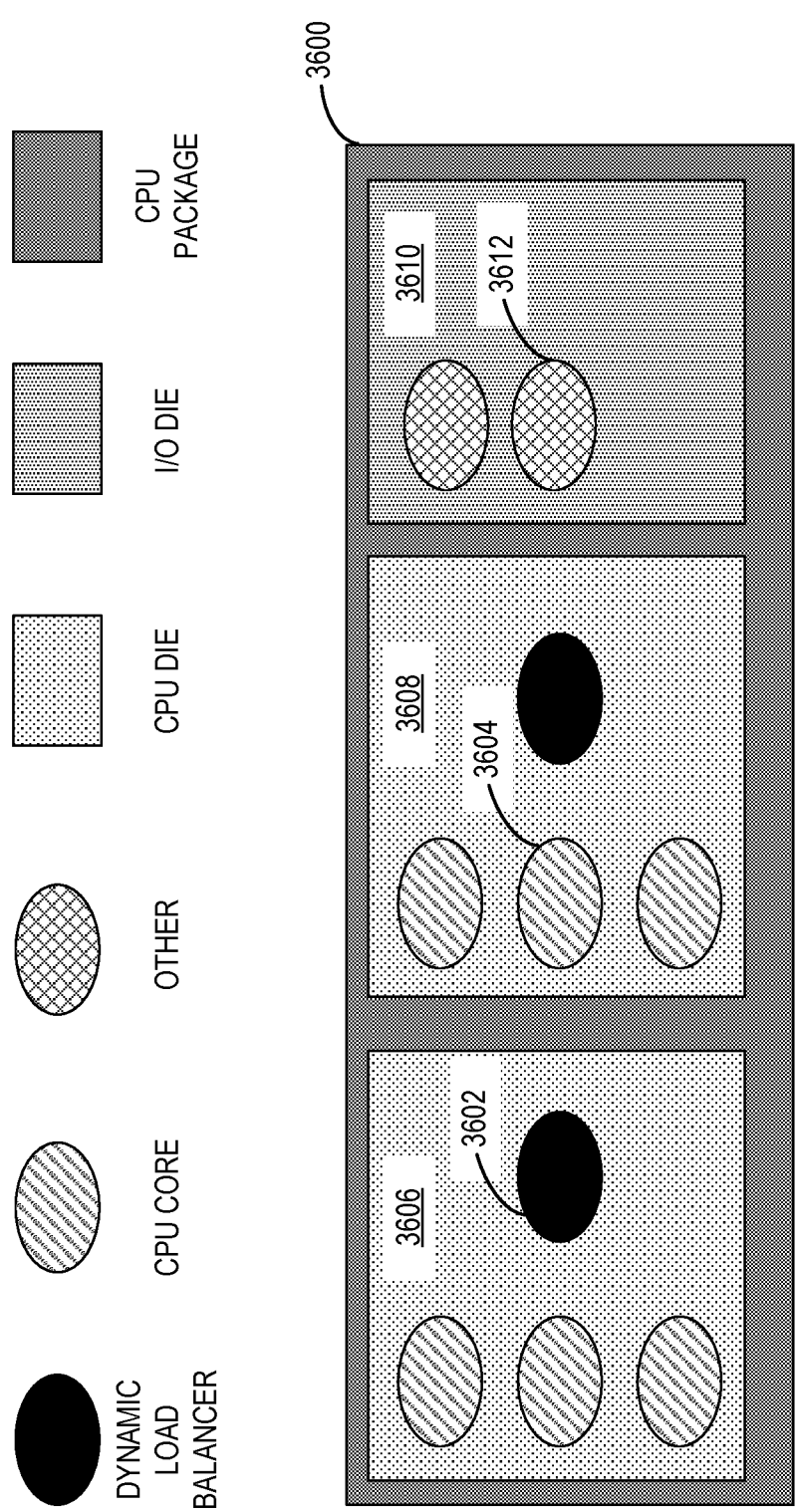
FIG. 36 is a block diagram of an example implementation of an example multi-core processor including ones of the DLBs of FIGS. 2-6, 18, 19, 20, 21, 22, 23, 24, 26, 28, 33, and/or 34.

FIG. 36 is a block diagram of an example implementation of a first example multi-core processor 3600 including example DLBs 3602. In this example, the first multi-core processor 3600 is represented as being included in a CPU package. In this example, one(s) of the DLBs 3602 can correspond to the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, and/or the DLB 3320 of FIGS. 33-34. In this example, the first multi-core processor 3600 is hardware. For example, the first multi-core processor 3600 can be implemented by one or more integrated circuits, logic circuits, microprocessors, GPUs, DSPs, or controllers from any desired family or manufacturer.

In this example, the first multi-core processor 3600 is a multi-core CPU including example CPU cores 3604. For example, the first multi-core processor 3600 can be included in one or more of the DUs 122 of FIG. 1, one or more of the CUs 124 of FIG. 1, etc. In such examples, the first multi-core processor 3600 can be an example implementation of the processor 201 of FIG. 2, the processor 308 of FIG. 3, the processor 406 of FIG. 4, etc.

In the illustrated example of FIG. 36, the first multi-core processor 3600 is a semiconductor based (e.g., silicon based) device. In this example, the first multi-core processor 3600 includes at least a first example semiconductor die 3606, a second example semiconductor die 3608, and a third example semiconductor die 3610. In this example, the first semiconductor die 3606 is a CPU die that includes a first set of the CPU cores 3604 and a first instance of the DLB 3602. In this example, the second semiconductor die 3608 is a CPU die that includes a second set of the CPU cores 3604 and a second instance of the DLB 3602. In this example, the third semiconductor die 3610 is an I/O die that includes other example circuitry 3612 (e.g., memory, logic circuitry, etc.) to facilitate operation of the first multi-core processor 3600. Alternatively, one or more of the semiconductor dies 3606, 3608, 3610 may include more than one instance of the DLB 3602, fewer or more CPU cores 3604, fewer or more other circuitry 3612, etc., and/or a combination thereof.

In the illustrated example of FIG. 36, the DLB 3602 is hardware. For example, the DLB 3602 can be implemented by one or more analog or digital circuit(s), logic circuits, programmable processor(s), programmable controller(s), GPU(s), DSP(s), ASIC(s), PLD(s), and/or FPLD(s). Alternatively, the DLB 3602 may be implemented by hardware, software, and/or firmware.

In the illustrated example of FIG. 36, the DLB 3602 is in the uncore of the first semiconductor die 3606 and the second semiconductor die 3608. In this example, the DLBs 3602 is/are in communication with corresponding one(s) of the CPU cores 3604. For example, the DLB 3602 can enqueue data (e.g., a data pointer or other identifying data associated with data stored in memory, hardware, etc.) from a data producer (e.g., a NIC) and dequeue the data to one(s) of the CPU cores 3604 for processing. For example, the data can be stored in random access memory (RAM) or any other type of memory in hardware. In such examples, the data can be stored in the first multi-core processor 3600 or external to the first multi-core processor 3600. The pointer can correspond to a data packet (e.g., a network data packet) obtained by a NIC or other network interface. Advantageously, the CPU cores 3604 can offload scheduling-related tasks to the DLB 3602 and, thus, increase availability of the CPU cores 3604 for additional computing tasks.

Figure 37:
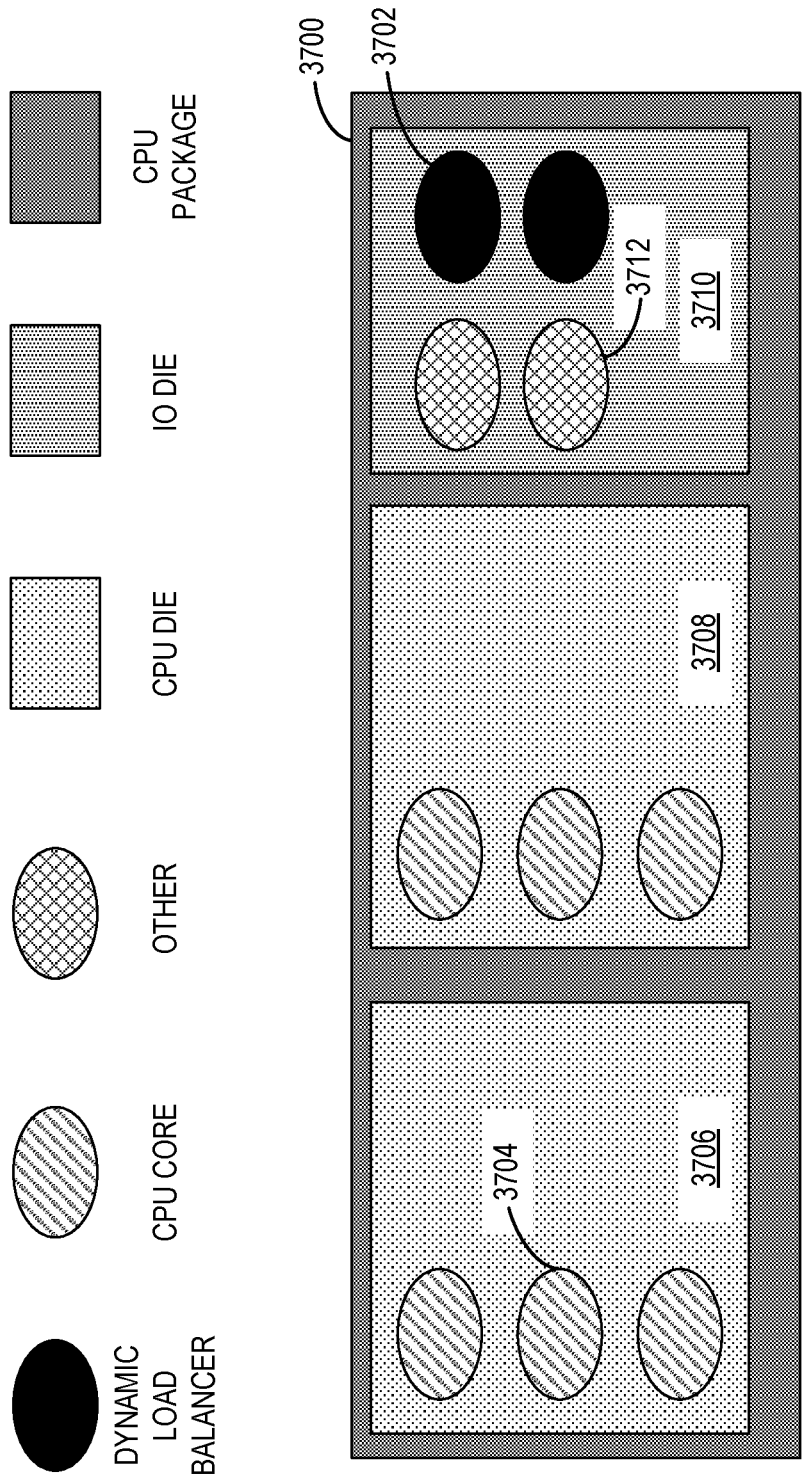
FIG. 37 is a block diagram of another example implementation of an example multi-core processor including ones of the DLBs of FIGS. 2-6, 18, 19, 20, 21, 22, 23, 24, 26, 28, 33, and/or 34.

FIG. 37 is a block diagram of an example implementation of a second example multi-core processor 3700 including example DLBs 3702. In this example, the second multi-core processor 3700 is represented as being included in a CPU package. In this example, one(s) of the DLBs 3702 can correspond to the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, and/or the DLB 3602 of FIG. 36. In this example, the second multi-core processor 3700 is hardware. For example, the second multi-core processor 3700 can be implemented by one or more integrated circuits, logic circuits, microprocessors, GPUs, DSPs, or controllers from any desired family or manufacturer.

In this example, the second multi-core processor 3700 is a multi-core CPU including example CPU cores 3704. For example, the second multi-core processor 3700 can be included in one or more of the DUs 122 of FIG. 1, one or more of the CUs 124 of FIG. 1, etc. In such examples, the second multi-core processor 3700 can be an example implementation of the processor 201 of FIG. 2, the processor 308 of FIG. 3, the processor 406 of FIG. 4, etc.

In the illustrated example of FIG. 37, the second multi-core processor 3700 is a semiconductor based (e.g., silicon based) device. In this example, the second multi-core processor 3700 includes at least a first example semiconductor die 3706, a second example semiconductor die 3708, and a third example semiconductor die 3710. In this example, the first semiconductor die 3706 is a CPU die that includes a first set of the CPU cores 3704. In this example, the second semiconductor die 3708 is a CPU die that includes a second set of the CPU cores 3704. In this example, the third semiconductor die 3710 is an I/O die that includes other example circuitry 3712 (e.g., memory, logic circuitry, etc.) to facilitate operation of the first multi-core processor 3600. In this example, the third semiconductor die 3710 includes two instances of the DLB 3702. In some examples, one or more of the semiconductor dies 3706, 3708, 3710 may include more than one instance of the DLB 3702, fewer or more CPU cores 3704, fewer or more other circuitry 3712, etc., and/or a combination thereof.

In the illustrated example of FIG. 37, the DLB 3702 is hardware. For example, the DLB 3702 can be implemented by one or more analog or digital circuit(s), logic circuits, programmable processor(s), programmable controller(s), GPU(s), DSP(s), ASIC(s), PLD(s), and/or FPLD(s). In some examples, the DLB 3702 may be implemented by hardware, software, and/or firmware.

In the illustrated example of FIG. 37, the DLB 3702 is/are in communication with corresponding one(s) of the CPU cores 3704. For example, the DLB 3702 can enqueue data (e.g., a data pointer or other identifying data associated with data stored in memory, hardware, etc.) from a data producer (e.g., a NIC) and dequeue the data to one(s) of the CPU cores 3704 for processing. For example, the data can be stored in RAM or any other type of memory in hardware. In such examples, the data can be stored in the second multi-core processor 3700 or external to the second multi-core processor 3700. The pointer can correspond to a data packet (e.g., a network data packet) obtained by a NIC or other network interface. Advantageously, the CPU cores 3704 can offload scheduling-related tasks to the DLB 3702 and, thus, increase availability of the CPU cores 3704 for additional computing tasks.

Figure 38:
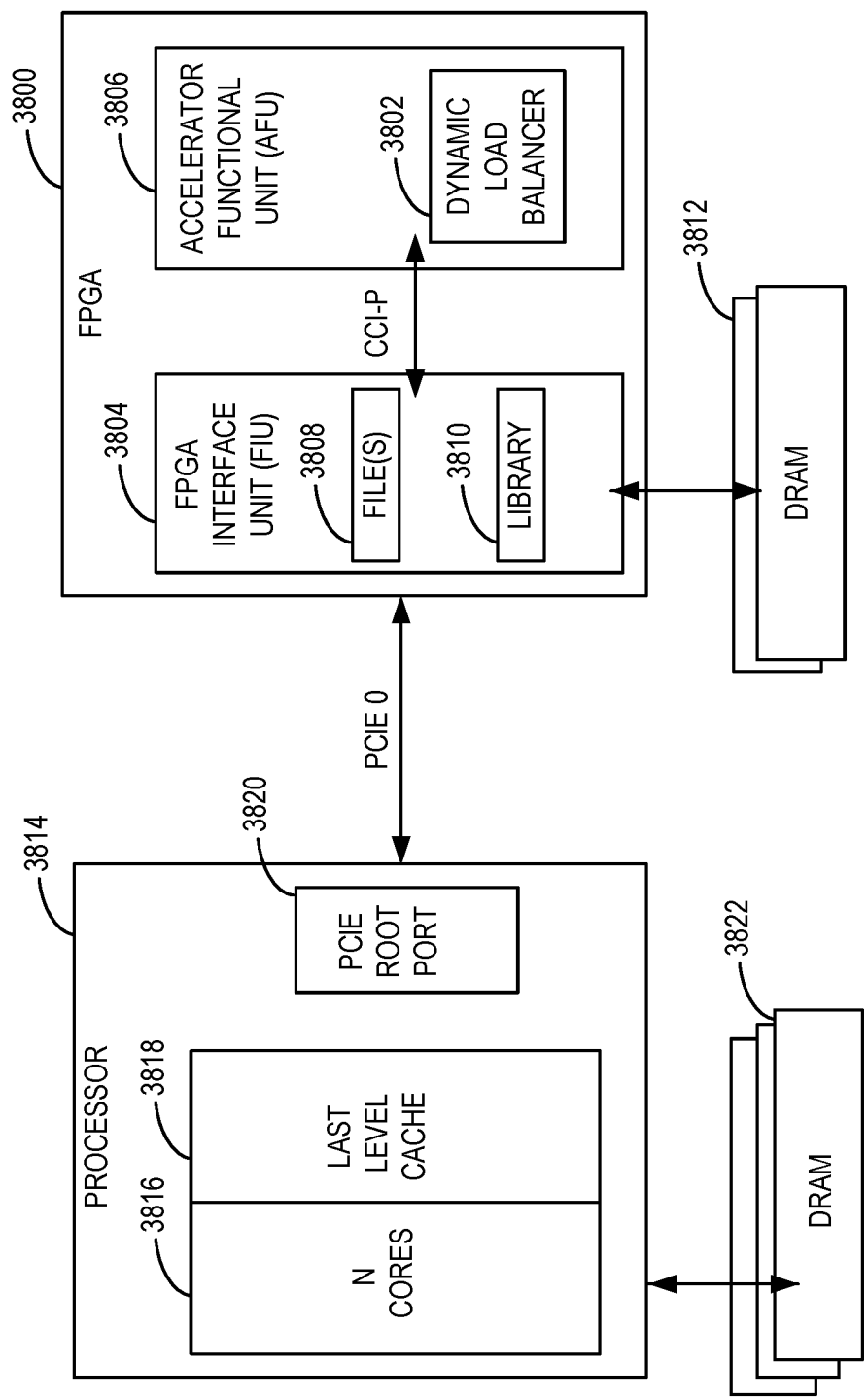
FIG. 38 is an illustration of an example multi-core processor in communication with an example field programmable gate array (FPGA) that implements the DLB of FIGS. 2-6, 18, 19, 20, 21, 22, 23, 24, 26, 28, 33, and/or 34.

FIG. 38 is an illustration of an example multi-core processor in communication with an example field programmable gate array (FPGA) 3800 that implements an example DLB 3802, such as the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG.

23, the DLB 2402 of FIG. 24, the DLB 2602 of FIG. 26, the DLB 2802 of FIG. 28, the DLB 3320 of FIGS. 33-34. In this example, the FPGA 3800 includes an example FPGA interface unit (FIU) 3804 and an example accelerator functional unit (AFU) 3806, which implements the DLB 3802. In this example, the FIU 3804 is in communication with the AFU 3806 via a core cache interface (CCI-P). In this example, the FIU 3804 executes output file(s) 3808, such as Very High speed Integrated Circuit Hardware Description Language (VHSIC-HDL or VHDL) (e.g., a VHDL output file having an extension .VHO) and/or example libraries 3810 (e.g., a FPGA library having an extension .VA). In this example, the FPGA 3800 is in communication with first example DRAM 3812.

In the illustrated example of FIG. 38, the FPGA 3800 is in communication with an example processor 3814 via a Peripheral Component Interconnect Express (PCIE) interface. The processor 3814 of the illustrated example includes N number of example cores 3816, an example last level cache 3818, and an example PCIE root port 3820. In this example, the processor 3814 is in communication with second example DRAM 3822. In this example, the first DRAM 3812 is local memory (e.g., local to the FPGA 3800) and the second DRAM 3822 is host memory.

In example operation, the processor 3814 can offload scheduling tasks to the DLB 3802. For example, the DLB 3802 can enqueue data, such as a data pointer that identifies a data packet stored in the second DRAM 3822. In such examples, the DLB 3802 can dequeue the data pointer to a consumer queue that may be stored in the first DRAM 3812, the last level cache 3818, and/or the second DRAM 3822. For example, a first core of the cores 3816 of the processor 3814 can poll a consumer queue stored in the last level cache 3818 and determine that there is a new event (e.g., an event having the consumer QE format depicted in FIG. 35) stored in the consumer queue associated with the first core. In such examples, the first core can retrieve the data packet stored in the second DRAM 3822 that corresponds to the data pointer referenced in the new event. The first core can execute an operation on the data packet and, responsive to completing the operation, can return the processed data packet to the second DRAM 3822. Responsive to the completion, the first core can enqueue the completion to the DLB 3802 to notify the DLB 3802 that the processing of the data packet has been completed. In some examples, the DLB 3802 can dequeue another event to the consumer queue to invoke one of the cores 3816 to execute another operation on the data packet or a different data packet.

Figure 39:
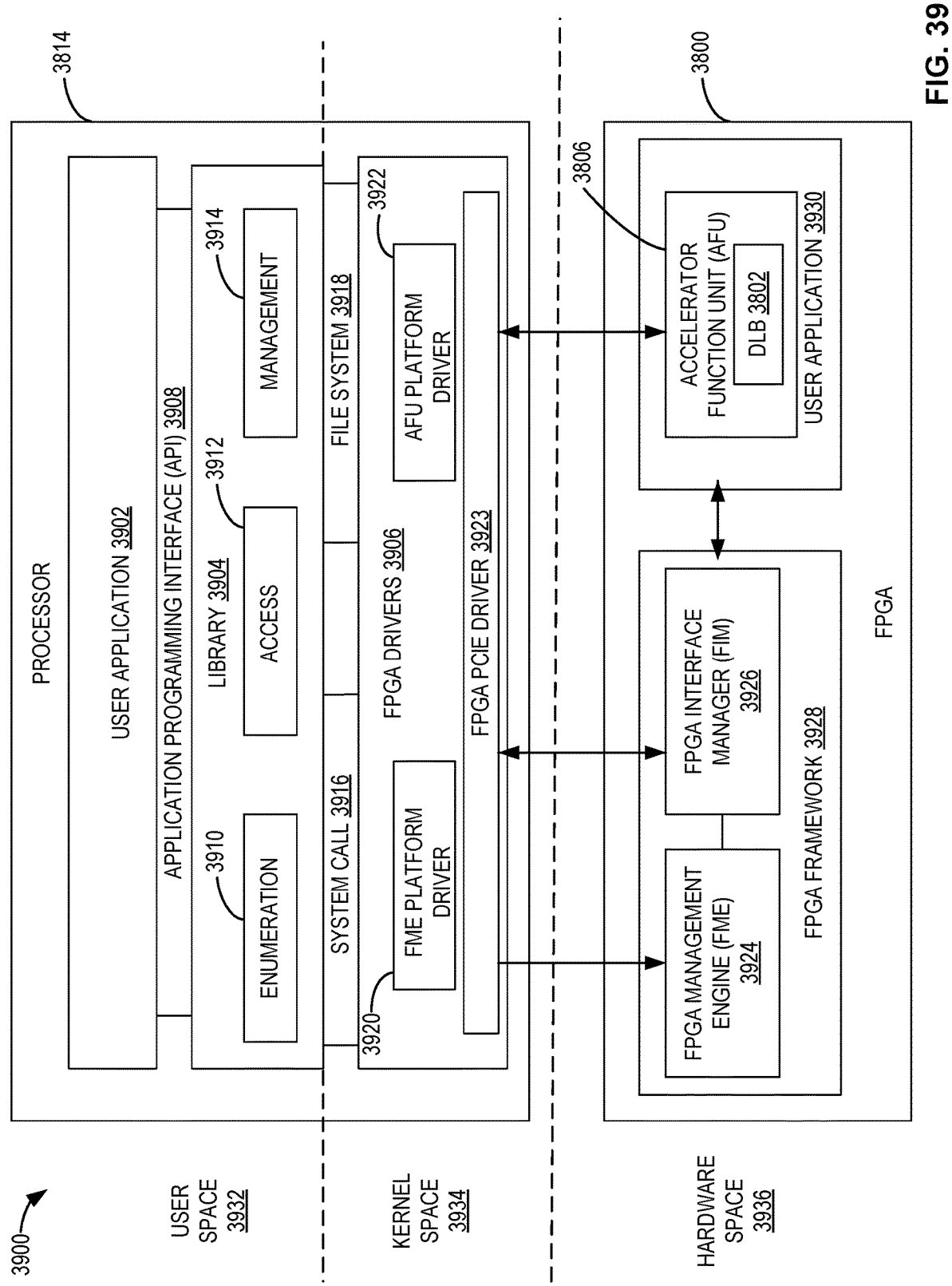
FIG. 39 is an illustration of an example system including the example multi-core processor and the example FPGA of FIG. 38.

FIG. 39 is a system 3900 including the processor 3814 and the FPGA 3800 of FIG. 38. In this example, the processor 3814 includes an example user application 3902, an example library 3904, and example FPGA drivers 3906. The user application 3902 can access the library 3904 via an example application programming interface (API) 3908. The library 3904 includes functions that may implement at least enumeration operations 3910, access operations 3912, and management operations 3914. In this example, the enumeration operations 3910, the access operations 3912, the management operations 3914, etc., of the library 3904 can invoke the FPGA drivers 3906 via system calls (e.g., an IOCTL system call) 3916 and/or a file system (e.g., a sysfs file system) 3918.

In this example, the FPGA drivers 3906 include an example FPGA management engine (FME) platform driver 3920 and an example accelerator function unit (AFU) platform driver 3922. In this example, the processor 3814 can enumerate an FME 3924 of the FPGA 3800 and/or an FPGA interface manager (FIM) 3926 via the FME platform driver 3920 and an FPGA PCIE driver 3923. For example, the FIM 3926 can implement the FIU 3804 of FIG. 38. In this example, the processor 3814 can enumerate the AFU 3806 of FIG. 38 via the AFU platform driver 3922 and the FPGA PCIE driver 3923. In such examples, the processor 3814 can enumerate the DLB 3802 implemented by the AFU 3806 via the AFU platform driver 3922.

In the illustrated example of FIG. 39, the FME 3924 and the FIM 3926 are representative of an FPGA framework 3928. The FPGA framework 3928 includes and/or otherwise implements functional blocks delivered by a manufacturer of the FPGA 3800 to facilitate operation of the FPGA 3800. For example, the FPGA framework 3928 can abstract the I/O of the FPGA 3800 via APIs defined by the FPGA framework 3928. In such examples, the I/O can include and/or otherwise implement I/O logic in connection with peripherals such as PCI, SDRAM, and quad small form-factor pluggable (QSFP+) logic. In this example, the AFU 3806 is representative of a user application 3930. For example, the user application 3930 includes and/or otherwise implements code generated by a user of the FPGA 3800.

In this example, the user application 3902, the API 3908, and the library 3904 are representative of a user space 3932 of the system 3900. In this example, the system call 3916, the file system 3918, the FPGA drivers 3906, and the FPGA PCIE driver 3923 are representative of a kernel space of the system 3900. In this example, the FPGA 3800 is representative of a hardware space 3936 of the system 3900.

Figure 40:
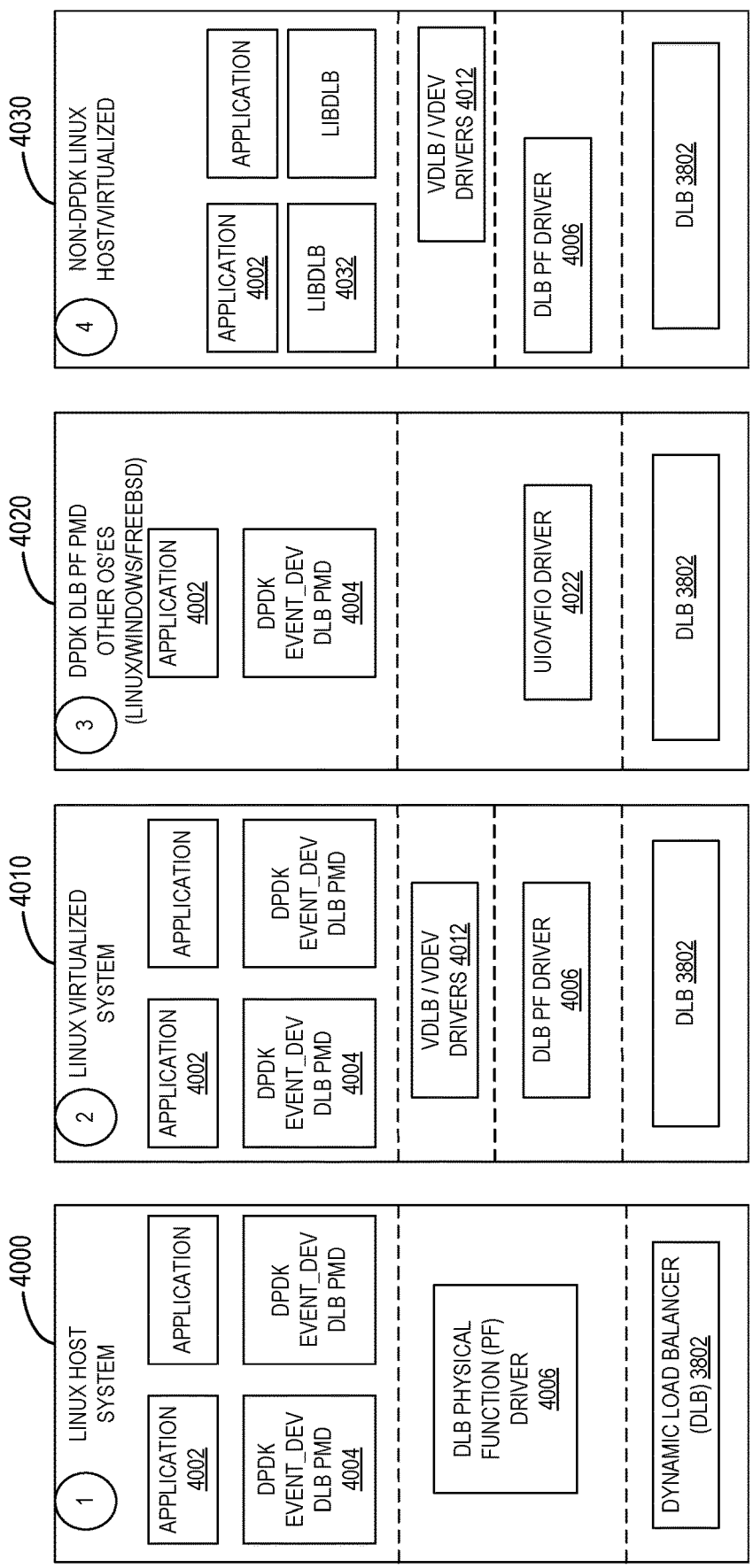
FIGS. 40A-40D depict different example implementations of the system of FIG. 39.

FIGS. 40A-40D depict different example implementations of the system of FIG. 39. FIG. 40A depicts a first example system 4000 having a Linux® host. The first system 4000 includes example host applications 4002, example data plane development kit (DPDK) EVENT_DEV DLB poll mode drivers (PMD) 4004, an example DLB physical function (PF) driver 4006, and the DLB 3802 of FIGS. 38 and/or 39. For example, the DPDK EVENT_DEV DLB PMD 4004 can correspond to the library 3904 or portion(s) thereof. In this example, the DLB PF driver 4006 can correspond to the AFU platform driver 3922 of FIG. 39.

FIG. 40B depicts a second example system 4010 having a virtualized Linux® host. The second system 4010 includes the application 4002, the DPDK EVENT_DEV DLB PMD 4004, the DLB PF driver 4006, and the DLB 3802 of FIG. 40A. The second system 4010 includes example virtualization drivers 4012, such as virtualized DLB driver (VDLB), a virtualized EVENT_DEV driver (VDEV), etc. For example, the virtualization drivers 4012 can correspond to a virtualization of the DLB PF driver 4006. Advantageously, the second system 4010 can virtualize and/or otherwise abstract the DLB 3802 or portion(s) thereof to be used by the application 4002 to complete workloads. In such examples, the application 4002 can access and/or otherwise invoke the DLB 3802 to complete workload(s) via the virtualization drivers 4012, which, in turn, invoke the DLB PF driver 4006 to communicate and/or otherwise instruct the DLB 3802 to complete the workload(s). Advantageously, the second system 4010 can expose the virtualization of the DLB 3802 to the applications 4002 of the second system 4010 or application(s) in a different system (e.g., the first system 4000 of FIG. 40A).

FIG. 40C depicts a third example system 4020 having a Linux® host or a host having a different operating system than Linux® (e.g., Microsoft® Windows®, FreeBSD®, etc.). The third system 4020 includes the application 4002 of FIGS. 40A-40B, the DPDK EVENT_DEV DLB PMD 4004 of FIGS. 40A-40B, example drivers 4022, such as a user space I/O (UIO) driver and a virtual function I/O (VFIO) driver, and the DLB 3802 of FIGS. 40A-40B.

FIG. 40D depicts a fourth example system 4030 having a non-DPDK Linux® host or a virtualization of the non-DPDK Linux® host. The fourth system 4030 includes the application 4002 of FIGS. 40A-40C, example DLB libraries (LIBDLB) 4032, the virtualization drivers 4012 of FIG. 40B, the DLB PF driver 4006 of FIG. 40B, and the DLB 3802 of FIGS. 40A-40C.

Figure 41:
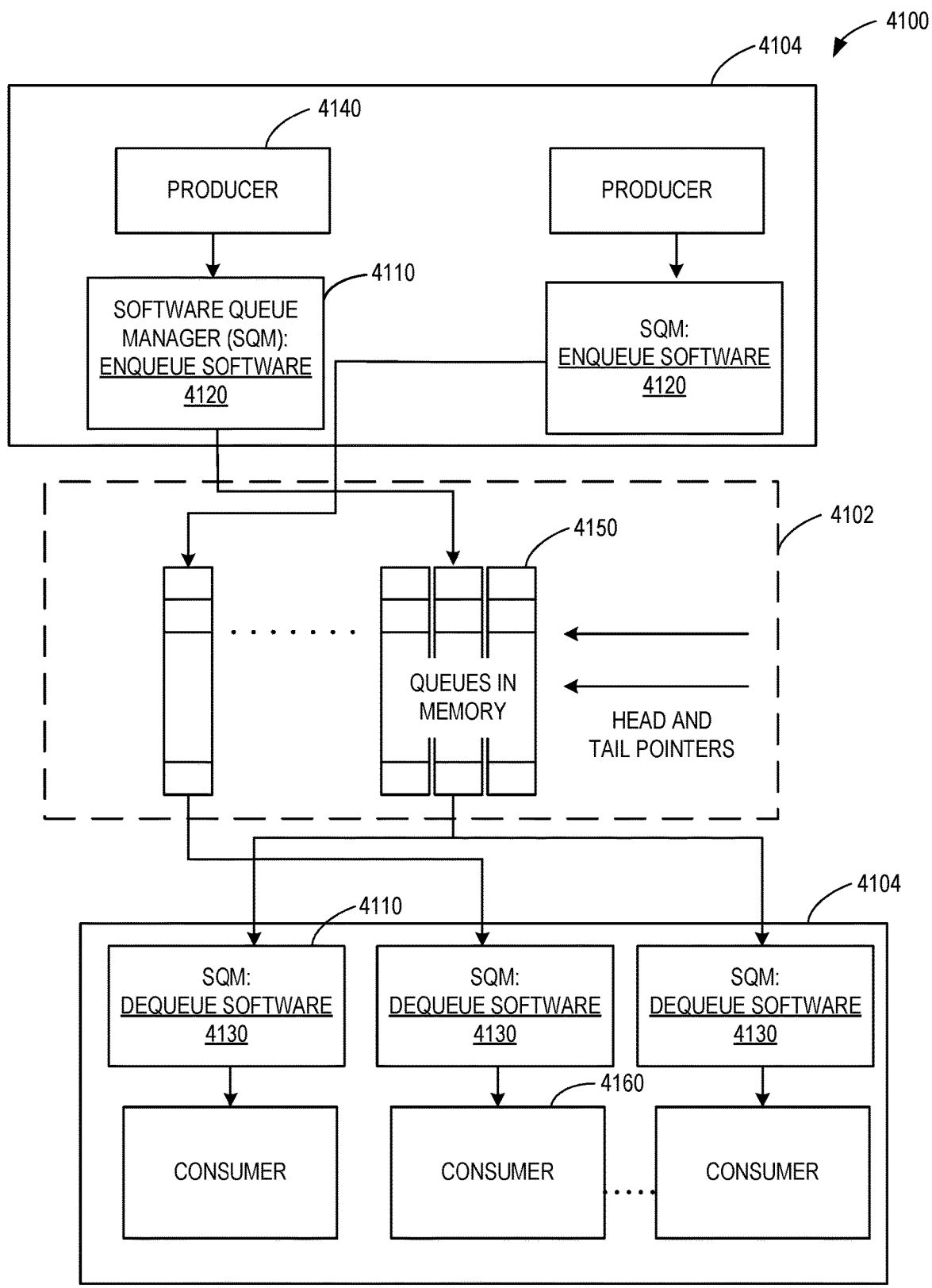
FIG. 41 is an illustration of an example producer and consumer scheduling system executed using system memory.

FIG. 41 is an illustration of an example producer and consumer scheduling system 4100 including an example software queue manager (SQM) 4110. In this example, the system 4100 includes first example hardware 4102 and second example hardware 4104. The first hardware 4102 can correspond to memory (e.g., non-volatile memory, volatile memory, etc., in a server rack). The second hardware 4104 can correspond to a network interface card (NIC) (e.g., a NIC in the server rack).

In the illustrated example of FIG. 41, the SQM 4110 includes example enqueue software 4120 and example dequeue software 4130. The enqueue software 4120 can obtain data from an example producer 4140 and determine (e.g., statically determine, randomly determine, etc.) one of a plurality of example queues 4150 to place or enqueue the data. The dequeue software 4130 can retrieve or dequeue the data from one of the plurality of queues 4150 and transmit the data to an example consumer 4160. The data can correspond to a pointer or other identifying data associated with data stored in the first hardware 4102. For example, the pointer can be stored in RAM or any other type of memory in hardware different from the second hardware 4104. The pointer can reference, identify, and/or otherwise correspond to a data packet (e.g., a network data packet) obtained by a NIC or other network interface.

In the illustrated example of FIG. 41, the producer 4140 and the consumer 4160 are cores (e.g., core logic circuits, processing cores, etc.) of a hardware processor of the second hardware 4104. The producer 4140 is an agent that can transmit a data pointer to the enqueue software 4120 to be placed onto one of the queues 4150. For example, the producer 4140 can correspond to a software abstraction that can drive a corresponding hardware processing core to open a first hardware thread to initiate execution of first data stored in the first hardware 4102, where the first data is referenced by a first data pointer. The producer 4140 can direct the first hardware thread to transmit the first data pointer to the enqueue software 4120 to schedule execution of the first data.

In the illustrated example of FIG. 41, the consumer 4160 is another agent that can retrieve the first data pointer from the one of the queues 4150. For example, the consumer 4160 can correspond to a software abstraction that can drive a corresponding hardware processing core to open a second hardware thread to retrieve the first data pointer from the first one of the queues 4150, retrieve the first data from a memory location of the first hardware 4102 referenced by the first data pointer, and execute one or more computing tasks associated with the first data and/or, more generally process the first data.

In the illustrated example of FIG. 41, the SQM 4110 manages the queues 4150 to maintain a work list in order, where the work list corresponds to a set of the data pointers stored in the queues 4150. The data pointers can be stored as a head pointer, a tail pointer, etc. The tail pointer can correspond to a next position in the queue 4150 that the enqueue software 4120 can write to and the head pointer can correspond to a next one of the stored data pointers in the queue 4150 that the dequeue software 4130 can read from. The enqueue software 4120 and the dequeue software 4130 can use the head and tail pointers to check for a state of the queues 4150, such as whether a queue is empty, not empty, full, etc.

The system 4100 of the illustrated example of FIG. 41 implements the scheduling of computing tasks to be executed by the consumers 4160 in software. In some instances, the system 4100 can exhibit algorithmic and performance limitations including impact of lock latency, lock contention, memory latency, cache and snooping behaviors, and polling of multiple queues. Such limitations of the system 4100 can lead to insufficient core compute cycles being available to meet real-time requirements for more complicated queue configurations and/or more complicated scheduling decisions such as having thousands of queues to manage, determining priority between queues, and facilitating consumer load balancing.

Figure 51:
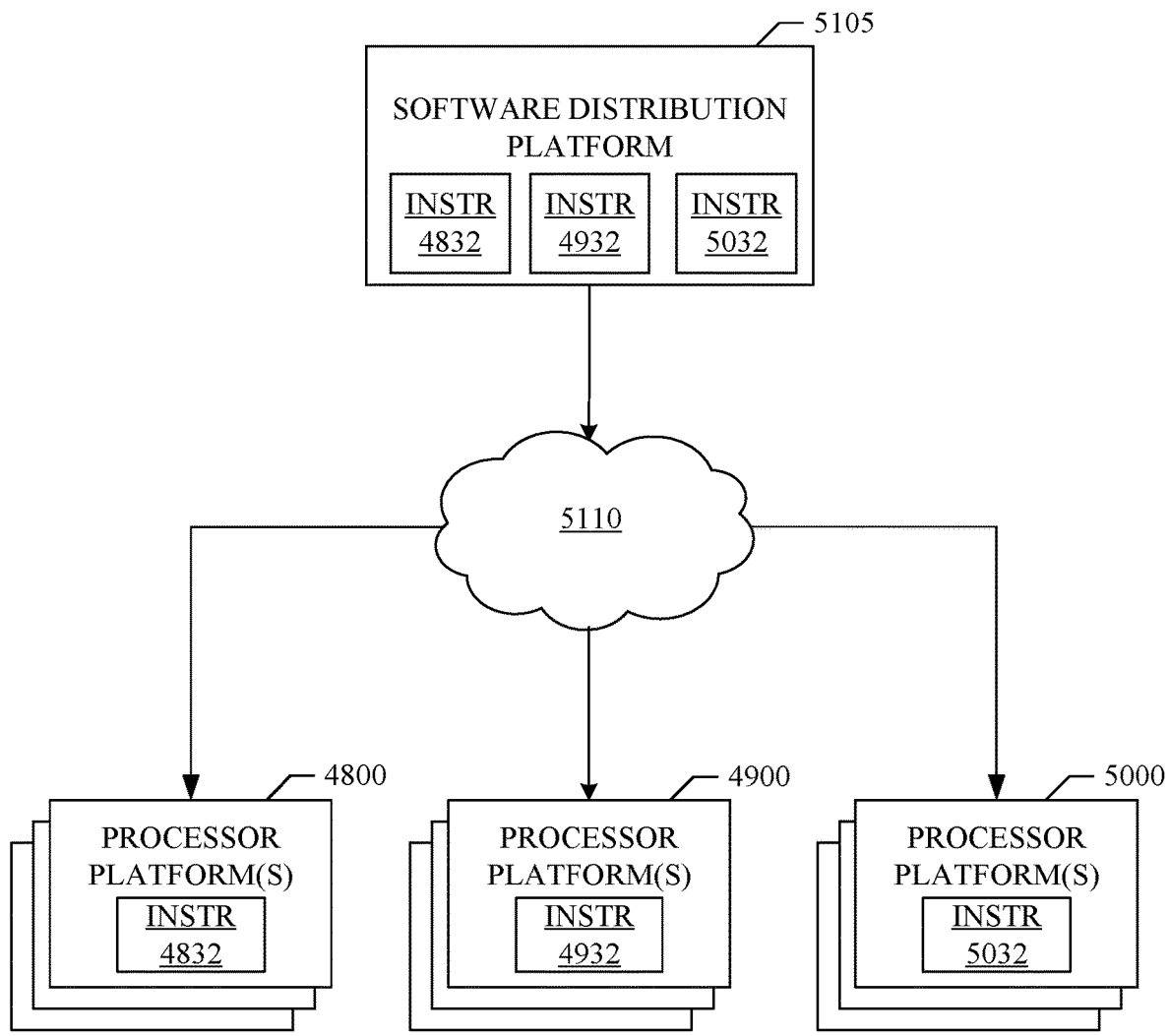
FIG. 51 is a block diagram of an example software distribution platform to distribute software (e.g., software corresponding to the example computer readable instructions of FIGS. 42-46) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

Flowcharts representative of example hardware logic, machine readable instructions, hardware implemented state machines, and/or any combination thereof for implementing a DLB, such as the DLB 1800 of FIG. 18 are shown in FIGS. 42-46 and/or a software distribution platform, such as the software distribution platform 5105 of FIG. 51. The machine readable instructions may be one or more executable programs or portion(s) of an executable program for execution by a computer processor and/or processor circuitry, such as the processor 4812, 4912, 5012 shown in the example processor platform 4800, 4900, 5000 discussed below in connection with FIGS. 48, 49, and/or 50. The program may be embodied in software stored on a non-transitory computer readable storage medium such as a CD-ROM, a floppy disk, a hard drive, a DVD, a Blu-ray disk, or a memory associated with the processor 4812, 4912, 5012, but the entire program and/or parts thereof could alternatively be executed by a device other than the processor 4812, 4912, 5012 and/or embodied in firmware or dedicated hardware. Further, although the example program is described with reference to the flowcharts illustrated in FIGS. 42-46 and/or 47, many other methods of implementing the example DLB 1800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 42-46 and/or 47 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 42:
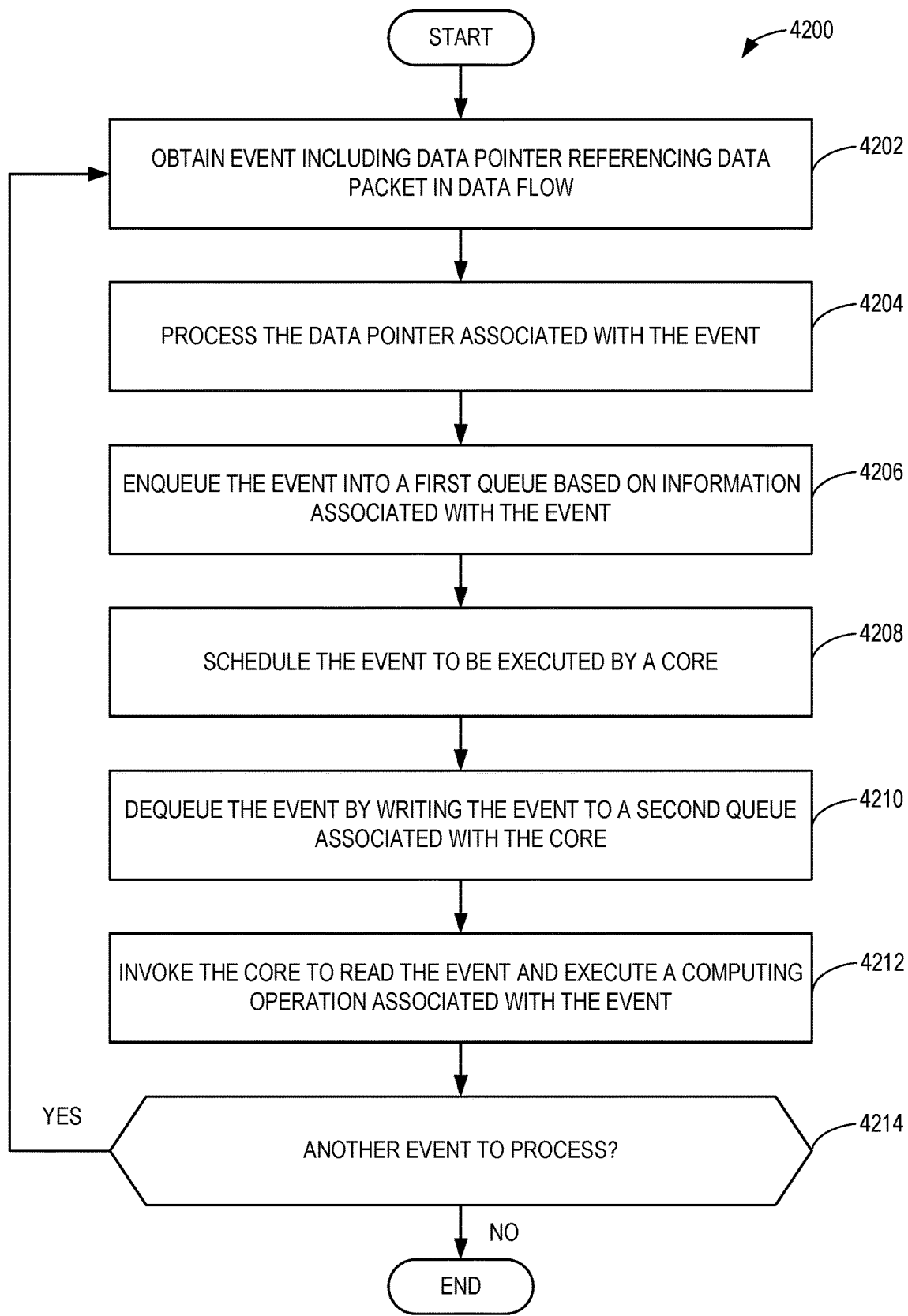
FIG. 42 is a flowchart representative of example machine readable instructions that may be executed to implement the DLB of FIGS. 2-6, 10, 14, 16, 18-24, 26, 28, 33, 34, and/or 36-40D to dynamically load balance a data flow.

FIG. 42 is a flowchart representative of example machine readable instructions 4200 that may be executed to implement a DLB, such as the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS. 38-40D to dynamically load balance a data flow. For example, the DLB 1800 of FIG. 18 can be included in and/or otherwise be implemented by one of the DUs 122 of FIG. 1, one of the CUs 124 of FIG. 1, etc. In such examples, the DLB 1800 can execute the example machine readable instructions 4200 of FIG. 42 to invoke the one of the DUs 122, the one of the CUs 124, etc., to accelerate scheduling of computing tasks (e.g., 5G cellular operations) in the multi-core computing environment 100 of FIG. 1.

The example machine readable instructions 4200 of FIG. 42 begin at block 4202, at which the DLB 1800 obtains an event including a data pointer referencing a data packet in a packet flow. For example, the event controller 4220 (FIG. 42) can obtain an event, such as a QE, at a producer port (e.g., one of the producer ports 2210 of FIG. 22), where the event can include a data pointer referencing a data packet stored in main memory (e.g., volatile memory of a server, non-volatile memory of the server, etc.). In such examples, the data pointer can reference the data packet of the data flow 214 of FIG. 2. In some such examples, the event can have a format based on the producer HCW depicted in the example of FIG. 35.

At block 4204, the DLB 1800 processes the data pointer associated with the event. For example, the event controller

1820 can inspect the CMD, the MISC, the LOCKID, the Q_INFO, the SW, etc., fields of the event. In such examples, the event controller 1820 can determine based on the fields of the event that the data pointer can be held in a reorder buffer, processed by one or both stages of a two-stage priority arbiter, etc., and/or a combination thereof based on the data included in the event.

At block 4206, the DLB 1800 enqueues the event into a first queue based on information associated with the event. For example, the queue controller 1830 (FIG. 18) can enqueue an identifier (e.g., a data pointer) included in the event to a queue, such as one of the queues 2008 of FIG. 20, implemented with circuitry, such as the DLB 2002 of FIG. 20, where the identifier is associated with a data packet of a data flow.

At block 4208, the DLB 1800 schedules the event to be executed by a core. For example, the arbitration controller 1860 (FIG. 18) can read the data pointer from the one of the queues 2008 and identify one of the consumer cores 2006 of FIG. 20 to process the data packet referenced by the data pointer. In such examples, the arbitration controller 1860 can assign the data pointer in the one of the queues 2008 to a first one of the consumer cores 2006. For example, the arbitration controller 1860 can allocate the data pointer in the one of the queues 2008 to the first one of the consumer cores 2006.

At block 4210, the DLB 1800 dequeues the event by writing the event to a second queue associated with the core. For example, the arbitration controller 1860 can dequeue the data pointer from the one of the queues 2008 and write the data pointer to one of the consumer queues 2016 of FIG. 20.

At block 4212, the DLB 1800 invokes the core to read the event and execute a computing operation associated with the event. For example, the arbitration controller 1860 can invoke one of the consumer cores 2006 to execute one or more computing tasks, operations, etc., on a data packet associated with the data pointer in response to the arbitration controller 1860 writing the data pointer to the one of the consumer queues 2016 that is associated with the one of the consumer cores 2006. In such examples, in response to an execution of the one or more computing tasks, the one or more operations, etc., on the data packet with the one of the consumer cores 2006, the one of the consumer cores 2006 writes a completion byte in an event. In some such examples, the one of the consumer cores 2006 enqueues the event with the completion byte to the DLB 2002. The DLB 2002 can provide the data pointer to a second one of the consumer cores 2006 to cause the second one of the consumer cores 2006 to distribute the data packet.

At block 4214, the DLB 1800 determines whether there is another event to process. For example, the event controller 1820 can determine whether a new event has been received at the front-end logic circuitry of the DLB 2202, such as the producer port 2210. If, at block 4214, the DLB 1800 determines that there is another event to process, control returns to block 4202 to obtain another event, otherwise the example machine readable instructions 4200 of FIG. 42 conclude.

Figure 43:
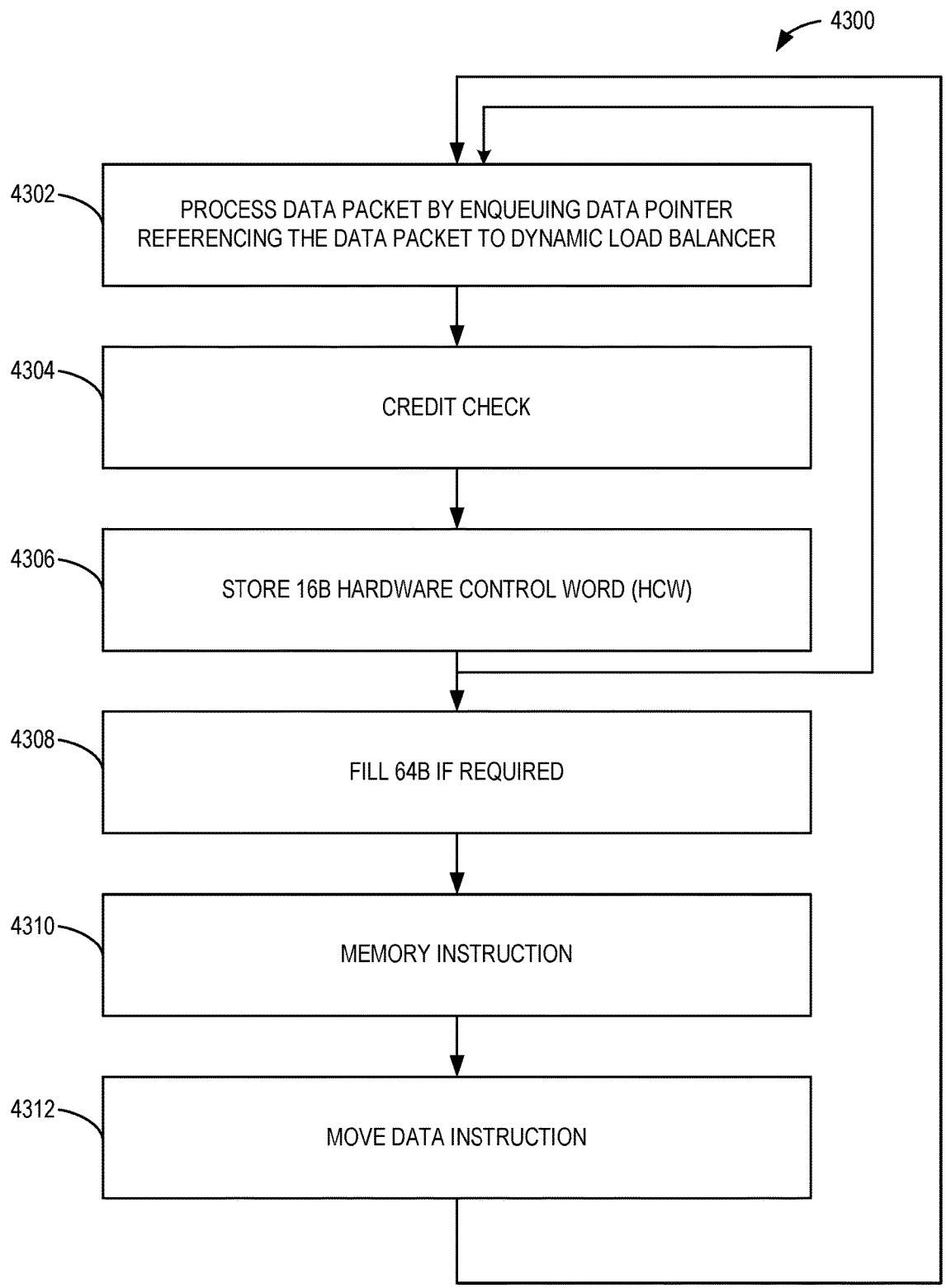
FIG. 43 is a flowchart representative of example machine readable instructions that may be executed to implement the DLB of FIGS. 2-6, 10, 14, 16, 18-24, 26, 28, 33, 34, and/or 36-40D to move example data instructions.

FIG. 43 is a flowchart representative of example machine readable instructions 4300 that may be executed to implement a DLB, such as the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS. 38-40D to dynamically load balance a data flow.

The example machine readable instructions 4300 of FIG. 43 begin at block 4302, at which the DLB 1800 processes a data packet by enqueuing a data pointer referencing the data packet to a dynamic load balancer. For example, the data packet can be included in and/or otherwise associated with a data flow of network communications. For example, one of the DUs 122 of FIG. 1, one of the CUs 124 of FIG. 1, etc., can process a data packet by invoking the DLB 1800 to inspect an event associated with the data packet to determine a priority, determine whether reordering of the packet and/or associated packets are needed, etc., based on data included in the event. In such examples, the event controller 1820 (FIG. 18) can inspect the event.

At block 4304, the DLB 1800 executes a credit check. For example, the event controller 1820 can spend a credit to enqueue an event associated with the packet. In such examples, the event controller 1820 can execute a credit check as described above in connection with the fifth workflow 3200 of FIG. 32.

At block 4306, the DLB 1800 stores a 16 B hardware control word (HCW). For example, the event controller 1820 can generate a 16 B HCW based on the producer HCW format of the illustrated example of FIG. 35. In such examples, the event controller 1820 can store the 16 B HCW in the storage 1880 (FIG. 18). In response to storing the 16 B HCW, control returns to block 4302 to process another data packet. In the illustrated example of FIG. 43, control returns to block 4302 from block 4306 four times to fill a 64 B storage unit at block 4308. In some examples, control may not return to block 4302 while, in other examples, control may return a different number of times than four.

In response to filling the 64 B storage unit at block 4308, the DLB 1800 executes a memory instruction at block 4310. For example, the event controller 1820 can execute a LFENCE, a MFENCE, a SFENCE, etc., instruction.

At block 4312, the DLB 1800 executes a move data instruction. For example, the DLB 1800 can move a double quadword from a source operand to a destination operand by executing a MOVDQA instruction. In response to executing the move data instruction at block 4312, control returns to block 4302 to process another data packet.

Figure 44:
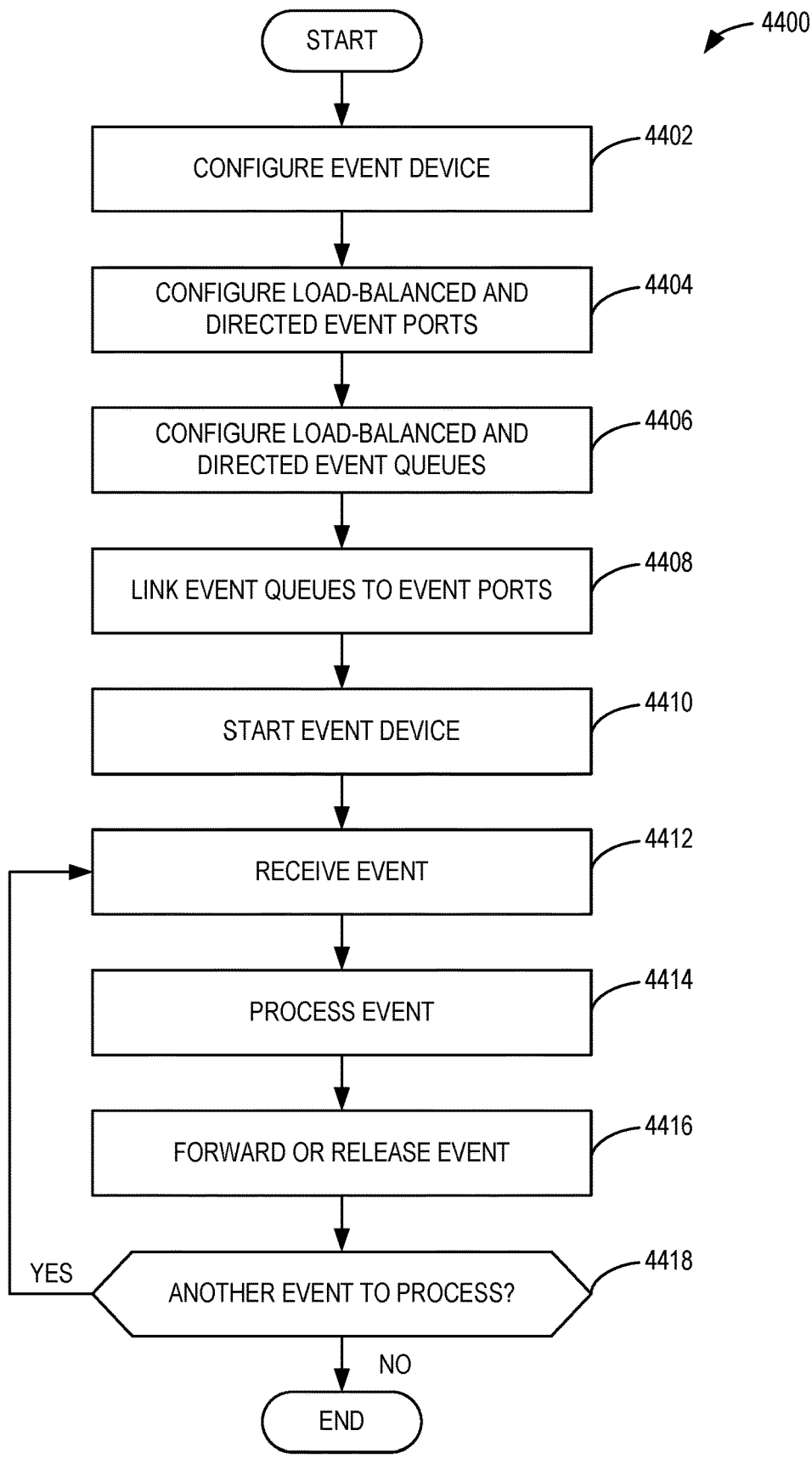
FIG. 44 is a flowchart representative of example machine readable instructions that may be executed to implement the DLB of FIGS. 2-6, 10, 14, 16, 18-24, 26, 28, 33, 34, and/or 36-40D to dynamically load balance a data flow based on events.

FIG. 44 is a flowchart representative of example machine readable instructions 4400 that may be executed to implement a DLB, such as the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS. 38-40D to dynamically load balance a data flow based on events.

The example machine readable instructions 4400 of FIG. 44 begin at block 4402, at which the DLB 1800 configures an event device. For example, the event device can be the DLB 2202 of FIG. 22. In such examples, the configuration controller 1810 can configure a number of event ports (e.g., a number of the producer ports 2210 of FIG. 22), a number of event queues (e.g., a number of the queues 2214 of FIG. 22), a limit or threshold number of infight events in the DLB 2202 (e.g., a number of events that the DLB 2202 can process, a number of events that can be received by the DLB 2202 during a time interval, etc.), etc.

At block 4404, the DLB 1800 configures load balanced and directed event ports. For example, the configuration controller 1810 can configure the producer ports 2210 in communication with the first set of producer threads 2304 of FIG. 23 and the producer ports 2210 in communication with the second set of the producer threads 2304 of FIG. 23. In such examples, the configuration controller 1810 can configure an enqueue queue depth, a dequeue queue depth, a new event threshold, etc., associated with ports of the DLB 2202 of FIG. 22, the DLB 2302 of FIG. 23, etc. In some such examples, the configuration controller 1810 can configure an enqueue queue depth by configuring a depth (e.g., a number of QEs that can be queued) of the queues 2214. The configuration controller 1810 can configure a dequeue queue depth by configuring a depth of the consumer queues 2212 of FIG. 22. The configuration controller 1810 can configure a threshold number of new events that the producer ports 2210 and/or, more generally, the DLB 2202, can receive and process.

At block 4406, the DLB 1800 configures load-balanced and directed event queues. For example, the configuration controller 1810 can configure the producer ports 2210 in communication with the first set of producer threads 2304 of FIG. 23 and the producer ports 2210 in communication with the second set of the producer threads 2304 of FIG. 23. In such examples, the configuration controller 1810 can configure a scheduling type that a queue can support, re-order sequence numbers (for ordered scheduling), and/or atomic flows (for atomic scheduling). In some such examples, the configuration controller 1810 can configure the first queues 2308 of FIG. 23 as atomic queues, the second queues 2310 of FIG. 23 as non-atomic queues, and the third queues 2312 of FIG. 23 as direct queues.

At block 4408, the DLB 1800 links event queues to event ports. For example, the configuration controller 1810 can link first producer ports of the DLB 2302 of FIG. 23 configured as load balanced ports to one or more of the first queues 2308, second producer ports of the DLB 2302 configured as direct ports to one or more of the second queues 2310, etc. In such examples, the configuration controller 1810 establishes the links between event ports and event queues to determine which queues can schedule to which ports. For example, a load-balanced queue can be linked to any number of load-balanced ports, whereas a directed queue must be linked to a single port. In such examples, the configuration controller 1810 links QID 1 of the first queues 2308 to producer core E of the producer threads 2304 and links QID 0 and QID 3 of the first queues 2308 to producer core B of the producer threads 2304.

At block 4410, the DLB 1800 starts the event device. For example, the configuration controller 1810 can enable the DLB 2202 of FIG. 22, the DLB 2302 of FIG. 23, etc., to begin scheduling events. In such examples, the configuration controller 1810 can enable, trigger, and/or otherwise invoke the event controller 1820 (FIG. 18) to begin receiving events and scheduling the events for processing.

At block 4412, the DLB 1800 receives an event. For example, the event controller 1820 can receive an event from a port (e.g., one(s) of the producer ports 2210). In such examples, the event controller 1820 can receive zero or more events, depending on the number of events in a queue of the port (e.g., each of the producer ports 2210 may have a queue to receive events with and enqueue events to) and/or the maximum number of events the DLB 1800 can support as configured by the configuration controller 1810. In some such examples, the event controller 1820 can obtain an event via a polled mode of operation (e.g., one(s) of the producer ports 2210 polling one(s) of the producer threads 2206). Alternatively, the event controller 1820 may receive an event in response to a producer core, such as one(s) of the producer threads 2206 pushing the event to the one(s) of the producer ports 2210.

At block 4414, the DLB 1800 processes the event. For example, the event controller 1820 can extract data from the event and determine how to process the event based on the data. In such examples, the queue controller 1830 (FIG. 18) can enqueue the data into one of the queues 2214 of FIG. 22 based on the data. In some examples, the event controller 1820 processed the received events in order. For example, the type of processing on the received events depends on the queue identifier, the event type and/or sub event type fields included in the data of the event. For example, a multi-stage pipeline (e.g., an application with multiple operations, such as the application 2700 of FIG. 27) can have one queue per stage, such that the queue identifier of the event indicates which stage of processing to apply to the event. For example, a first queue of the queues 2214 of FIG. 22 can be allocated and/or otherwise assigned to effectuate processing of the RX classification operations 2702 of FIG. 27, a second queue of the queues 2214 can be allocated and/or otherwise assigned to effectuate processing of the pre-cryptographic operations 2704 of FIG. 27, etc.

At block 4416, the DLB 1800 forwards or releases the event. For example, the arbitration controller 1860 (FIG. 18) can forward the event to a worker core in the pool of worker cores 2606 to process an operation of the application 2700 of FIG. 27. In other examples, the arbitration controller 1860 can release the event to the second core 2608 for distribution in response to completing the application 2700 on the event.

At block 4418, the DLB 1800 determines whether there is another event to process. For example, the event controller 1820 can determine that another event has been received at the producer ports 2210. If, at block 4418, the DLB 1800 determines that another event has been received, control returns to block 4412 to receive the event, otherwise the example machine readable instructions 4400 of FIG. 44 conclude.

Figure 45:
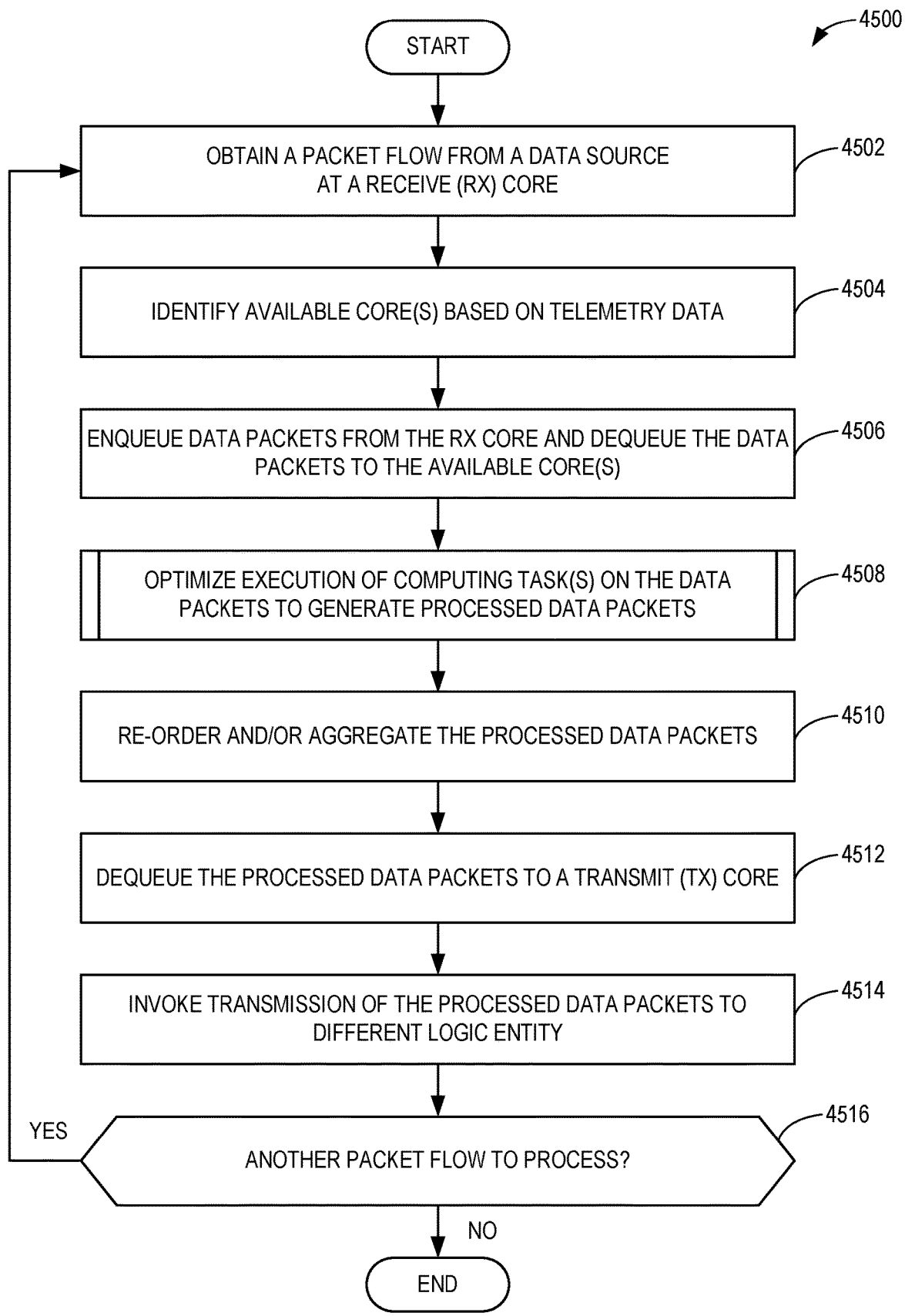
FIG. 45 is a flowchart representative of example machine readable instructions that may be executed to implement the DLB of FIGS. 2-6, 10, 14, 16, 18-24, 26, 28, 33, 34, and/or 36-40D to dynamically load balance a data flow.

FIG. 45 is a flowchart representative of example machine readable instructions 4500 that can be executed to implement a DLB, such as the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS. 38-40D to dynamically load balance a data flow.

The example machine readable instructions 4500 of FIG. 45 begin at block 4502, at which the DLB 1800 obtains a packet flow from a data source at a receive (RX) core. For example, the event controller 1820 (FIG. 18) can identify an incoming elephant flow from a data source, such as from one(s) of the devices 108, 110, 112, 114, 116 of the device environment 102 of FIG. 1 to be transmitted to the core network 106 and/or the cloud network 107 of FIG. 1. In such examples, the elephant flow can be received by the NIC 316 of FIG. 3. In some such examples, the NIC 316 can be included in and/or in communication with one(s) of the DUs 122 of FIG. 1. For example, the DUs 122 can receive the elephant flow from the RRUs 120. In such examples, the event controller 1820 can receive the data flow 306 from the producer core 310 of FIG. 3.

At block 4504, the DLB 1800 identifies available core(s) based on telemetry data. For example, the telemetry controller 1870 (FIG. 18) can identify that a first worker core, a second worker core, and a third worker core of the worker cores 412 of FIG. 4 are available based on a telemetry parameter, such as a core utilization percentage. In such examples, the telemetry controller 1870 can obtain utilization data from the worker cores 412 and determine the processing core utilizations 802 of FIG. 8 based on the utilization data.

At block 4506, the DLB 1800 enqueues data packets from the RX core and dequeues the data packets to the available core(s). For example, the queue controller 1830 (FIG. 18) can enqueue the elephant flow or portion(s) thereof from the producer core 408 to memory and dequeue the elephant flow or portion(s) thereof to the worker cores 412. In such examples, the queue controller 1830 can enqueue events including data pointers that reference data packets of the elephant flow in the queues 2214 of FIG. 22. In some such examples, the arbitration controller 1860 (FIG. 18) can dequeue the data pointers of the events to the available one(s) of the worker cores 412.

At block 4508, the DLB 1800 optimizes execution of computing task(s) on the data packets to generate processed data packets. For example, the telemetry controller 1870 can determine that a throughput threshold is not satisfied based on the current quantity of the worker cores 412 processing the elephant flow. In such examples, the configuration controller 1810 (FIG. 18) can increase the quantity of the worker cores 412 allocated to processing the elephant flow. An example process that may be executed to implement block 4508 is described below in connection with FIG. 46.

At block 4510, the DLB 1800 re-orders and/or aggregates the processed data packets. For example, the reorder controller 1840 (FIG. 18) can re-order the processed data packets based on an identifier (e.g., a queue identifier, a flow identifier, etc.). In such examples, the aggregation controller 1850 (FIG. 18) can aggregate the re-ordered processed data packets into a data stream in preparation for transmission or further processing.

At block 4512, the DLB 1800 dequeues the processed data packets to a transmit (TX) core. For example, the arbitration controller 1860 can dequeue data pointers that reference the re-ordered and/or aggregated processed data packets to the consumer core 414 of FIG. 4. In such examples, consumer core 414 can retrieve the re-ordered and/or aggregated processed data packets at addresses in the memory based on the dequeued data pointers.

At block 4514, the DLB 1800 invokes transmission of the processed data packets to a different logic entity. For example, in response to dequeuing the processed data packets to the consumer core 414, the consumer core 414 can transmit the processed data packets to the NIC 316 for transmission to different hardware, software, and/or firmware. In such examples, the NIC 316 of the one(s) of the DUs 122 can transmit the retrieved data packets to one(s) of the CUs 124 for distribution to the core network 106 of FIG. 1.

At block 4516, the DLB 1800 determines whether there is another packet flow to process. For example, the event controller 1820 can determine that there is another incoming elephant flow to process. In such examples, the elephant flow can be from the core network 106 to the device environment 102, from the device environment 102 to the core network 106, etc. If, at block 4516, the DLB 1800 determines that there is another packet flow to process, control returns to block 4502 to obtain another packet flow.

If, at block 4516, the DLB 1800 determines that there is not another packet flow to process, the example machine readable instructions 4500 of FIG. 45 conclude.

Figure 46:
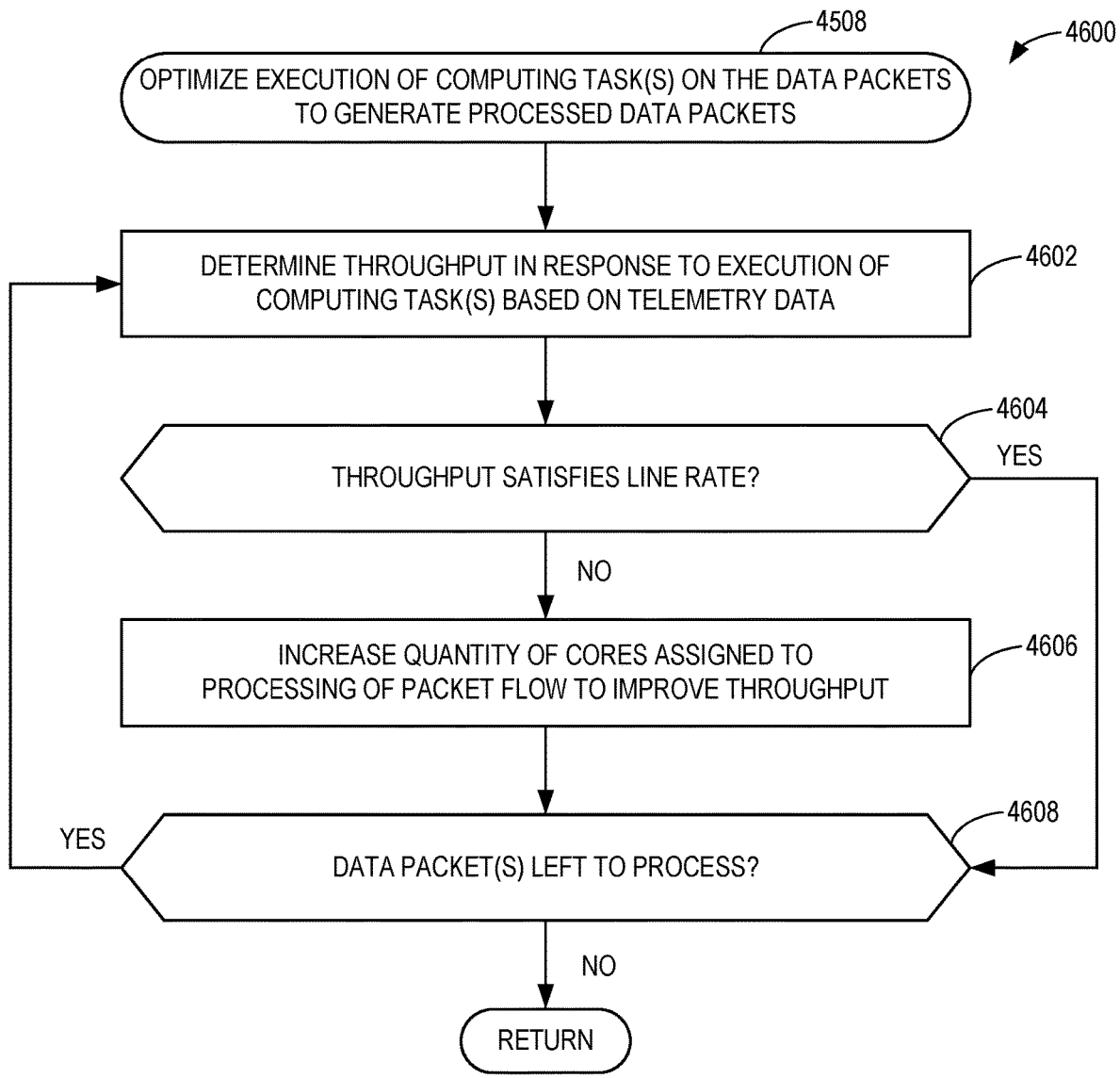
FIG. 46 is a flowchart representative of example machine readable instructions that may be executed to implement the DLB of FIGS. 2-6, 10, 14, 16, 18-24, 26, 28, 33, 34, and/or 36-40D to dynamically load balance a data flow.

FIG. 46 is a flowchart representative of example machine readable instructions 4600 that can be executed to implement a DLB, such as the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS. 38-40D to optimize execution of computing task(s) on the data packets to generate processed data packets.

The example machine readable instructions 4600 of FIG. 46 can be executed to implement block 4508 of FIG. 45. The example machine readable instructions 4600 of FIG. 46 begin at block 4602, at which the DLB 1800 determines throughput in response to an execution of computing task(s) based on telemetry data. For example, the telemetry controller 1870 (FIG. 18) can determine the throughput 1504 of 60% for the CPU 1402 of FIG. 14 in response to one of the worker cores 1410 being assigned to process an elephant flow.

At block 4604, the DLB 1800 determines whether the throughput satisfies a line rate. For example, the telemetry controller 1870 can compare the throughput 1504 of 60% to the line rate 1506 or throughput threshold of 100% and determine that the throughput 1504 of 60% does not meet and/or otherwise satisfy the throughput threshold of 100%.

If, at block 4604, the DLB 1800 determines that the throughput satisfies the line rate, control proceeds to block 4608 to determine whether there are data packet(s) left to process. If, at block 4604, the DLB 1800 determines that the throughput does not satisfy the line rate, then, at block 4606, the DLB 1800 increases a quantity of cores assigned to processing of the packet flow to improve throughput. For example, the configuration controller 1810 (FIG. 18) can allocate additional one(s) of the worker cores 1410 to process the elephant flow to improve throughput of the CPU 1402.

In response to increasing the quantity of cores at block 4606, the DLB 1800 determines whether there are data packet(s) left to process at block 4608. If, at block 4608, the DLB 1800 determines that there are data packet(s) left to process, control returns to block 4602 to determine an updated throughput value in response to execution of computing task(s) using the increased number of cores. If, at block 4608, the DLB 1800 determines that there are no data packet(s) left to process, control returns to block 4510 of the example machine readable instructions 4500 of FIG. 45 to re-order and/or aggregate the processed data packets.

Figure 47:
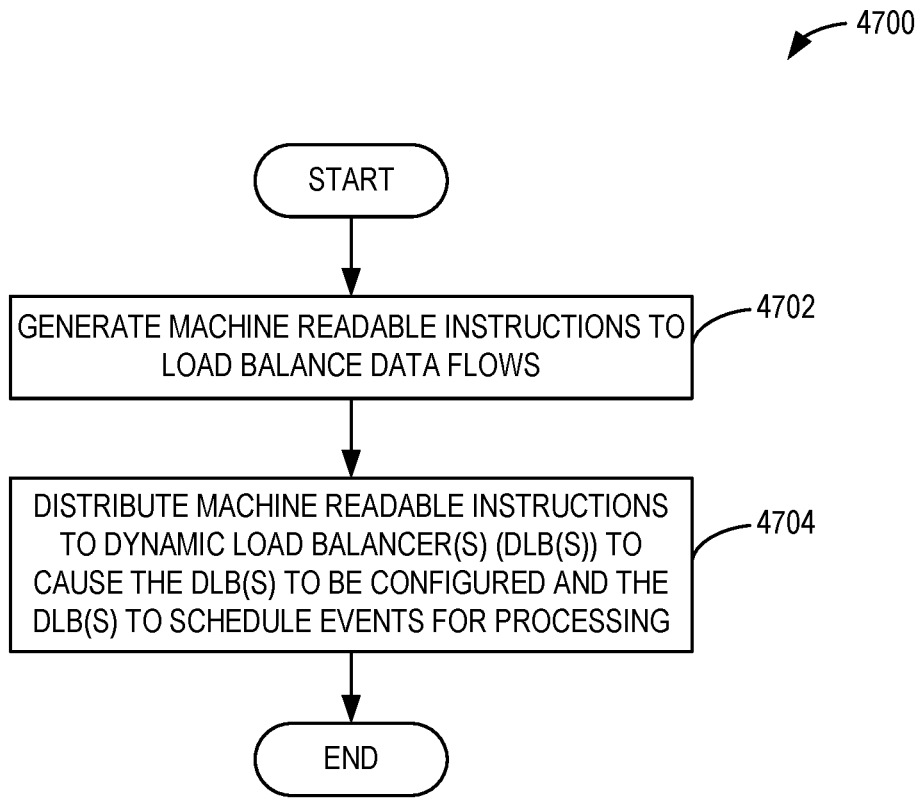
FIG. 47 is a flowchart representative of example machine readable instructions that may be executed to implement an example software distribution platform to distribute software to the DLB of FIGS. 2-6, 10, 14, 16, 18-24, 26, 28, 33, 34, and/or 36-40D.

FIG. 47 is a flowchart representative of example machine readable instructions 4700 that may be executed to implement an example software distribution platform, such as the software distribution platform 5105 of FIG. 51, to distribute software to the DLB of FIGS. 2-6, 10, 14, 16, 18-24, 26, 28, 33, 34, and/or 36-40D. The example machine readable instructions 4700 begin at block 4702, at which the software distribution platform 5105 generates machine readable instructions to load balance data flows. For example, the software distribution platform 5105 can generate the machine readable instructions 4200, 4300, 4400, 4500, 4600 of FIGS. 42, 43, 44, 45, and/or 46. In such examples, the software distribution platform 5105 can generate an executable based on the machine readable instructions 4200, 4300, 4400, 4500, 4600 of FIGS. 42, 43, 44, 45, and/or 46.

At block 4704, the software distribution platform 5105 distributes the machine readable instructions to dynamic load balancer(s) to cause the DLB(s) to be configured and the DLB(s) to schedule events for processing. For example, the software distribution platform 5105 can transmit the machine readable instructions 4200, 4300, 4400, 4500, 4600 of FIGS. 42, 43, 44, 45, and/or 46, the executable, etc., to DLB(s) included in one(s) of the DUs 122 of FIG. 1, one(s) of the CUs 124 of FIG. 1, one(s) of the core devices 126 of FIG. 1, etc., and/or a combination thereof. In such examples, in response to the software distribution platform 5105 distributing the machine readable instructions 4200, 4300, 4400, 4500, 4600 of FIGS. 42, 43, 44, 45, and/or 46, the executable, etc., to the DLB(s), the DLB(s) can execute the machine readable instructions 4200, 4300, 4400, 4500, 4600 of FIGS. 42, 43, 44, 45, and/or 46, the executable, etc., to configure the DLB(s). In some such examples, the machine readable instructions 4200, 4300, 4400, 4500, 4600 of FIGS. 42, 43, 44, 45, and/or 46, the executable, etc., when executed, can configure the DLB to be configured as described above in connection with at least blocks 4402, 4404, 4406, 4408 of FIG. 44. In some such examples, the machine readable instructions 4200, 4300, 4400, 4500, 4600 of FIGS. 42, 43, 44, 45, and/or 46, the executable, etc., when executed, can cause the DLB(s) to schedule events associated with data flows as described herein. In response to the distribution of the machine readable instructions at block 4704, the example machine readable instructions 4700 of FIG. 47 conclude.

Figure 48:
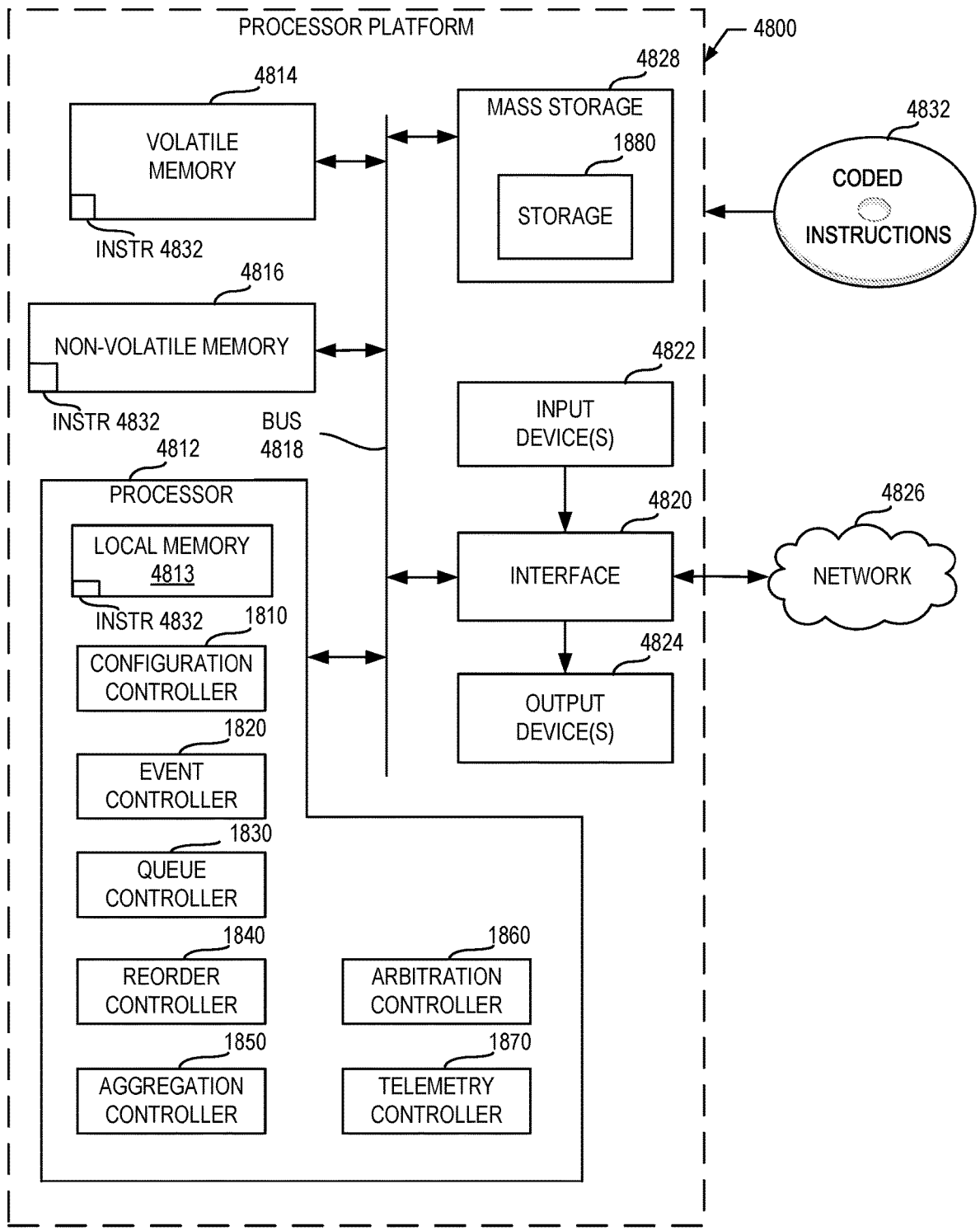
FIG. 48 is a block diagram of an example processing platform structured to execute the example machine readable instructions of FIGS. 42-46 to implement the DLB of FIGS. 2-6, 10, 14, 16, 18-24, 26, 28, 33, 34, and/or 36-40D.

FIG. 48 is a block diagram of an example processor platform 4800 structured to execute the instructions of FIGS. 42-46 to implement the DLB 1800 of FIG. 18. The processor platform 4800 can be, for example, a distributed unit (e.g., the DU 122 of FIG. 1), a centralized unit (e.g., one of the CUs 124 of FIG. 1), a core device (e.g., one of the core devices 126 of FIG. 1), a server (e.g., a computer server, an edge server, etc.), a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4800 of the illustrated example includes a processor 4812. The processor 4812 of the illustrated example is hardware. For example, the processor 4812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 4812 implements the example configuration controller 1810, the example event controller 1820, the example queue controller 1830, the example reorder controller 1840, the example aggregation controller 1850, the example arbitration controller 1860, and the example telemetry controller 1870 of FIG. 18.

The processor 4812 of the illustrated example includes a local memory 4813 (e.g., a cache). The processor 4812 of the illustrated example is in communication with a main memory including a volatile memory 4814 and a non-volatile memory 4816 via a bus 4818. The volatile memory 4814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4816 may be implemented by flash memory and/or any other desired type of memory device. Access to the main memory 4814, 4816 is controlled by a memory controller.

The processor platform 4800 of the illustrated example also includes an interface circuit 4820. The interface circuit 4820 may be implemented by any type of interface standard, such as an Ethernet interface, a universal serial bus (USB), a Bluetooth® interface, a near field communication (NFC) interface, and/or a PCI express interface.

In the illustrated example, one or more input devices 4822 are connected to the interface circuit 4820. The input device(s) 4822 permit(s) a user to enter data and/or commands into the processor 4812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 4824 are also connected to the interface circuit 4820 of the illustrated example. The output devices 4824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4820 of the illustrated example, thus, typically includes a graphics driver card, a graphics driver chip and/or a graphics driver processor.

The interface circuit 4820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4800 of the illustrated example also includes one or more mass storage devices 4828 for storing software and/or data. Examples of such mass storage devices 4828 include floppy disk drives, hard drive disks, compact disk drives, Blu-ray disk drives, redundant array of independent disks (RAID) systems, and digital versatile disk (DVD) drives. In this example, the one or more mass storage devices 4828 implements the storage 1880 of FIG. 18.

The machine executable instructions 4832 of FIGS. 42-46 may be stored in the mass storage device 4828, in the volatile memory 4814, in the non-volatile memory 4816, and/or on a removable non-transitory computer readable storage medium such as a CD or DVD.

Figure 49:
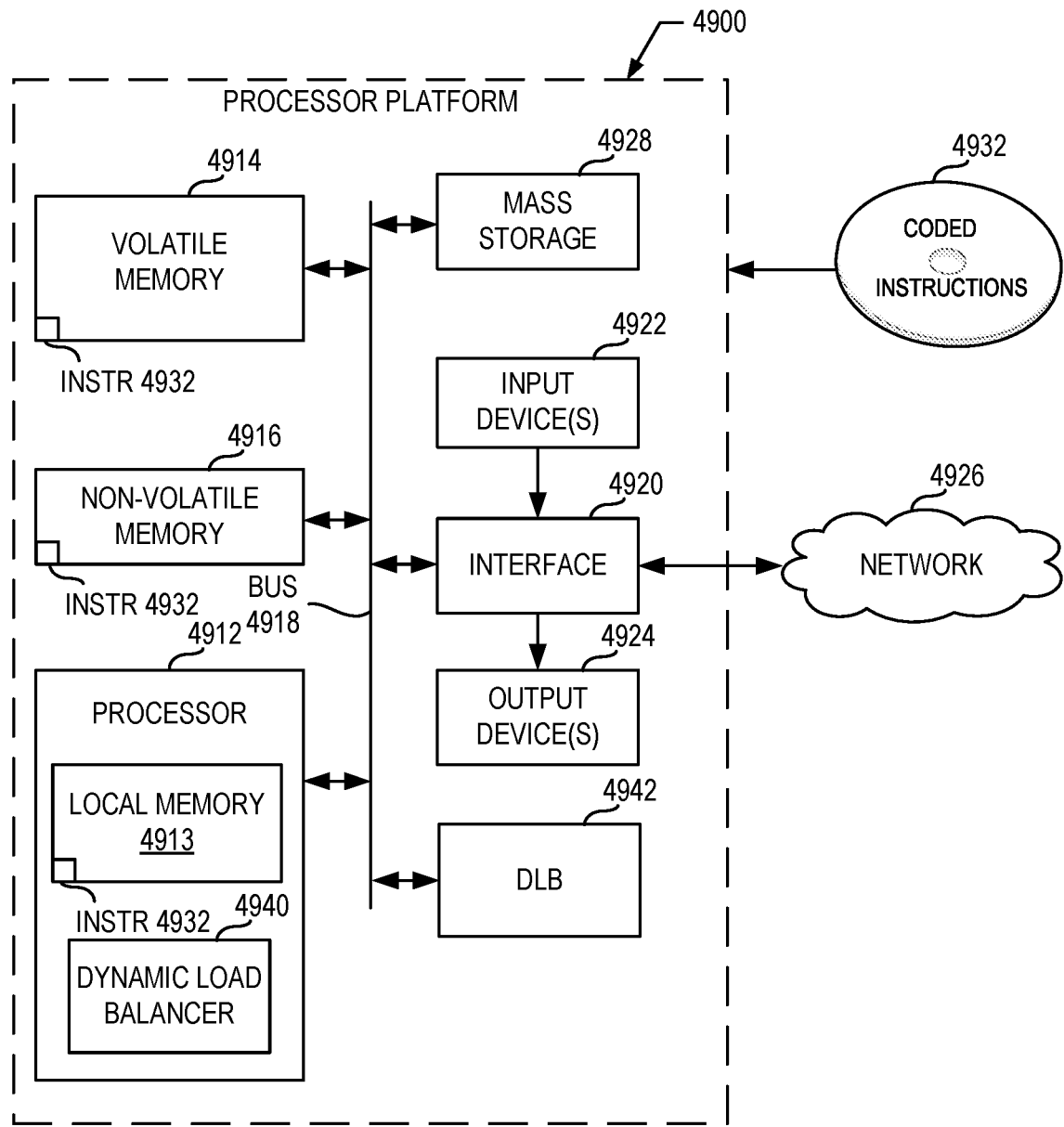
FIG. 49 is a block diagram of another example processing platform structured to execute the example machine readable instructions of FIGS. 42-46 to implement the DLB of FIGS. 2-6, 10, 14, 16, 18-24, 26, 28, 33, 34, and/or 36-40D.

FIG. 49 is a block diagram of an example processor platform 4900 structured to execute the instructions of FIGS. 42-46 to implement a multi-core computing environment including a first example DLB 4940 and a second example DLB 4942. The first DLB 4940 and/or the second DLB 4942 can be implemented by the DLB 202 of FIG. 2, the DLB 304 of FIG. 3, the DLB 410 of FIGS. 4-6, the DLB 1008 of FIG. 10, the DLB 1404 of FIGS. 14 and 16, the DLB 1800 of FIG. 18, the DLB 1902 of FIG. 19, the DLB 2002 of FIG. 20, the DLB 2102, 2104 of FIG. 21, the DLB 2202 of FIG. 22, the DLB 2302 of FIG. 23, the DLB 2402 of FIG. 24, the DLB 2602 of FIG. 26, the DLB 2802 of FIG. 28, the DLB 3320 of FIGS. 33-34, the DLB 3602 of FIG. 36, the DLB 3702 of FIG. 37, and/or the DLB 3802 of FIGS.

38-40D. The processor platform 4900 can be, for example, a distributed unit (e.g., the DU 122 of FIG. 1), a centralized unit (e.g., one of the CUs 124 of FIG. 1), a core device (e.g., one of the core devices 126 of FIG. 1), a server (e.g., a computer server, an edge server, etc.), a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset or other wearable device, or any other type of computing device.

The processor platform 4900 of the illustrated example includes a processor 4912. The processor 4912 of the illustrated example is hardware. For example, the processor 4912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 4912 includes the first DLB 4940. In some examples, the processor 4912 includes more than one instance of the first DLB 4940.

The processor 4912 of the illustrated example includes a local memory 4913 (e.g., a cache). The processor 4912 of the illustrated example is in communication with a main memory including a volatile memory 4914 and a non-volatile memory 4916 via a bus 4918. The volatile memory 4914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4916 may be implemented by flash memory and/or any other desired type of memory device. Access to the main memory 4914, 4916 is controlled by a memory controller. In FIG. 49, the first DLB 4940 and/or the second DLB 4942 can access the main memory.

The processor platform 4900 of the illustrated example also includes an interface circuit 4920. The interface circuit 4920 may be implemented by any type of interface standard, such as an Ethernet interface, a universal serial bus (USB), a Bluetooth® interface, a near field communication (NFC) interface, and/or a PCI express interface. In FIG. 49, the second DLB 4942 can interact with one or more different components of the processor platform 4900 via the interface circuit 4920.

In the illustrated example, one or more input devices 4922 are connected to the interface circuit 4920. The input device(s) 4922 permit(s) a user to enter data and/or commands into the processor 4912. The input device(s) 4922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 4924 are also connected to the interface circuit 4920 of the illustrated example. The output devices 4924 can be implemented, for example, by display devices (e.g., an LED, an OLED, a LCD, a CRT display, an IPS display, a touchscreen, etc.), a tactile output device, a printer and/or speaker. The interface circuit 4920 of the illustrated example, thus, typically includes a graphics driver card, a graphics driver chip and/or a graphics driver processor.

The interface circuit 4920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4900 of the illustrated example also includes one or more mass storage devices 4928 for storing software and/or data. Examples of such mass storage devices 4928 include floppy disk drives, hard drive disks, compact disk drives, Blu-ray disk drives, RAID systems, and DVD drives.

The machine executable instructions 4932 of FIGS. 42-46 may be stored in the mass storage device 4928, in the volatile memory 4914, in the non-volatile memory 4916, and/or on a removable non-transitory computer readable storage medium such as a CD or DVD.

Figure 50:
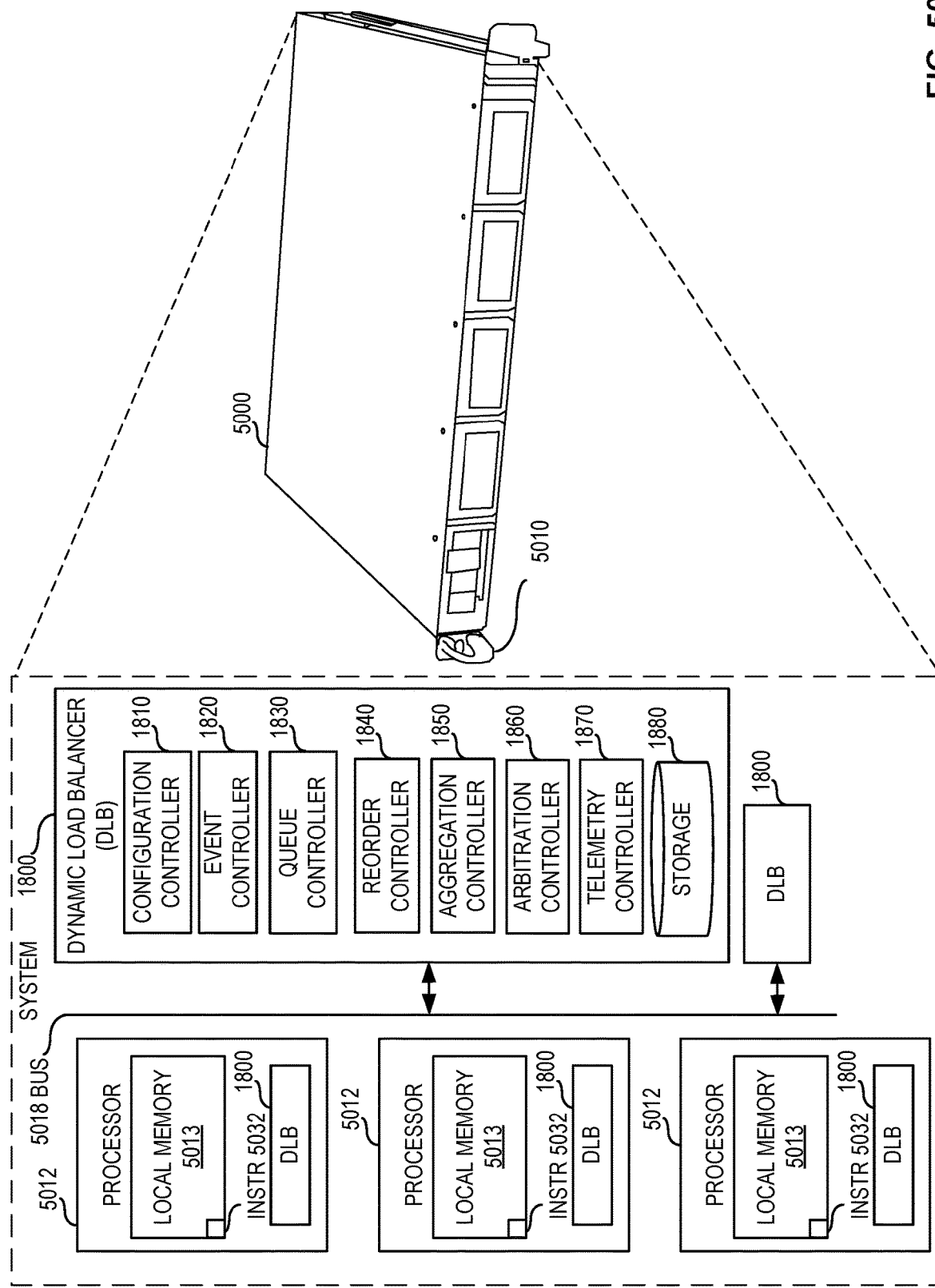
FIG. 50 is a block diagram of yet another example processing platform system structured to execute the example machine readable instructions of FIGS. 42-46 to implement the DLB of FIGS. 2-6, 10, 14, 16, 18-24, 26, 28, 33, 34, and/or 36-40D.

FIG. 50 is an example system 5000 capable of executing the example instructions of FIGS. 42-46 to implement a DLB, such as the first DLB 4940 and/or the second DLB 4942 of FIG. 49. In the illustrated example of FIG. 49, the system 5000 is a processor platform (e.g., a multi-core computing system), such as a server (e.g., a single socket server, a dual socket server, a 1U server, a 2U server, etc.). For example, the system can implement one of the DUs 122 of FIG. 1, one of the CUs 124 of FIG. 1, one of the core devices 126 of FIG. 1, etc. Alternatively, the system 5000 can be any other type of computing device or computing system. The system 5000 of the illustrated example includes an example chassis 5010, which can be coupled to and/or otherwise integrated into a cabinet (e.g., a server cabinet, a rack-mounted cabinet, etc.).

In the illustrated example, the system 5000 includes a plurality of processors 5012, a plurality of local memories 5013, and a plurality of the DLB 1800 of FIG. 18. Alternatively, fewer or more than the plurality of the processors 5012, the plurality of the local memories 5013, and/or the plurality of the DLB 1800 than depicted in FIG. 50 may be used. In this example, the processors 5012 can implement the processor 4812 of FIG. 48 or the processor 4912 of FIG. 49. In this example, the local memories 5013 can implement the local memories 4813 of FIG. 48 or the local memories 4813 of FIG. 49. In this example, computer readable instructions 5032 are stored in the local memories 5013. For example, the computer readable instructions 5032 can implement the computer readable instructions 4832 of FIG. 48 or the computer readable instructions 4932 of FIG. 49.

A block diagram illustrating an example software distribution platform 5105 to distribute software such as the example computer readable instructions 4832, 4932, 5032 of FIGS. 48-50 to third parties is illustrated in FIG. 51. The example software distribution platform 5105 may be implemented by any computer server, data facility, cloud service, etc., capable of storing and transmitting software to other computing devices. The third parties may be customers of the entity owning and/or operating the software distribution platform 5105. For example, the entity that owns and/or operates the software distribution platform 5105 may be a developer, a seller, and/or a licensor of software such as the example computer readable instructions 4832, 4932, 5032 of FIGS. 48-50. The third parties may be consumers, users, retailers, OEMs, etc., who purchase and/or license the software for use and/or re-sale and/or sub-licensing. In the illustrated example, the software distribution platform 5105 includes one or more servers and one or more storage devices. The storage devices store the computer readable instructions 4832, 4932, 5032, which may correspond to the example computer readable instructions 4832, 4932, 5032 of FIGS. 48-50, as described above. The one or more servers of the example software distribution platform 5105 are in communication with a network 5110, which may correspond to any one or more of the Internet and/or any of the example networks 104, 106, 107, 118 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 4832, 4932, 5032 from the software distribution platform 5105. For example, the software, which may correspond to the example computer readable instructions 4832, 4932, 5032 of FIGS. 48-50, may be downloaded to the example processor platforms 4800, 4900, 5000, which is to execute the computer readable instructions 4832, 4932, 5032 to implement DLB(s), such as the DLB 1800 of FIG. 18. In some example, one or more servers of the software distribution platform 5105 periodically offer, transmit, and/or force updates to the software (e.g., the example computer readable instructions 4832, 4932, 5032 of FIGS. 48-50) to ensure improvements, patches, updates, etc., are distributed and applied to the software at the end user devices.

From the foregoing, it will be appreciated that example methods, apparatus, and articles of manufacture have been disclosed to facilitate operation of dynamic load balancers for multi-core computing environments. The disclosed methods, apparatus, and articles of manufacture can split distribution of data processing and dynamically load balance a plurality of computing cores in a manner that exceeds static approaches to assigning data execution tasks to computing cores.

The disclosed methods, apparatus, and articles of manufacture control which cores out of a plurality of computing or processing cores process data and dynamically remap in response to determining that the identified cores have an insufficient available quantity of utilization. The disclosed methods, apparatus, and articles of manufacture improve the efficiency of using a computing device by load balancing workloads of computing cores and offloading scheduling of computing tasks to dedicated hardware, thereby increasing an availability of the computing cores to execute additional or different workloads compared to prior techniques. The disclosed methods, apparatus, and articles of manufacture are accordingly directed to one or more improvement(s) in the functioning of a computer.

Example methods, apparatus, systems, and articles of manufacture for dynamic load balancing in multi-core computing environments are disclosed herein. Further examples and combinations thereof include the following:

Example 1 includes an apparatus for hardware queue scheduling in a multi-core computing environment, the apparatus comprising a first core and a second core of a processor, and circuitry in a die of the processor, at least one of the first core or the second core included in the die, the at least one of the first core or the second core separate from the circuitry, the circuitry to enqueue an identifier to a queue implemented with the circuitry, the identifier associated with a data packet, assign the identifier in the queue to a first core of the processor, and in response to an execution of an operation on the data packet with the first core, provide the identifier to the second core to cause the second core to distribute the data packet.

In Example 2, the subject matter of Example 1 can optionally include that the queue is a first queue, and the circuitry is to determine a priority of the identifier based on the identifier, dequeue the identifier from the first queue to first arbitration logic, the first arbitration logic associated with the priority, provide the identifier from the first arbitration logic to second arbitration logic, the second arbitration logic associated with the first core, and enqueue the identifier from the second arbitration logic to a second queue, the second queue associated with the first core, the first core to dequeue the identifier from the second queue.

In Example 3, the subject matter of Examples 1-2 can optionally include that the identifier is a first identifier, the operation is a first operation, and the circuitry is to assign a second identifier in the queue to a third core of the processor in response to a throughput parameter not satisfying a throughput threshold, the throughput parameter based on telemetry data obtained from at least one of the first core or the second core, the second identifier associated with a second data packet, and in response to the third core executing a second operation on the second data packet, provide the second identifier to the second core or a fourth core of the processor to cause the second core or the fourth core to distribute the second data packet.

In Example 4, the subject matter of Examples 1-3 can optionally include that the queue is a first queue, and the circuitry is to receive, at a port of the circuitry, the identifier, execute, with reordering logic of the circuitry, a reordering operation on the identifier, identify, with arbitration logic of the circuitry, a second queue to enqueue the identifier, and enqueue the identifier to the second queue, the first core to dequeue the identifier from the second queue.

In Example 5, the subject matter of Examples 1-4 can optionally include that the identifier is a first identifier, the data packet is a first data packet, and the circuitry is to store the first identifier in an order buffer, determine whether a second identifier is stored in the order buffer, the second identifier associated with a second data packet to be distributed after the first data packet, in response to determining that the second identifier is stored in the order buffer, enqueue the first identifier in the queue, and in response to enqueuing the first identifier in the queue, enqueue the second identifier in the queue.

In Example 6, the subject matter of Examples 1-5 can optionally include that the first core is to provide a notification of the completion of the operation to the circuitry, and store the data packet in memory, and the second core is to retrieve the data packet from the memory in response to the circuitry providing the identifier to the second core.

In Example 7, the subject matter of Examples 1-6 can optionally include that the circuitry is to identify a data source of the identifier, determine whether the data source has a producer credit, the identifier enqueued to the queue in response to determining that the data source has the producer credit, deduct the producer credit from a number of producer credits associated with the data source, the number of producer credits stored in memory, and in response to the distribution, add the producer credit to the number of the producer credits.

Example 8 includes an apparatus for hardware queue scheduling in a multi-core computing environment, the apparatus comprising a queue controller to enqueue an identifier to a queue implemented with circuitry in a die of a processor, the identifier associated with a data packet, and an arbitration controller to assign the identifier in the queue to a first core of the processor, and in response to an execution of an operation on the data packet with the first core, provide the identifier to a second core to cause the second core to distribute the data packet, at least one of the first core or the second core included in the die of the processor, the at least one of the first core or the second core separate from the circuitry.

In Example 9, the subject matter of Example 8 can optionally include that the queue is a first queue, and the circuitry is to determine a priority of the identifier based on the identifier, dequeue the identifier from the first queue to first arbitration logic, the first arbitration logic associated with the priority, provide the identifier from the first arbitration logic to second arbitration logic, the second arbitration logic associated with the first core, and enqueue the identifier from the second arbitration logic to a second queue, the second queue associated with the first core, the first core to dequeue the identifier from the second queue.

In Example 10, the subject matter of Examples 8-9 can optionally include that the identifier is a first identifier, the operation is a first operation, and the arbitration controller is to assign a second identifier in the queue to a third core of the processor in response to a throughput parameter not satisfying a throughput threshold, the throughput parameter based on telemetry data obtained from at least one of the first core or the second core, the second identifier associated with a second data packet, and in response to the third core executing a second operation on the second data packet, provide the second identifier to the second core or a fourth core of the processor to cause the second core or the fourth core to distribute the second data packet.

In Example 11, the subject matter of Examples 8-10 can optionally include that the queue is a first queue, and further including an event controller to receive the identifier, and a reorder controller to execute a reordering operation on the identifier, and the arbitration controller is to identify a second queue to enqueue the identifier, and the queue controller is to enqueue the identifier to the second queue, the first core to dequeue the identifier from the second queue.

In Example 12, the subject matter of Examples 8-11 can optionally include that the identifier is a first identifier, the data packet is a first data packet, and the reorder controller is to store the first identifier in an order buffer, and determine whether a second identifier is stored in the order buffer, the second identifier associated with a second data packet to be distributed after the first data packet, and the queue controller is to enqueue the first identifier in the queue in response to determining that the second identifier is stored in the order buffer, and enqueue the second identifier in the queue in response to enqueuing the first identifier in the queue.

In Example 13, the subject matter of Examples 8-12 can optionally include an event controller to obtain a notification of the completion of the operation from the first core, the first core to store the data packet in memory, and the arbitration controller to provide the identifier to the second core, the second core to retrieve the data packet from the memory in response to receiving the identifier.

In Example 14, the subject matter of Examples 8-13 can optionally include an event controller to identify a data source of the identifier, determine whether the data source has a producer credit, the identifier enqueued to the queue in response to determining that the data source has the producer credit, deduct the producer credit from a number of producer credits associated with the data source, the number of producer credits stored in memory, and in response to the distribution, add the producer credit to the number of the producer credits.

Example 15 includes an apparatus for hardware queue scheduling in a multi-core computing environment, the apparatus comprising means for enqueuing an identifier to a queue implemented with circuitry in a die of a processor, the identifier associated with a data packet, means for assigning the identifier in the queue to a first core of the processor, and means for allocating the identifier to a second core to cause the second core to distribute the data packet in response to an execution of an operation on the data packet with the first core, at least one of the first core or the second core are included in the die of the processor, the at least one of the first core or the second core separate from the circuitry.

In Example 16, the subject matter of Example 15 can optionally include that the queue is a first queue, and the circuitry is to determine a priority of the identifier based on the identifier, dequeue the identifier from the first queue to first arbitration logic, the first arbitration logic associated with the priority, provide the identifier from the first arbitration logic to second arbitration logic, the second arbitration logic associated with the first core, and enqueue the identifier from the second arbitration logic to a second queue, the second queue associated with the first core, the first core to dequeue the identifier from the second queue.

In Example 17, the subject matter of Examples 15-16 can optionally include that the identifier is a first identifier, the operation is a first operation, and the means for assigning is to assign a second identifier in the queue to a third core of the processor in response to a throughput parameter not satisfying a throughput threshold, the throughput parameter based on telemetry data obtained from at least one of the first core or the second core, the second identifier associated with a second data packet, and the means for allocating is to allocate the second identifier to the second core or a fourth core of the processor to cause the second core or the fourth core to distribute the second data packet.

In Example 18, the subject matter of Examples 15-17 can optionally include that the queue is a first queue, and further including means for receiving the identifier, and means for executing a reordering operation on the identifier, and the means for assigning is to identify a second queue to enqueue the identifier, and the means for allocating is to enqueue the identifier to the second queue, the first core to dequeue the identifier from the second queue.

In Example 19, the subject matter of Examples 15-18 can optionally include that the identifier is a first identifier, the data packet is a first data packet, and the means for executing is to store the first identifier in an order buffer, and determine whether a second identifier is stored in the order buffer, the second identifier associated with a second data packet to be distributed after the first data packet, and the means for enqueueing is to enqueue the first identifier in the queue in response to determining that the second identifier is stored in the order buffer, and enqueue the second identifier in the queue in response to enqueuing the first identifier in the queue.

In Example 20, the subject matter of Examples 15-19 can optionally include means for obtaining a notification of the completion of the operation from the first core, the first core to store the data packet in memory, and the means for allocating is to allocate the identifier to the second core, the second core to retrieve the data packet from the memory in response to receiving the identifier.

In Example 21, the subject matter of Examples 15-20 can optionally include means for managing a number of producer credits, the means for managing to identify a data source of the identifier, determine whether the data source has a producer credit, the identifier enqueued to the queue in response to determining that the data source has the producer credit, deduct the producer credit from a number of producer credits associated with the data source, the number of producer credits stored in memory, and in response to the distribution, add the producer credit to the number of the producer credits.

Example 22 includes a method for hardware queue scheduling in a multi-core computing environment, the method comprising enqueuing an identifier to a queue implemented with circuitry in a die of a processor, the identifier associated with a data packet, assigning the identifier in the queue to a first core of the processor, executing, with the first core, an operation on the data packet, and in response to the execution of the operation, providing the identifier to a second core of the processor to cause the second core to distribute the data packet, at least one of the first core or the second core are included in the die of the processor, the at least one of the first core or the second core separate from the circuitry.

In Example 23, the subject matter of Example 22 can optionally include that the queue is a first queue, and further including determining a priority of the identifier based on the identifier, dequeuing the identifier from the first queue to first arbitration logic, the first arbitration logic associated with the priority, providing the identifier from the first arbitration logic to second arbitration logic, the second arbitration logic associated with the first core, and enqueuing the identifier from the second arbitration logic to a second queue, the second queue associated with the first core, the first core to dequeue the identifier from the second queue.

In Example 24, the subject matter of Examples 22-23 can optionally include that the identifier is a first identifier, the operation is a first operation, and further including determining a throughput parameter based on telemetry data obtained from at least one of the first core or the second core, assigning a second identifier in the queue to a third core of the processor in response to the throughput parameter not satisfying a throughput threshold, the second identifier associated with a second data packet, executing, with the third core, a second operation on the second data packet, and providing the second identifier to the second core or a fourth core of the processor to cause the second core or the fourth core to distribute the second data packet.

In Example 25, the subject matter of Examples 22-24 can optionally include that the queue is a first queue, and further including receiving, at a port of the circuitry, the identifier, executing, with reordering logic of the circuitry, a reordering operation on the identifier, identifying, with arbitration logic of the circuitry, a second queue to enqueue the identifier, and enqueuing the identifier to the second queue, the first core to dequeue the identifier from the second queue.

In Example 26, the subject matter of Examples 22-25 can optionally include that the identifier is a first identifier, the data packet is a first data packet, and further including storing the first identifier in an order buffer, determining whether a second identifier is stored in the order buffer, the second identifier associated with a second data packet to be distributed after the first data packet, in response to determining that the second identifier is stored in the order buffer, enqueuing the first identifier in the queue, and in response to enqueuing the first identifier in the queue, enqueuing the second identifier in the queue.

In Example 27, the subject matter of Examples 22-26 can optionally include providing a notification of the completion of the operation to the circuitry, storing the data packet in memory, and retrieving the data packet from the memory with the second core in response to the circuitry providing the identifier to the second core.

In Example 28, the subject matter of Examples 22-27 can optionally include identifying a data source of the identifier, determining whether the data source has a producer credit, the identifier enqueued to the queue in response to determining that the data source has the producer credit, deducting the producer credit from a number of producer credits associated with the data source, the number of producer credits stored in memory, and in response to the distribution, adding the producer credit to the number of the producer credits.

Example 29 includes an apparatus for dynamic load balancing in a multi-core computing environment, the apparatus comprising a first core and a plurality of second cores of a processor, and circuitry in a die of the processor, the circuitry separate from the first core and the second cores, the circuitry to enqueue identifiers in one or more queues in the circuitry, the identifiers associated with respective ones of data packets of a packet flow, allocate one or more of the second cores to dequeue first ones of the identifiers in response to a throughput parameter of the first core not satisfying a throughput threshold to cause the one or more of the second cores to execute one or more operations on first ones of the data packets, the first ones of the data packets corresponding to the dequeued first ones of the identifiers, and provide the first ones of the identifiers to one or more data consumers of the processor to distribute the first ones of the data packets.

In Example 30, the subject matter of Example 29 can optionally include that the circuitry is to allocate at least one of the first core or the one or more second cores of the processor to dequeue second ones of the identifiers in response to the throughput parameter not satisfying a throughput threshold to cause the at least one of the first core or the one or more second cores to execute one or more operations on second ones of the data packets, the second ones of the data packets corresponding to the dequeued second ones of the identifiers, and provide the second ones of the identifiers to the one or more data consumers of the processor to distribute the second ones of the data packets.

In Example 31, the subject matter of Examples 29-30 can optionally include that the data packets are first data packets, the packet flow is a first packet flow, the identifiers are first identifiers, the one or more operations are a first one or more operations, and the circuitry is to enqueue second identifiers in the one or more queues, the second identifiers associated with respective ones of second data packets of a second packet flow, the second packet flow different from the first packet flow, allocate at least one of the first core or the one or more second cores to dequeue ones of the second identifiers to cause the at least one of the first core or the one or more second cores to execute second one or more operations on the second data packets, the second data packets corresponding to the dequeued ones of the second identifiers, and provide the second identifiers to the one or more data consumers to distribute the second data packets.

In Example 32, the subject matter of Examples 29-31 can optionally include that the first identifiers are atomic queue identifiers and the second identifiers are at least one of non-atomic queue identifiers or direct queue identifiers.

In Example 33, the subject matter of Examples 29-32 can optionally include that the first core is a data producer, the data producer is to receive the data packets from a network interface in communication with a first network, and the one or more data consumers are to transmit the data packets to the network interface for distribution to a second network.

In Example 34, the subject matter of Examples 29-33 can optionally include that the throughput parameter has a first value based on first telemetry data associated with the first core, the one or more second cores include a third core, and the circuitry is to allocate the third core to dequeue a first set of the first ones of the identifiers in response to the first value not satisfying the throughput threshold, determine a second value of the throughput parameter in response to the allocation of the third core, the second value based on second telemetry data associated with at least one of the first core or the third core, and dequeue a second set of the first ones of the identifiers to the first core and the third core in response to the second value satisfying the throughput threshold.

In Example 35, the subject matter of Examples 29-34 can optionally include that the data packets are first data packets, the packet flow is a first packet flow, the identifiers are first identifiers, and the circuitry is to allocate one or more of second ones of the second cores to dequeue ones of second identifiers associated with second data packets of a second data flow different from the first packet flow, the second ones of the second cores not including the first core and the third core.

Example 36 includes a method for dynamic load balancing in a multi-core computing environment, the method comprising enqueueing identifiers in one or more queues in circuitry of a processor, the identifiers associated with respective ones of data packets of a packet flow, the circuitry separate from a first core of the processor, allocating one or more second cores of the processor to dequeue first ones of the identifiers in response to a throughput parameter of the first core not satisfying a throughput threshold, executing, with the one or more of the second cores, one or more operations on first ones of the data packets corresponding to the dequeued first ones of the identifiers, and providing the first ones of the identifiers to one or more data consumers of the processor to distribute the first ones of the data packets.

In Example 37, the subject matter of Example 36 can optionally include allocating at least one of the first core or the one or more second cores of the processor to dequeue second ones of the identifiers in response to the throughput parameter not satisfying a throughput threshold, executing the one or more operations on second ones of the data packets corresponding to the dequeued second ones of the identifiers with the at least one of the first core or the one or more of the second cores, and providing the second ones of the identifiers to the one or more data consumers of the processor to distribute the second ones of the data packets.

In Example 38, the subject matter of Examples 36-37 can optionally include that the data packets are first data packets, the packet flow is a first packet flow, the identifiers are first identifiers, the one or more operations are a first one or more operations, and further including enqueueing second identifiers in the one or more queues in the circuitry, the second identifiers associated with respective ones of second data packets of a second packet flow, the second packet flow different from the first packet flow, identifying at least one of the first core or the one or more second cores to dequeue ones of the second identifiers, executing second one or more operations on the second data packets corresponding to the dequeued ones of the second identifiers with the at least one of the first core or the one or more of the second cores, and providing the second identifiers to the one or more data consumers to distribute the second data packets.

In Example 39, the subject matter of Examples 36-38 can optionally include that the first identifiers are atomic queue identifiers and the second identifiers are at least one of non-atomic queue identifiers or direct queue identifiers.

In Example 40, the subject matter of Examples 36-39 can optionally include that the first core is a data producer, and further including receiving the data packets from a first network with a network interface in communication with the processor, providing the data packets from the network interface to the data producer, and distributing the data packets from the one or more data consumers to the network interface for distribution to a second network.

In Example 41, the subject matter of Examples 36-40 can optionally include that the first network is at least one of a cloud network or a core network and the second network is at least one of an edge network or a device environment.

In Example 42, the subject matter of Examples 36-41 can optionally include that the throughput parameter has a first value based on first telemetry data associated with the first core, the one or more second cores include a third core, and further including in response to the first value not satisfying the throughput threshold, allocating the third core to dequeue a first set of the first ones of the identifiers, in response to the allocation of the third core, determining a second value of the throughput parameter based on second telemetry data associated with at least one of the first core or the third core, and in response to the second value satisfying the throughput threshold, dequeueing a second set of the first ones of the identifiers with the first core and the third core.

In Example 43, the subject matter of Examples 36-42 can optionally include that the data packets are first data packets, the packet flow is a first packet flow, the identifiers are first identifiers, and further including allocating, with the circuitry, one or more of second ones of the second cores to dequeue ones of second identifiers associated with second data packets of a second data flow different from the first packet flow, the second ones of the second cores not including the first core and the third core.

In Example 44, the subject matter of Examples 36-43 can optionally include that the processor is included in a computing device that implements at least one of a radio access network (RAN) or a virtual RAN.

Example 45 includes an apparatus for dynamic load balancing in a multi-core computing environment, the apparatus comprising a first core and a second core of a processor, and circuitry in a die of the processor, the circuitry to enqueue an identifier in a queue in the circuitry, the identifier associated with a data packet of a packet flow, dequeue the identifier to the first core to cause the first core to execute a first operation on the data packet, enqueue the identifier in the queue in response to obtaining an indication of completion of the first operation, dequeue the identifier to the first core or the second core to cause the first core or the second core to execute a second operation on the data packet different from the first operation, and provide the identifier to a data consumer of the processor to distribute the data packet.

In Example 46, the subject matter of Example 45 can optionally include that the circuitry is separate from the first core and the second core, and the die includes the first core, the second core, and the circuitry.

In Example 47, the subject matter of Examples 45-46 can optionally include that the die is a first die that includes the first core and the second core, and the processor includes a second die that includes the circuitry.

In Example 48, the subject matter of Examples 45-47 can optionally include that the first operation is a decryption operation of an Internet Protocol security (IPsec) application and the second operation is an encryption operation of the IPsec application.

In Example 49, the subject matter of Examples 45-48 can optionally include that the queue is a first queue, the circuitry is to enqueue the identifier to a second queue from the first queue, the first core is to poll the second queue, and the first core is to dequeue the identifier from the second queue in response to the polling.

In Example 50, the subject matter of Examples 45-49 can optionally include that the data packet is a first data packet, the packet flow is a first packet flow, the identifier is a first identifier, the queue is a first queue, and the circuitry is to enqueue a second identifier in a second queue, the second identifier associated with a second data packet of a second packet flow, the second packet flow different from the first packet flow, allocate a third core of the processor to dequeue the second identifier to cause the third core to execute the first operation, the second operation, or a third operation on the second data packet, the second data packet corresponding to the dequeued second identifier, and provide the second identifier to the data consumer to distribute the second data packet.

In Example 51, the subject matter of Examples 45-50 can optionally include that the first queue is ordered based on atomicity, and the second queue is ordered based on direct ordering.

Example 52 includes a method for dynamic load balancing in a multi-core computing environment, the method comprising enqueueing an identifier in a queue in circuitry of a processor, the identifier associated with a data packet of a packet flow, executing, with a first core of a processor, a first operation on the data packet in response to the first core dequeuing the identifier from the circuitry, enqueuing, with the circuitry, the identifier in the queue in response to obtaining an indication of completion of the first operation, executing, with the first core or a second core of the processor, a second operation on the data packet different from the first operation in response to the first core or the second core dequeuing the identifier from the circuitry, and providing the identifier to a data consumer of the processor to distribute the data packet.

In Example 53, the subject matter of Example 52 can optionally include that the circuitry is separate from the first core and the second core, and the processor includes a die, the die including the first core, the second core, and the circuitry.

In Example 54, the subject matter of Examples 52-53 can optionally include that the processor includes a first die and a second die, the first die includes the first core and the second core, and the second die includes the circuitry.

In Example 55, the subject matter of Examples 52-54 can optionally include that the first operation is a decryption operation of an Internet Protocol security (IPsec) application and the second operation is an encryption operation of the IPsec application.

In Example 56, the subject matter of Examples 52-55 can optionally include that the queue is a first queue, and further including enqueuing the identifier to a second queue from the first queue, and polling the second queue with the first core, the first core to dequeue the identifier from the second queue in response to the polling.

In Example 57, the subject matter of Examples 52-56 can optionally include that the data packet is a first data packet, the packet flow is a first packet flow, the identifier is a first identifier, the queue is a first queue, and further including enqueuing a second identifier in a second queue, the second identifier associated with a second data packet of a second packet flow, the second packet flow different from the first packet flow, allocating a third core of the processor to dequeue the second identifier, executing the first operation, the second operation, or a third operation on the second data packet, the second data packet corresponding to the dequeued second identifier, and provide the second identifier to the data consumer to distribute the second data packet.

In Example 58, the subject matter of Examples 52-57 can optionally include that the first queue is ordered based on atomicity and the second queue is ordered based on direct ordering.

Example 59 is a computer-readable medium comprising instructions to perform any of Examples 1-7.

Example 60 is a computer-readable medium comprising instructions to perform any of Examples 22-28.

Example 61 is an apparatus comprising processor circuitry to perform any of Examples 22-28.

Example 62 is an edge server comprising processor circuitry to perform any of Examples 22-28.

Example 63 is a core server comprising processor circuitry to perform any of Examples 22-28.

Example 64 is a computer-readable medium comprising instructions to perform any of Examples 29-35.

Example 65 is a computer-readable medium comprising instructions to perform any of Examples 36-44.

Example 66 is an apparatus comprising processor circuitry to perform any of Examples 36-44.

Example 67 is an edge server comprising processor circuitry to perform any of Examples 36-44.

Example 68 is a core server comprising processor circuitry to perform any of Examples 36-44.

Example 69 is a computer-readable medium comprising instructions to perform any of Examples 45-51.

Example 70 is a computer-readable medium comprising instructions to perform any of Examples 52-58.

Example 71 is an apparatus comprising processor circuitry to perform any of Examples 52-58.

Example 72 is an edge server comprising processor circuitry to perform any of Examples 52-58.

Example 73 is a core server comprising processor circuitry to perform any of Examples 52-58.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A semiconductor die comprising:
a first core and a second core; and
circuitry in the semiconductor die, the circuitry separate from the first core and the second core, the circuitry to:
assign the first core to process first data packets of a data flow, the first core to execute one or more operations on the first data packets to produce processed first data packets;
assign the second core to process second data packets of the data flow based on a size of the data flow, the second core to execute the one or more operations on the second data packets to produce processed second data packets; and
re-order the processed first data packets and the processed second data packets to produce a processed data flow.

2. The semiconductor die of claim 1, wherein the first data packets and the second data packets are to be received from a first network interface card, and the circuitry is to aggregate the processed first data packets and the processed second data packets after being re-ordered in preparation for distribution to a second network interface card.

3. The semiconductor die of claim 1, wherein the semiconductor die includes a third core, and the circuitry is to assign the third core to process third data packets of a second data flow.

4. The semiconductor die of claim 1, wherein the circuitry is to assign the second core to process the second data packets of the data flow based on a comparison of the size of the data flow to a threshold.

5. The semiconductor die of claim 1, wherein the data flow corresponds to a single session associated with a network connection, and the circuitry is to assign the second core to process the second data packets based on a duration of the network connection.

6. The semiconductor die of claim 5, wherein the circuitry is to assign the second core to process the second data packets based on a comparison of the duration of the network connection to a threshold.

7. The semiconductor die of claim 1, wherein the semiconductor die includes a third core, and the circuitry is to assign the third core to process the second data packets of the data flow based on a bandwidth associated with the second core.

8. The semiconductor die of claim 7, wherein the circuitry is to assign the third core to process the second data packets of the data flow based on a comparison of the bandwidth associated with the second core to a threshold.

9. The semiconductor die of claim 1, wherein the first core and the second core are included in a plurality of cores and the circuitry is to select ones of the plurality of cores based on at least one of an atomic scheduling or an ordered scheduling to distribute processing of the data flow.

10. The semiconductor die of claim 1, wherein the data flow includes ciphertext, and the one or more operations include one or more cryptographic operations.

11. A method comprising:
assigning, with circuitry of a semiconductor die, first data packets of a data flow to a first core of the semiconductor die, the first core to execute one or more operations on the first data packets to produce processed first data packets, the circuitry of the semiconductor die separate from the first core and a second core of the semiconductor die;
assigning, with the circuitry, second data packets of the data flow to the second core based on a size of the data flow, the second core to execute the one or more operations on the second data packets to produce processed second data packets; and
re-ordering the processed first data packets and the processed second data packets to produce a processed data flow.

12. The method of claim 11, further including:
receiving the first data packets and the second data packets from a first network interface card; and
aggregating the processed first data packets and the processed second data packets after being re-ordered in preparation for distribution to a second network interface card.

13. The method of claim 11, wherein the semiconductor die includes a third core, and further including assigning the third core to process third data packets of a second data flow.

14. The method of claim 11, wherein the assigning of the second core is based on a comparison of the size of the data flow to a threshold.

15. The method of claim 11, wherein the data flow corresponds to a single session associated with a network connection, and the assigning of the second core is based a duration of the network connection.

16. The method of claim 15, wherein the assigning of the second core is based on a comparison of the duration of the network connection to a threshold.

17. The method of claim 11, wherein the semiconductor die includes a third core, and further including assigning the third core to process the second data packets of the data flow based on a bandwidth associated with the second core.

18. The method of claim 17, wherein the assigning of the third core is based on a comparison of the bandwidth associated with the second core to a threshold.

19. An apparatus comprising:
a first core and a second core of a processor; and
circuitry in a die of the processor, the circuitry separate from the first core and the second core, the die including the first core, the second core, and the circuitry, the circuitry to:
enqueue an identifier in a queue in the circuitry, the identifier to reference a data packet obtained by a network interface card;
dequeue the identifier to the first core to cause the first core to execute a first operation on the data packet;
enqueue the identifier in the queue in response to obtaining an indication of completion of the first operation;
dequeue the identifier to the first core or the second core to cause the first core or the second core to execute a second operation on the data packet different from the first operation; and
distribute the data packet.

20. The apparatus of claim 19, wherein the first operation is a decryption operation of an Internet Protocol security (IPsec) application and the second operation is an encryption operation of the IPsec application.

* * * * *